(12) United States Patent
Nakashima et al.

(10) Patent No.: US 9,031,045 B2
(45) Date of Patent: May 12, 2015

(54) MOBILE STATION DEVICE, COMMUNICATION SYSTEM, COMMUNICATION METHOD AND INTEGRATED CIRCUIT

(75) Inventors: Daiichiro Nakashima, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/884,399

(22) PCT Filed: Dec. 6, 2011

(86) PCT No.: PCT/JP2011/078157
§ 371 (c)(1),
(2), (4) Date: Jun. 17, 2013

(87) PCT Pub. No.: WO2012/077667
PCT Pub. Date: Jun. 14, 2012

(65) Prior Publication Data
US 2013/0259011 A1  Oct. 3, 2013

(30) Foreign Application Priority Data
Dec. 9, 2010  (JP) ................. 2010-274412

(51) Int. Cl.
| | | |
|---|---|---|
| H04J 3/00 | (2006.01) | |
| H04W 72/04 | (2009.01) | |
| H04W 52/14 | (2009.01) | |
| H04W 52/48 | (2009.01) | |
| H04W 52/34 | (2009.01) | |
| H04W 52/40 | (2009.01) | |

(52) U.S. Cl.
CPC ........ *H04W 72/0473* (2013.01); *H04W 52/146* (2013.01); *H04W 52/48* (2013.01); *H04W 52/346* (2013.01); *H04W 52/40* (2013.01)

(58) Field of Classification Search
CPC . H04W 52/08; H04W 52/325; H04W 52/146; H04W 52/34; H04W 52/228; H04W 52/50; H04W 52/16
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | |
|---|---|---|
| 2004/0018850 A1 | 1/2004 | Ishiguro et al. |
| 2005/0143114 A1 | 6/2005 | Moulsley et al. |

(Continued)

FOREIGN PATENT DOCUMENTS

| | | |
|---|---|---|
| JP | 2004-112761 A | 4/2004 |
| JP | 2005-522911 A | 7/2005 |
| WO | WO 2009/034606 A1 | 3/2009 |

OTHER PUBLICATIONS

Ericsson, St-Ericsson, "A/N transmission in the uplink for carreir aggregation", 3GPP TSG-RAN WG1 #60, R1-100909, San Francisco, USA, Feb. 26, 2010, pp. 1-4.

(Continued)

*Primary Examiner* — Jung-Jen Liu
(74) *Attorney, Agent, or Firm* — Birch, Stewart, Kolasch & Birch, LLP

(57) ABSTRACT

A mobile station device set to communicate with a base station device over a plurality of subframes using a plurality of cells is provided. When ACK/NACK for reception of data transmitted from the base station device is to be transmitted to the base station device using a PUCCH and the PUCCH is set to select one resource from a plurality of PUCCH candidate resources to transmit with prescribed transmit power using the selected resource, the mobile station device determines a parameter value related to prescribed transmit power in accordance with the number of cells used for data communication in the plurality of subframes.

12 Claims, 17 Drawing Sheets

(56) References Cited

U.S. PATENT DOCUMENTS

| | | | |
|---|---|---|---|
| 2008/0247375 A1* | 10/2008 | Muharemovic et al. | 370/344 |
| 2010/0296470 A1* | 11/2010 | Heo et al. | 370/329 |
| 2011/0096815 A1* | 4/2011 | Shin et al. | 375/219 |
| 2012/0039280 A1* | 2/2012 | Chen et al. | 370/329 |
| 2012/0106407 A1* | 5/2012 | Papasakellariou et al. | 370/280 |
| 2012/0113831 A1* | 5/2012 | Pelletier et al. | 370/252 |
| 2012/0113907 A1* | 5/2012 | Baldemair et al. | 370/329 |
| 2012/0202544 A1* | 8/2012 | Kim et al. | 455/509 |
| 2013/0286905 A1* | 10/2013 | Yang et al. | 370/280 |

OTHER PUBLICATIONS

LG Electronics, "ACK/NACK on PUCCH for TDD", 3GPP TSG RAN WG1 Meeting #63, R1-106099, Jacksonville, USA, Nov. 15-19, 2010, pp. 1-13.

Motorola, "Introduction of Rel-10 LTE-Advanced features in 36.213", 3GPP TSG-RAN Meeting #63, R1-106557, Jacksonville, USA, Nov. 15-19, 2010, pp. 1-91.

NTT DOCOMO, CATT, Ericsson, ST-Ericsson, Huawei, Panasonic, Nokia, NSN, Qualcomm Incorporated, Samsung, LGE, "PUCCH A/N formats for Rel-10", 3GPP TSG RAN WG1 Meeting #62, R1-105016, Madrid, Spain, Aug. 23-27, 2010, p. 1.

Samsung, Alcatel Lucent, Alcatel Lucent, Shanghai Bell, Motorola, NEC, Panasonic, "WF on TDD Ack/Nack in Rel-10", TSG-RAN WG1 Meeting #63, R1-106487, Jacksonville, USA, Nov. 15-19, 2010, pp. 1-2.

Samsung, CATT, ETRI, Panasonic, Ericsson, ST-Ericsson, LG-Ericsson, LGE, InterDigital, MediaTek, Huawei, NTT DOCOMO, Potevio, Alcatel-Lucent, Alc.-Luc. Shanghai Bell, RIM, Sharp, "Way Forward on PUCCH", 3GPP TSG RAN WG1Mtng. #62, R1-105040, Madrd, Sp., Aug. 23-27, 2010. pp. 1-2.

* cited by examiner

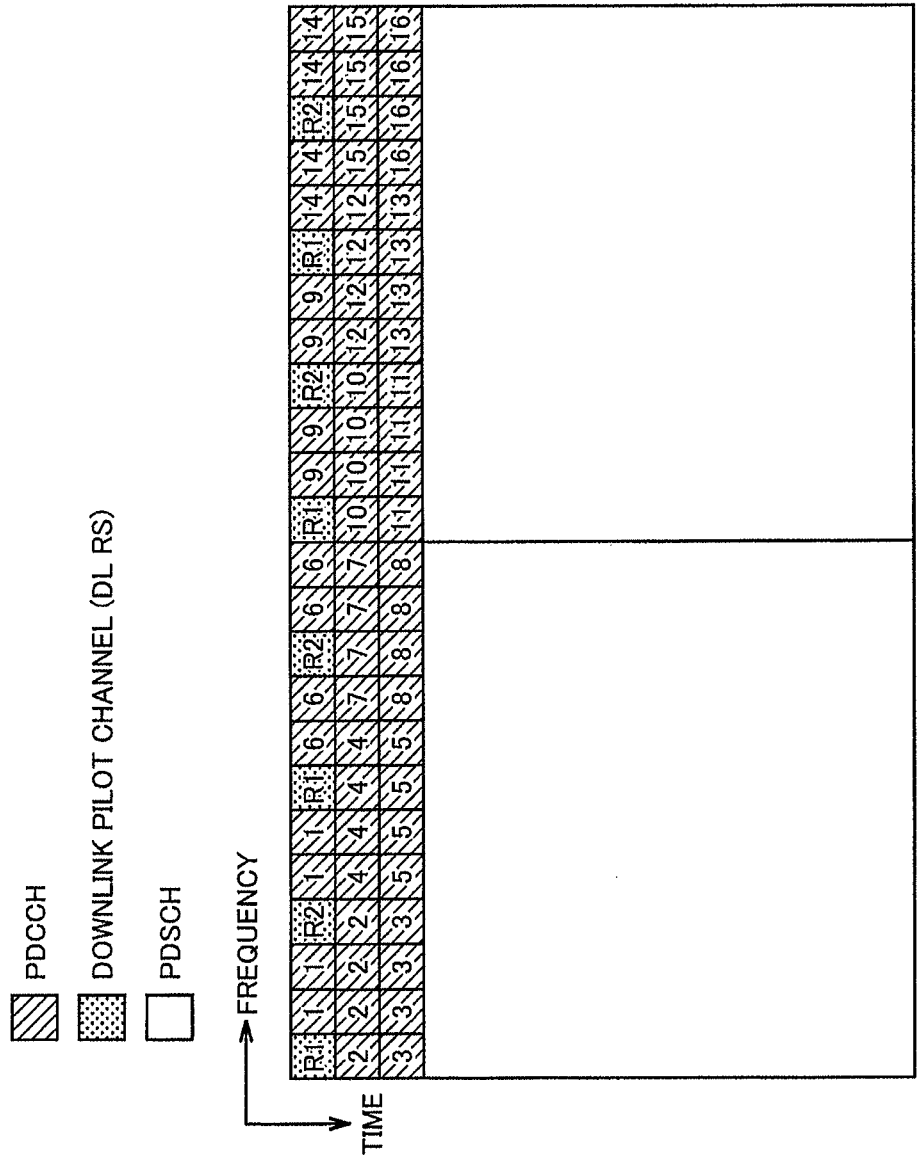

FIG.7

| PUCCH 1 | PRB pair 1 | FREQUENCY DOMAIN Code 1 | TIME DOMAIN Code 1 |
|---|---|---|---|
| PUCCH 2 | PRB pair 1 | FREQUENCY DOMAIN Code 1 | TIME DOMAIN Code 2 |
| PUCCH 3 | PRB pair 1 | FREQUENCY DOMAIN Code 1 | TIME DOMAIN Code 3 |
| PUCCH 4 | PRB pair 1 | FREQUENCY DOMAIN Code 2 | TIME DOMAIN Code 1 |
| PUCCH 5 | PRB pair 1 | FREQUENCY DOMAIN Code 2 | TIME DOMAIN Code 2 |
| PUCCH 6 | PRB pair 1 | FREQUENCY DOMAIN Code 2 | TIME DOMAIN Code 3 |
| PUCCH 7 | PRB pair 1 | FREQUENCY DOMAIN Code 3 | TIME DOMAIN Code 1 |
| PUCCH 8 | PRB pair 1 | FREQUENCY DOMAIN Code 3 | TIME DOMAIN Code 2 |
| PUCCH 9 | PRB pair 1 | FREQUENCY DOMAIN Code 3 | TIME DOMAIN Code 3 |
| PUCCH 10 | PRB pair 1 | FREQUENCY DOMAIN Code 4 | TIME DOMAIN Code 1 |
| PUCCH 11 | PRB pair 1 | FREQUENCY DOMAIN Code 4 | TIME DOMAIN Code 2 |
| PUCCH 12 | PRB pair 1 | FREQUENCY DOMAIN Code 4 | TIME DOMAIN Code 3 |
| PUCCH 13 | PRB pair 2 | FREQUENCY DOMAIN Code 1 | TIME DOMAIN Code 1 |
| PUCCH 14 | PRB pair 2 | FREQUENCY DOMAIN Code 1 | TIME DOMAIN Code 2 |
| PUCCH 15 | PRB pair 2 | FREQUENCY DOMAIN Code 1 | TIME DOMAIN Code 3 |
| PUCCH 16 | PRB pair 2 | FREQUENCY DOMAIN Code 2 | TIME DOMAIN Code 1 |
| PUCCH 17 | PRB pair 2 | FREQUENCY DOMAIN Code 2 | TIME DOMAIN Code 2 |
| PUCCH 18 | PRB pair 2 | FREQUENCY DOMAIN Code 2 | TIME DOMAIN Code 3 |
| PUCCH 19 | PRB pair 2 | FREQUENCY DOMAIN Code 3 | TIME DOMAIN Code 1 |
| PUCCH 20 | PRB pair 2 | FREQUENCY DOMAIN Code 3 | TIME DOMAIN Code 2 |
| PUCCH 21 | PRB pair 2 | FREQUENCY DOMAIN Code 3 | TIME DOMAIN Code 3 |
| PUCCH 22 | PRB pair 2 | FREQUENCY DOMAIN Code 4 | TIME DOMAIN Code 1 |
| PUCCH 23 | PRB pair 2 | FREQUENCY DOMAIN Code 4 | TIME DOMAIN Code 2 |
| PUCCH 24 | PRB pair 2 | FREQUENCY DOMAIN Code 4 | TIME DOMAIN Code 3 |

FIG.10

| 1st ACK/NACK | 2nd ACK/NACK | 3rd ACK/NACK | 4th ACK/NACK | Resource | QPSK |
|---|---|---|---|---|---|
| ACK | ACK | ACK | ACK | Resource 2 | −1 |
| ACK | NACK | ACK | ACK | Resource 3 | −1 |
| NACK | ACK | ACK | ACK | Resource 2 | −1 |
| NACK | NACK | ACK | ACK | Resource 4 | −1 |
| ACK | ACK | ACK | NACK | Resource 2 | +j |
| ACK | NACK | ACK | NACK | Resource 3 | +j |
| NACK | ACK | NACK | NACK | Resource 2 | +j |
| NACK | NACK | NACK | ACK | Resource 4 | −j |
| ACK | ACK | NACK | ACK | Resource 3 | −j |
| ACK | NACK | NACK | ACK | Resource 3 | −j |
| NACK | ACK | NACK | NACK | Resource 4 | +j |
| NACK | NACK | NACK | NACK | Resource 4 | −1 |
| ACK | ACK | NACK | NACK | Resource 1 | −j |
| ACK | NACK | NACK | NACK | Resource 1 | −1 |
| NACK | NACK | NACK | NACK | Resource 1 | +1 |

| NUMBER OF CANDIDATE RESOURCES (NUMBER OF 2ND RECEIPT ACKNOWLEDGEMENTS) | PARAMETER VALUE RELATED TO TRANSMIT POWER [Db] |
|---|---|
| N1 | X1 |
| N2 | X2 |
| N3 | X3 |
| N4 | X4 |

MOBILE STATION DEVICE, COMMUNICATION SYSTEM, COMMUNICATION METHOD AND INTEGRATED CIRCUIT

TECHNICAL FIELD

The present invention relates to a mobile station device, a communication system, a communication method and an integrated circuit, allowing, in a communication system including a plurality of mobile station devices and a base station device, the base station device to appropriately obtain information from an uplink signal transmitted from a mobile station device, by controlling transmit power of uplink signals.

BACKGROUND ART

Evolutions of wireless network and wireless access method for cellular mobile communication (hereinafter referred to as "Long Term Evolution (LTE)" or "Evolved Universal Terrestrial Radio Access (EUTRA)") have been specified in the Third Generation Partnership Project (3GPP). In LTE, as a method of wireless communication from a base station device to a mobile station device (downlink; hereinafter also denoted as "DL"), Orthogonal Frequency Division Multiplexing (OFDM), which is a multi-carrier transmission method, is used. Further, in LTE, as a method of communication from a mobile station device to the base station device (uplink, hereinafter also denoted as "UL"), SC-FDMA (Single-Carrier Frequency Division Multiple Access), which is a single-carrier transmission method, is used. In LTE, DFT-Spread OFDM (Discrete Fourier Transform-Spread OFDM) is used as a type of SC-FDMA.

In 3GPP, wireless network and wireless access method realizing data communication of higher speed (hereinafter referred to as "Long Term Evolution-Advanced (LTE-A)" or "Advanced Evolved Universal Terrestrial Radio Access (A-EUTRA)" utilizing wider frequency band than LTE have been considered. LTE-A must realize backward compatibility with LTE. LTE-A must satisfy the requirements that a base station device supporting LTE-A be capable of simultaneous communication with a mobile station device supporting LTE-A and a mobile station device supporting LTE, and that a mobile station device supporting LTE-A be capable of communication with a base station supporting LTE-A as well as a base station supporting LTE. In order to satisfy these requirements, LTE-A is supposed to support at least the same channel configuration as LTE.

A channel means a medium used for signal transmission. A channel used in a physical layer is referred to as a "physical channel," and a channel used in a media access (Media Access Control: MAC) layer is referred to as a "logical channel." There are various types of physical channels, including: Physical Downlink Shared CHannel (PDSCH) used for transmitting/receiving downlink data and control information; Physical Downlink Control CHannel (PDCCH) used for transmitting downlink control information; Physical Uplink Shared CHannel (PUSCH) used for transmitting/receiving uplink data and control information; Physical Uplink Control CHannel (PUCCH) used for transmitting/receiving control information; Synchronization CHannel (SCH) used for establishing downlink synchronization; Physical Random Access CHannel (PRACH) used for establishing uplink synchronization; and Physical Broadcast CHannel (PBCH) used for transmitting downlink system information. A mobile station device or a base station device places and transmits signals generated from control information and data on these physical channels.

Data transmitted through the physical downlink shared channel or the physical uplink shared channel is referred to as a "transport block."

Control information placed on the physical uplink control channel is referred to as "Uplink Control Information" (UCI). The uplink control information may include (1) control information indicating an acknowledgement (ACK) or a negative acknowledgement (NACK) of receipt of data placed on the physical downlink shared channel (receipt acknowledgment; ACK/NACK), (2) control information indicating request for allocation of uplink resources (Scheduling Request: SR), and (3) control information indicating downlink reception quality (hereinafter also referred to as "channel quality") (Channel Quality Indicator: CQI).

LTE-A proposes a technique of using a plurality of frequency bands of the same channel structure as LTE (hereinafter referred to as "component carrier: CC" or component frequency band) as one frequency band (wider frequency band) (this technique is referred to as "spectrum aggregation," "carrier aggregation" or "frequency aggregation"). Specifically, in communication utilizing the carrier aggregation, each downlink component carrier (hereinafter also denoted as "DL CC") transmits/receives a downlink physical channel, and each uplink component carrier (hereinafter also referred to as "UL CC") transmits/receives an uplink physical channel. Namely, carrier aggregation is a technique allowing the base station and mobile station devices to simultaneously transmit/receive signals through a plurality of physical channels, using a plurality of component carriers.

In LTE-A, the coverage for communication by a base station device using one frequency band is referred to as a "cell." Carrier aggregation represents communication using a plurality of cells using a plurality of frequency bands, and hence, it is also referred to as "cell aggregation." In cell aggregation, a plurality of cells are defined as either one of two different types of cells. Specifically, one cell is defined as a primary cell (Pcell), and other cells are defined as secondary cells (Scell). A base station device independently sets the primary and secondary cells for each mobile station device where cell aggregation is adopted.

A primary cell is always configured with a set (combination) of one downlink component carrier and one uplink component carrier. A secondary cell is configured with at least one downlink component carrier, and it may or may not be configured with an uplink component carrier. The component carrier used in the primary cell is referred to as a "primary component carrier (PCC)." The component carrier used in the secondary cell is referred to as a "secondary component carrier (SCC)." In the primary and secondary cells, data communication using physical downlink shared channel and physical uplink shared channel is executed commonly, while various other processes are executed independently.

Briefly stated, a plurality of processes are executed only by the primary cell and not by the secondary cell or cells. By way of example, acquisition of system information and determination of radio link failure (RLF) are executed on the downlink, and execution of random access procedure using physical random access channel and transmission/reception of uplink control information using physical uplink control channel are executed on the uplink, of the primary cell. Basically, all processes that are executed in LTE without using cell aggregation are done by the primary cell, while processes other than data communication are not executed by the secondary cell.

A mobile station device transmits control information (receipt acknowledgement) indicating either a positive or negative acknowledgment of the data received through a physical downlink shared channel, using a physical uplink control channel. Based on the receipt acknowledgement received from the mobile station device, the base station device controls re-transmission of data that has been transmitted to the mobile station device, using the physical downlink shared channel. In LTE-A using cell aggregation, the base station device can transmit data to mobile station devices using a plurality of physical downlink shared channels at one time. The mobile station device that has received data through the plurality of physical downlink shared channels with cell aggregation must send a plurality of receipt acknowledgements to the base station device at one time. According to LTE, a base station device can transmit data to a mobile station device using only one physical downlink shared channel at one time, and the mobile station device that has received the data through one physical downlink shared channel sends one receipt acknowledgement to the base station device using the physical uplink control channel. In LTE-A, a new method of transmission has been studied to enable the mobile station device to send a plurality of receipt acknowledgements to the base station device (Non-Patent Literature 1).

More specifically, a method of transmission (ACK/NACK channel selection, PUCCH format 1b with channel selection) is under review as a new method of transmission, in which implicit receipt acknowledgement information is provided by the mobile station device selecting a resource of physical uplink control channel used for signal transmission from among a plurality of candidate resources of physical uplink control channel, in accordance with the receipt acknowledgement information and, in addition, explicit receipt acknowledgement information is provided by the mobile station device transmitting a modulated signal on the physical uplink control channel using the selected resource. The mobile station device determines the candidate resources used for resource selection of physical uplink control channel based on the detected physical downlink control channel.

According to LTE, resource allocation of physical uplink control channel used for transmitting receipt acknowledgement is implicitly carried out based on the resources used for the physical downlink control channel. Such resource allocation is referred to as "implicit resource allocation." The "implicit resource allocation" means that information dedicated for resource allocation is not used, and resource allocation is done using pieces of information intended for other purposes. On the other hand, "explicit resource allocation" means that resource allocation is done using information dedicated only for resource allocation.

The physical downlink control channel consists of a plurality of control channel elements (hereinafter also denoted as "CCEs"). The control channel element is a unit of resources used for the physical downlink control channel. A corresponding relation between the resources of the physical uplink control channel used for transmitting receipt acknowledgement and the control channel elements is established in advance. CCEs used between a base station device and a mobile station device have numbers allocated to identify respective CCEs. Numbering of CCEs is done in accordance with a predetermined rule.

The physical downlink control channel consists of an aggregated plurality of CCEs (CCE aggregation). The number of CCEs forming the aggregation will be hereinafter referred to as "CCE aggregation number." The CCE aggregation number forming a physical downlink control channel is set by the base station device in accordance with code rate set for the physical downlink control channel and the number of bits of control information carried on the physical downlink control channel. By way of example, the base station device may form a physical downlink control channel using one CCE, may form a physical downlink control channel using two CCEs, may form a physical downlink control channel using four CCEs, or may form a physical downlink control channel using eight CCEs. Typically, for a mobile station device with good channel quality, the base station device forms a physical downlink channel using a smaller number of CCEs, and for a mobile station device with poor channel quality, the base station device forms a physical downlink control channel using a larger number of CCEs. Further, for transmitting control information of smaller number of bits, the base station device forms a physical downlink control channel using a smaller number of CCEs, and for transmitting control information of larger number of bits, it forms a physical downlink control channel using a larger number of CCEs.

The physical uplink control channel used for transmitting the receipt acknowledgement is constituted of three-dimensional resources, including physical resource blocks as resources defined in frequency domain and time domain, a frequency domain code and a time domain code. Various combinations of resources of physical uplink control channel used for transmitting receipt acknowledgement in the communication system have numbers allocated thereto, for identifying each of the combinations of resources, based on a predetermined rule.

By way of example, a corresponding relation between the numbers of CCEs and the numbers of resources for the physical uplink control channel used for transmitting receipt acknowledgement is established in advance, and a CCE and a resource for the physical uplink control channel having the same number are related to each other. The mobile station device uses the resource of physical uplink control channel having the number corresponding to the CCE having the smallest number among CCEs used for the physical downlink control channel, from which control information addressed to the mobile station device itself is detected, to transmit the receipt acknowledgement for the data of the physical downlink shared channel, resource allocation of which is indicated by the physical downlink control channel. Similar to the mobile station device, the base station device recognizes the corresponding relation between the CCE numbers and the numbers of resources for the physical uplink control channel used for transmitting receipt acknowledgement, and it allocates CCEs used for the physical downlink control channel in consideration of resources allocated to the physical uplink control channel of the mobile station device. Specifically, based on the CCE used for the physical downlink control channel from which control information addressed to the mobile station device itself is detected, the mobile station device recognizes the resource for the physical uplink control channel used for transmitting the receipt acknowledgement allocated to the device itself.

In LTE-A using cell aggregation, a method of allocating candidate resources for the physical uplink control channel corresponding to the new transmission method has been studied, in connection with the receipt acknowledgement (Non-Patent Literature 2). In the following, allocation of candidate resources used for resource selection of the physical uplink control channel, when receipt acknowledgement is transmitted using ACK/NACK channel selection, which is under review, will be described. Consider transmission of the physical downlink control channel in a primary cell. As in LTE, resources of the physical uplink control channel having the corresponding relation to the CCEs of physical downlink control channel are allocated to the mobile station device as candidate resources in implicit manner. When the physical downlink control channel is transmitted in a primary cell, information related to resource allocation included in the physical downlink control channel indicates the resources of physical downlink shared channel of the primary cell or a secondary cell.

If the physical downlink control channel is transmitted in a secondary cell, different from LTE, a resource of the physical uplink control channel is allocated to a mobile station device as a candidate resource in an explicit manner using prescribed signaling. As the prescribed signaling, a method of explicitly allocating candidate resources of physical uplink control channel using RRC (Radio Resource Control) signaling, and a method of explicitly allocating candidate resources of physical uplink control channel using control information of the physical downlink control channel have been considered.

In the method of explicitly allocating the candidate resources of physical uplink control channel using RRC signaling, before starting data communication with cell aggregation, candidate resources for the physical uplink control channel are already allocated to the mobile station device. When the mobile station device detects a physical downlink control channel in a secondary cell, in other words, when it recognizes transmission of the physical downlink control channel in a secondary cell, it uses a resource of the physical uplink control channel allocated in advance by RRC signaling, as the candidate resource used for selecting a physical uplink control channel for implicitly indicating the information of receipt acknowledgement.

In the method in which candidate resources of physical uplink control channel are explicitly allocated using control information of the physical downlink control channel, upon detection of the physical downlink control channel in a secondary cell, a mobile station device uses a resource of the physical uplink control channel indicated by the control information of the physical downlink control channel detected in the secondary cell, as the candidate resource used for selection of the physical uplink control channel for implicitly indicating the information of receipt acknowledgement. In the method in which candidate resources of the physical uplink control channel are explicitly allocated using the control information of physical downlink control channel, a plurality of potential candidate resources for the physical uplink control channel are allocated in advance to the mobile station device by RRC signaling, and using the control information of physical downlink control channel, one of the plurality of potential candidate resources set by the RRC signaling is indicated.

As to the control information indicating the candidate resources for the physical uplink control channel included in the physical downlink control channel, control information generally used for other purposes may be utilized. Here, the control information is utilized such that in a first situation, a control information field is interpreted as a first piece of control information, in a second situation, the control information field is interpreted as a second piece of control information, the first situation is different from the second situation, and the first piece of control information is different from the second piece of control information. By way of example, if the physical downlink control channel is transmitted in a primary cell, a control information field may be interpreted as a piece of information indicating a transmit power control value of a physical uplink control channel. If the physical downlink control channel is transmitted in a secondary cell, the control information field mentioned above may be interpreted as a piece of control information indicating candidate resources used for selecting a physical uplink control channel, selected for implicitly indicating the information of receipt acknowledgement.

In LTE-A, for transmitting receipt acknowledgement, linear control of transmit power in accordance with the number of transport blocks received by a plurality of physical downlink shared channels has been considered.

Further, in LTE-A, application of time domain bundling to ACK/NACK channel selection has been considered (Non-Patent Literature 3). In TDD (Time Division Duplex), a mobile station device transmits, using a single uplink subframe, a receipt acknowledgement for the data of a plurality of downlink subframes received using a physical downlink shared cannel. Here, execution of a logical multiplication by the mobile station device on a plurality of receipt acknowledgements for the data received in a plurality of subframes is referred to as "time domain bundling." ACK/NACK bundling refers to a process executed by a mobile station device, of performing a logical multiplication on a plurality of receipt acknowledgements and thereby generating a piece of information having smaller number of bits (for example, 1 bit) than the information before execution of the multiplication. By way of example, if the plurality of receipt acknowledgements are all positive, the mobile station device generates one positive acknowledgement as a result of logical multiplication, and transmits it to the base station device. If one negative acknowledgement is included among the plurality of receipt acknowledgements, the mobile station device generates a negative acknowledgement as a result of logical multiplication, and transmits it to the base station device.

The mobile station device transmits the receipt acknowledgement as a result of logical multiplication of the receipt acknowledgements for the data of a plurality of downlink subframes to the base station device through the physical uplink control channel. Using cell aggregation, the mobile station device applies time domain bundling for the receipt acknowledgements for data of a plurality of subframes of each cell, selects a resource for the physical uplink control channel used for transmitting a signal in accordance with the information of a plurality of receipt acknowledgements of a plurality of cells on which logical multiplication has been executed, and using the selected resource, transmits a modulated signal.

The mobile station device determines candidate resources used for resource selection for the physical uplink control channel, based on the physical downlink control channel detected in the subframe to which data is allocated most recently, in each cell.

For a cell to which candidate resources are implicitly allocated, resources corresponding to the CCE used for the physical downlink control channel corresponding to the data detected in the subframe to which the data has been allocated most recently in the cell, is determined by the mobile station device to be the candidate resources, and the thus determined resources are used for the resource selection process for the physical uplink control channel.

For a cell to which candidate resources are explicitly allocated, resources indicated by the control information of the physical downlink control channel corresponding to the data detected in the subframe to which the data has been allocated most recently in the cell, are determined by the mobile station device to be the candidate resources, and the thus determined resources are used for the resource selection process for the physical uplink control channel. Alternatively, for a cell to which candidate resources are explicitly allocated, resources allocated in advance by RRC signaling to the physical downlink control channel corresponding to the data detected in the subframe to which the data has been allocated most recently in the cell, are determined by the mobile station device to be the candidate resources, and the thus determined resources are used for the resource selection process for the physical uplink control channel.

Further, in LTE-A, application of spatial bundling to ACK/NACK channel selection has been considered. In LTE-A, it has been proposed that a base station device applies MIMO (Multi-Input Multi-Output) spatial multiplexing, so that a plurality of data are subjected to spatial multiplexing using one physical downlink shared channel, and signals containing a plurality of spatially-multiplexed data are transmitted to a mobile station device. The mobile station device transmits receipt acknowledgements for the plurality of spatially-multiplexed data on the physical downlink shared channel, through the uplink. Here, execution of the logical multiplication on the plurality of receipt acknowledgements for the data received through one same physical downlink shared channel by the mobile station device is referred to as "spatial bundling." The mobile station device transmits the receipt acknowledgement as a result of logical multiplication to the base station device through the physical uplink control channel.

CITATION LIST

Non Patent Literature

NPL 1: 3GPP TSG RAN1 #62, Madrid, Spain, 23-27 Aug. 2010, R1-105016 "PUCCH A/N formats for Rel-10"
NPL 2: 3GPP TSG RAN1 #62, Madrid Spain, 23-27 Aug. 2010, R1-105040 "Way Forward on PUCCH Resource Allocation"
NPL 3: 3GPP TSG RAN1 #63, Jacksonville USA, 15-19 Nov. 2010, R1-106487 "WF on TDD Ack/Nack in Rel-10"

SUMMARY OF INVENTION

Technical Problem

As in an environment where ACK/NACK channel selection only is applied, in an environment where time domain bundling, spatial bundling is applied to ACK/NACK channel selection, it is necessary to realize appropriate quality for transmitting/receiving receipt acknowledgement. If the quality appropriate for the receipt acknowledgement is not realized, the base station device cannot properly obtain the acknowledgement information. If the base station device erroneously determines an acknowledgement which is actually a positive acknowledgement to be a negative acknowledgement, unnecessary re-transmission through physical downlink shared channel results, lowering efficiency of the communication system. If the base station device erroneously determines an acknowledgement which is actually a negative acknowledgement to be a positive acknowledgement, re-transmission becomes necessary in an upper layer, and appropriate reception of data by the mobile station device delays. Thus, satisfactory data communication cannot be realized.

As in an environment where ACK/NACK channel selection only is applied, in an environment where time domain bundling and/or spatial bundling is applied to ACK/NACK channel selection, if transmit power is linearly controlled in accordance with the number of received transport blocks, unnecessarily high transmit power may possibly be used, causing increased interference. Thus, efficiency of the communication system possibly decreases.

The present invention was made in view of the foregoing, and its object is to provide a mobile station device, a communication system, a communication method and an integrated circuit enabling, in a communication system including a plurality of mobile station devices and a base station device, appropriate acquisition of information by the base station device from the uplink signals transmitted from the mobile station devices, by controlling transmit power for uplink signals.

Solution to Problem (1) According to an embodiment, the present invention provides a mobile station device set to communicate with a base station device over a plurality of subframes using a plurality of cells. Where ACK/NACK for reception of data transmitted from the base station device is to be transmitted to the base station device using a PUCCH and the PUCCH is set to select one resource from a plurality of PUCCH candidate resources to transmit with prescribed transmit power using the selected resource, the mobile station device determines a parameter value related to the prescribed transmit power, in accordance with the number of cells used for communicating the data over the plurality of subframes.

(2) The mobile station device described above executes a logical operation on ACKs/NACKs for data of the plurality of subframes, and transmits ACK/NACK information resulting from the execution of the logical operation using the selected resource.

(3) According to another embodiment, the present invention provides a communication system including a base station device and a mobile station device set to communicate with the base station device over a plurality of subframes using a plurality of cells. The base station device receives a signal transmitted from the mobile station device. Where ACK/NACK for reception of data transmitted from the base station device is to be transmitted to the base station device using a PUCCH and the PUCCH is set to select one resource from a plurality of PUCCH candidate resources to transmit with prescribed transmit power using the selected resource, the mobile station device determines a parameter value related to the prescribed transmit power in accordance with the number of cells used for communicating the data over the plurality of subframes.

(4) In the communication system described above, the mobile station device executes a logical operation on ACKs/NACKs for data of the plurality of subframes, and transmits ACK/NACK information resulting from the execution of the logical operation using the selected resource.

(5) According to a still further embodiment, the present invention provides a communication method for a mobile station device set to communicate with a base station device over a plurality of subframes using a plurality of cells. The communication method includes, where ACK/NACK for reception of data transmitted from the base station device is to be transmitted to the base station device using a PUCCH and the PUCCH is set to select one resource from a plurality of PUCCH candidate resources to transmit with prescribed transmit power using the selected resource, the step of determining a parameter value related to the prescribed transmit power in accordance with the number of cells used for communicating the data over the plurality of subframes.

(6) In the communication method described above, the mobile station device executes a logical operation on ACKs/NACKs for data of the plurality of subframes, and transmits ACK/NACK information resulting from the execution of the logical operation using the selected resource.

(7) According to a still further embodiment, the present invention provides an integrated circuit mounted on a mobile station device set to communicate with a base station device over a plurality of subframes using a plurality of cells, to cause the mobile station device to perform a plurality of functions. Where ACK/NACK for reception of data transmitted from the base station device is to be transmitted to the base station device using a PUCCH and the PUCCH is set to select one resource from a plurality of PUCCH candidate resources to transmit with prescribed transmit power using the selected resource, the integrated circuit causes the mobile station device to perform a series of functions including a function of determining a parameter value related to the prescribed transmit power in accordance with the number of cells used for communicating the data over the plurality of subframes.

(8) The mobile station device having the above-described integrated circuit mounted thereon executes a logical operation on ACKs/NACKs for data of the plurality of subframes, and transmits ACK/NACK information resulting from the execution of the logical operation using the selected resource.

(9) According to a still further embodiment, the present invention provides a mobile station device transmitting a signal to a base station device. The device includes: a first receipt acknowledgement generating unit for generating first receipt acknowledgements for downlink data received from the base station device in a plurality of frequency domains and in a plurality of time domains; a second receipt acknowledgement generating unit for generating a second receipt acknowledgement by executing a logical operation on a plurality of first receipt acknowledgements; a resource selecting unit for selecting a resource on which a signal indicative of contents of the second receipt acknowledgement is placed, based on a plurality of second receipt acknowledgements; and a transmitting unit for transmitting the signal indicative of the contents of the second receipt acknowledgement using the resource selected by the resource selecting unit, while controlling transmit power in accordance with the number of candidate resources used for resource selection by the resource selecting unit.

As described above, the mobile station device sets the parameter value related to the transmit power in accordance with the number of candidate resources used for selecting a resource for ACK/NACK channel selection. Using the set parameter value, the mobile station device controls transmit power of PUCCH used for transmitting the signal generated from the contents of a plurality of second receipt acknowledgements, and transmits the PUCCH. Thus, use of unnecessarily high transmit power can be avoided and, hence, increased interference can be avoided. The base station device can obtain the information of a plurality of second receipt acknowledgements with appropriate reception characteristic, from the received PUCCH.

(10) In the mobile station device described above, the second receipt acknowledgement generating unit executes a logical operation on a plurality of first receipt acknowledgements for a plurality of downlink data of the same frequency domain and of a plurality of time domains.

As described above, where ACK/NACK channel selection and time domain bundling are executed, the mobile station device sets the parameter value related to the transmit power in accordance with the number of candidate resources used for selecting the resource for ACK/NACK channel selection. Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain the information of a plurality of second receipt acknowledgements with appropriate reception characteristic, from the received PUCCH.

(11) In the mobile station device described above, the second receipt acknowledgement generating unit executes a logical operation on a plurality of first receipt acknowledgements for a plurality of downlink data of the same frequency domain and of the same time domain.

As described above, where ACK/NACK channel selection and spatial bundling are executed, the mobile station device sets the parameter value related to the transmit power in accordance with the number of candidate resources used for selecting the resource for ACK/NACK channel selection. Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain the information of a plurality of second receipt acknowledgements with appropriate reception characteristic, from the received PUCCH.

(12) According to a still further embodiment, the present invention provides a mobile station device adapted to transmit a signal to a base station device. The mobile station device includes: a first receipt acknowledgement generating unit for generating first receipt acknowledgements for downlink data received from the base station device in a plurality of frequency domains and in a plurality of time domains; a second receipt acknowledgement generating unit for generating a second receipt acknowledgement by executing a logical operation on a plurality of first receipt acknowledgements for a plurality of downlink data of same frequency domain and same time domain; a resource selecting unit for selecting a resource on which a signal indicative of contents of the second receipt acknowledgement is placed, based on a plurality of second receipt acknowledgements; and a transmitting unit for transmitting the signal indicative of the contents of the second receipt acknowledgement using the resource selected by the resource selecting unit, while controlling transmit power in accordance with the number of second receipt acknowledgements.

As described above, where ACK/NACK channel selection and time domain bundling are executed, the mobile station device sets the parameter value related to the transmit power in accordance with the number of second receipt acknowledgements generated in a plurality of component carriers (cells). Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain information with appropriate reception characteristic, from the received uplink signals.

(13) According to a still further embodiment, the present invention provides a communication system including a plurality of mobile station devices and a base station device communicating with the plurality of mobile station devices. In the communication system, the base station device includes a receiving unit for receiving signals transmitted from the mobile station devices. The mobile station device includes: a first receipt acknowledgement generating unit for generating first receipt acknowledgements for downlink data received from the base station device in a plurality of frequency domains and in a plurality of time domains; a second receipt acknowledgement generating unit for generating a second receipt acknowledgement by executing a logical operation on a plurality of first receipt acknowledgements; a resource selecting unit for selecting a resource on which a signal indicative of contents of the second receipt acknowledgement is placed, based on a plurality of second receipt acknowledgements; and a transmitting unit for transmitting a signal indicative of the contents of the second receipt acknowledgement using the resource selected by the resource selecting unit, while controlling transmit power in accordance with the number of candidate resources used for resource selection by the resource selecting unit.

As described above, the mobile station device sets the parameter value related to the transmit power in accordance with the number of candidate resources used for selecting the resource of ACK/NACK channel selection. Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain the information of a plurality of second receipt acknowledgements with appropriate reception characteristic, from the received PUCCH.

(14) According to a still further embodiment, the present invention provides a communication system including a plurality of mobile station devices and a base station device communicating with the plurality of mobile station devices. In the communication system, the base station device includes a receiving unit for receiving signals transmitted from the mobile station devices. The mobile station device includes: a first receipt acknowledgement generating unit for generating first receipt acknowledgements for downlink data received from the base station device in a plurality of frequency domains and in a plurality of time domains; a second receipt acknowledgement generating unit for generating a second receipt acknowledgement by executing a logical operation on a plurality of first receipt acknowledgements for a plurality of downlink data of same frequency domain and same time domain; a resource selecting unit for selecting a resource on which a signal indicative of contents of the second receipt acknowledgement is placed, based on a plurality of second receipt acknowledgements; a parameter setting unit for setting a parameter value related to transmit power in accordance with the number of second receipt acknowledgements; and a transmitting unit for transmitting a signal indicative of the contents of the second receipt acknowledgement using the resource selected by the resource selecting unit, while controlling transmit power for transmitting the signal indicative of the contents of the second receipt acknowledgement in accordance with the parameter value set by the parameter setting unit.

As described above, where ACK/NACK channel selection and time domain bundling are executed, the mobile station device sets a parameter value related to the transmit power in accordance with the number of second receipt acknowledgements generated in a plurality of component carriers (cells). Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain information with appropriate reception characteristic, from the received uplink signals.

(15) According to a still further embodiment, the present invention provides a communication method used for a mobile station device transmitting signals to a base station. The communication method includes the steps of: generating first receipt acknowledgements for downlink data received from the base station device in a plurality of frequency domains and in a plurality of time domains; generating a second receipt acknowledgement by executing a logical operation on a plurality of first receipt acknowledgements; selecting a resource on which a signal indicative of contents of the second receipt acknowledgement is placed, based on a plurality of second receipt acknowledgements; and transmitting the signal indicative of the contents of the second receipt acknowledgement using the selected resource, while controlling the transmit power in accordance with the number of resources used for resource selection.

As described above, the mobile station device sets the parameter value related to the transmit power in accordance with the number of candidate resources used for selecting the resource of ACK/NACK channel selection. Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain the information of a plurality of second receipt acknowledgements with appropriate reception characteristic, from the received PUCCH.

(16) According to a still further embodiment, the present invention provides a communication method used for a mobile station device transmitting signals to a base station. The communication method includes the steps of: generating first receipt acknowledgements for downlink data received from the base station device in a plurality of frequency domains and in a plurality of time domains; generating a second receipt acknowledgement by executing a logical operation on a plurality of first receipt acknowledgements for a plurality of downlink data of same frequency domain and same time domain; selecting a resource on which a signal indicative of contents of the second receipt acknowledgement is placed, based on a plurality of second receipt acknowledgements; and transmitting the signal indicative of the contents of the second receipt acknowledgement using the selected resource, while controlling transmit power in accordance with the number of generated second receipt acknowledgements.

As described above, where ACK/NACK channel selection and time domain bundling are executed, the mobile station device sets a parameter value related to the transmit power in accordance with the number of second receipt acknowledgements generated in a plurality of component carriers (cells). Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain information with appropriate reception characteristic, from the received uplink signals.

(17) According to a still further embodiment, the present invention provides an integrating circuit mounted on a mobile station device to cause the mobile station device to perform a plurality of functions. The integrated circuit causes the mobile station device to perform a series of functions, including: a function of generating first receipt acknowledgements indicating positive or negative acknowledgement to downlink data received from the base station device in a plurality of frequency domains and in a plurality of time domains; a function of generating a second receipt acknowledgement by executing a logical operation on a plurality of first receipt acknowledgements; a function of selecting a resource on which a signal indicative of contents of the second receipt acknowledgement is placed, based on a plurality of second receipt acknowledgements; and a function of transmitting the signal indicative of the contents of the second receipt acknowledgement using the selected resource, while controlling transmit power in accordance with the number of candidate resources used for resource selection.

As described above, the mobile station device sets the parameter value related to the transmit power in accordance with the number of candidate resources used for selecting the resource of ACK/NACK channel selection. Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain the information of a plurality of second receipt acknowledgements with appropriate reception characteristic, from the received PUCCH.

(18) According to a still further embodiment, the present invention provides an integrating circuit mounted on a mobile station device to cause the mobile station device to perform a plurality of functions. The integrated circuit causes the mobile station device to perform a series of functions including: a function of generating first receipt acknowledgements for downlink data received from the base station device in a plurality of frequency domains and in a plurality of time domains; a function of generating a second receipt acknowledgement by executing a logical operation on a plurality of first receipt acknowledgements for a plurality of downlink data of same frequency domain and same time domain; a function of selecting a resource on which a signal indicative of contents of the second receipt acknowledgement is placed, based on a plurality of second receipt acknowledgements; and a function of transmitting the signal indicative of the contents of the second receipt acknowledgement using the selected resource, while controlling transmit power in accordance with the number of generated second receipt acknowledgements.

As described above, where ACK/NACK channel selection and time domain bundling are executed, the mobile station device sets a parameter value related to the transmit power in accordance with the number of second receipt acknowledgements generated in a plurality of component carriers (cells). Using the set parameter value, the mobile station device controls transmit power of PUCCH used for transmitting a signal generated from the contents of a plurality of second receipt acknowledgements, and transmits the PUCCH. Thus, use of unnecessarily high transmit power can be avoided and, hence, increased interference can be avoided. The base station device can obtain information with appropriate reception characteristic, from the received uplink signals.

Advantageous Effects of Invention

According to the present invention, the base station device can appropriately obtain information from uplink signals transmitted from the mobile station devices.

BRIEF DESCRIPTION OF DRAWINGS

FIG. 6 shows an example of resource element group arrangement in a downlink subframe of the communication system in accordance with an embodiment of the present invention.

FIG. 7 shows numbers and configuration of PUCCH resources for ACK/NACK in the communication system in accordance with an embodiment of the present invention.

FIG. 10 shows a relation between each of the ACK/NACK information, resources selected by ACK/NACK channel selection and QPSK signal points in the system in accordance with an embodiment of the present invention.

DESCRIPTION OF EMBODIMENTS

In the following, embodiments of the present invention will be described in detail with reference to the figures. First, referring to FIGS. 1 to 10, the overall picture of the communication system in accordance with an embodiment and configuration of a radio frame will be described. Next, referring to FIGS. 11 to 16, configuration of the communication system in accordance with the present embodiment will be described. Then, referring to FIGS. 17 and 18, operations and processes of the communication system in accordance with the present embodiment will be described.

<Overall Picture of the Communication System>

Figure 1:
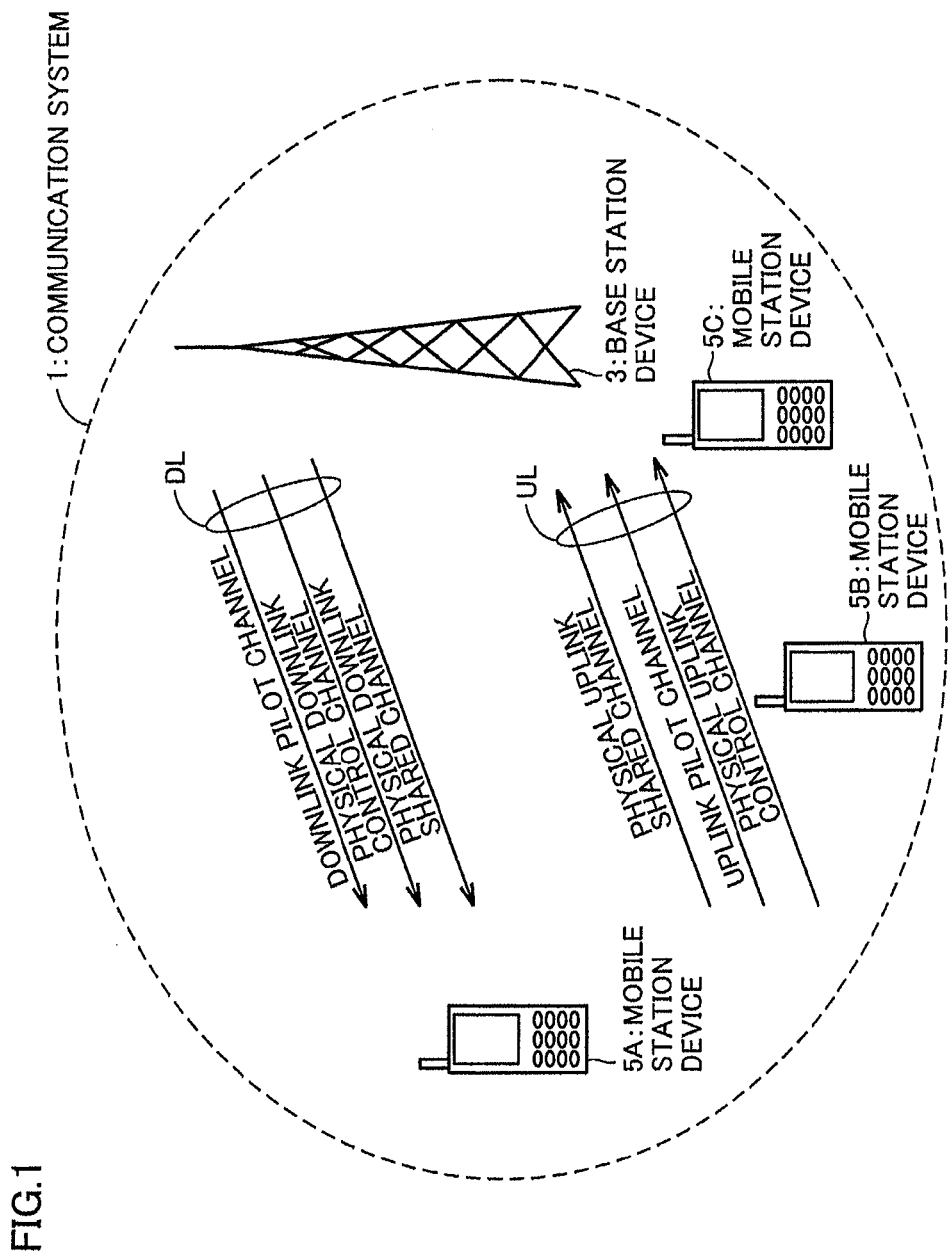
FIG. 1 is a schematic illustration showing an overall picture of the communication system in accordance with an embodiment of the present invention.

FIG. 1 is a schematic illustration showing an overall picture of the communication system in accordance with an embodiment of the present invention. In communication system 1 shown in FIG. 1, a base station device (eNodeB; NodeB) 3 communicates with a plurality of mobile station devices (UE: User Equipment) 5A, 5B and 5C. Further, FIG. 1 shows that downlink (hereinafter also denoted as "DL") as a communication direction from base station device 3 to mobile station devices 5A, 5B and 5C includes a downlink pilot channel, a physical downlink control channel (hereinafter also denoted as "PDCCH") and a physical downlink shared channel (hereinafter also denoted as "PDSCH"). Further, FIG. 1 shows that an uplink (hereinafter also denoted as "UL") as a communication direction from mobile station devices 5A, 5B and 5C to base station device 3 includes a physical uplink shared channel (hereinafter also denoted as "PUSCH"), an uplink pilot channel, and a physical uplink control channel (hereinafter also denoted as "PUCCH").

A channel means a medium used for transmitting a signal. A channel used in a physical layer is referred to as a "physical channel", and a channel used in a media access layer (Media Access Control: MAC) is referred to as a "logical channel." PDSCH is a physical channel used for transmitting/receiving downlink data and control information. PDCCH is a physical channel used for transmitting/receiving downlink control information. PUSCH is a physical channel used for transmitting/receiving uplink data and control information. PUCCH is a physical channel used for transmitting/receiving uplink control information (UCI).

UCI includes various types of information, including receipt acknowledgement (ACK/NACK) indicating a positive acknowledgement (ACK) or a negative acknowledgement (NACK) for downlink data of PDSCH, and a scheduling request (SR) indicating whether resource allocation is requested or not.

Other types of physical channels include a synchronization channel (SCH) used for establishing downlink synchronization, a physical random access channel (PRACH) used for establishing uplink synchronization, and a physical broadcast channel (PBCH) used for transmitting downlink system information. PDSCH is also used for transmitting downlink system information. Mobile station devices 5A, 5B and 5C and/or base station device 3 places and transmits signals generated from control information, data and the like on these physical channels. The data transmitted through the physical downlink shared channel or physical uplink shared channel will be referred to as "transport block." Further, an area governed by base station device 3 will be referred to as a "cell." In the following, mobile station devices 5A, 5B and 5C will be generally referred to as a mobile station device 5.

<Carrier Aggregation/Cell Aggregation>

In the communication system in accordance with an embodiment of the present invention, a plurality of frequency bands of a predetermined frequency bandwidth are used for communication (hereinafter referred to as "spectrum aggregation," "carrier aggregation" or "frequency aggregation"). Here, one frequency band is referred to as a "component carrier (CC)." More specifically, in the communication using carrier aggregation, downlink physical channel is transmitted/received in each downlink CC (hereinafter also referred to as "downlink component carrier" or "DL CC"), and uplink physical channel is transmitted/received in each uplink CC (hereinafter also referred to as an "uplink component carrier" or "UL CC"). Specifically, in the communication system in accordance with the present embodiment using carrier aggregation, base station device 3 and a plurality of mobile station devices 5 simultaneously transmit/receive signals through a plurality of physical channels using CCs, both in the uplink and downlink.

The base station device communicates using any one frequency band in one cell. Carrier aggregation realizes communication using a plurality of frequency bands among a plurality of cells, and it is also referred to as "cell aggregation." In cell aggregation, one cell is defined as a primary cell (Pcell), and other cells are defined as secondary cells (Scell). The primary and secondary cells are set independently for each mobile station device. The primary cell is always configured with a set (combination) of one downlink component carrier and one uplink component carrier. The secondary cell is configured with at least one downlink component carrier, and it may or may not include an uplink component carrier. For simplicity of description, in the present embodiment, description will be given assuming that one secondary sell includes a set of one downlink component carrier and one uplink component carrier.

The component carrier used in the primary cell is referred to as a "primary component carrier (PCC)." A component carrier used in a secondary cell is referred to as a "secondary component carrier (SCC)." In the primary and secondary cells, data communication using PDSCH and PUSCH is executed commonly, while various other processes are executed independently.

Briefly stated, a plurality of processes are executed only in the primary cell, and not in the secondary cell. By way of example, in the primary cell, acquisition of system information (system information block, hereinafter also referred to as "SIB") and determination of unsatisfactory radio quality (RLF: Radio Link Failure) are done on the downlink, and execution of random access using PRACH, transmission/reception of UCI using PUCCH and the like are done on the uplink.

<Downlink Time Frame Configuration>

Figure 2:
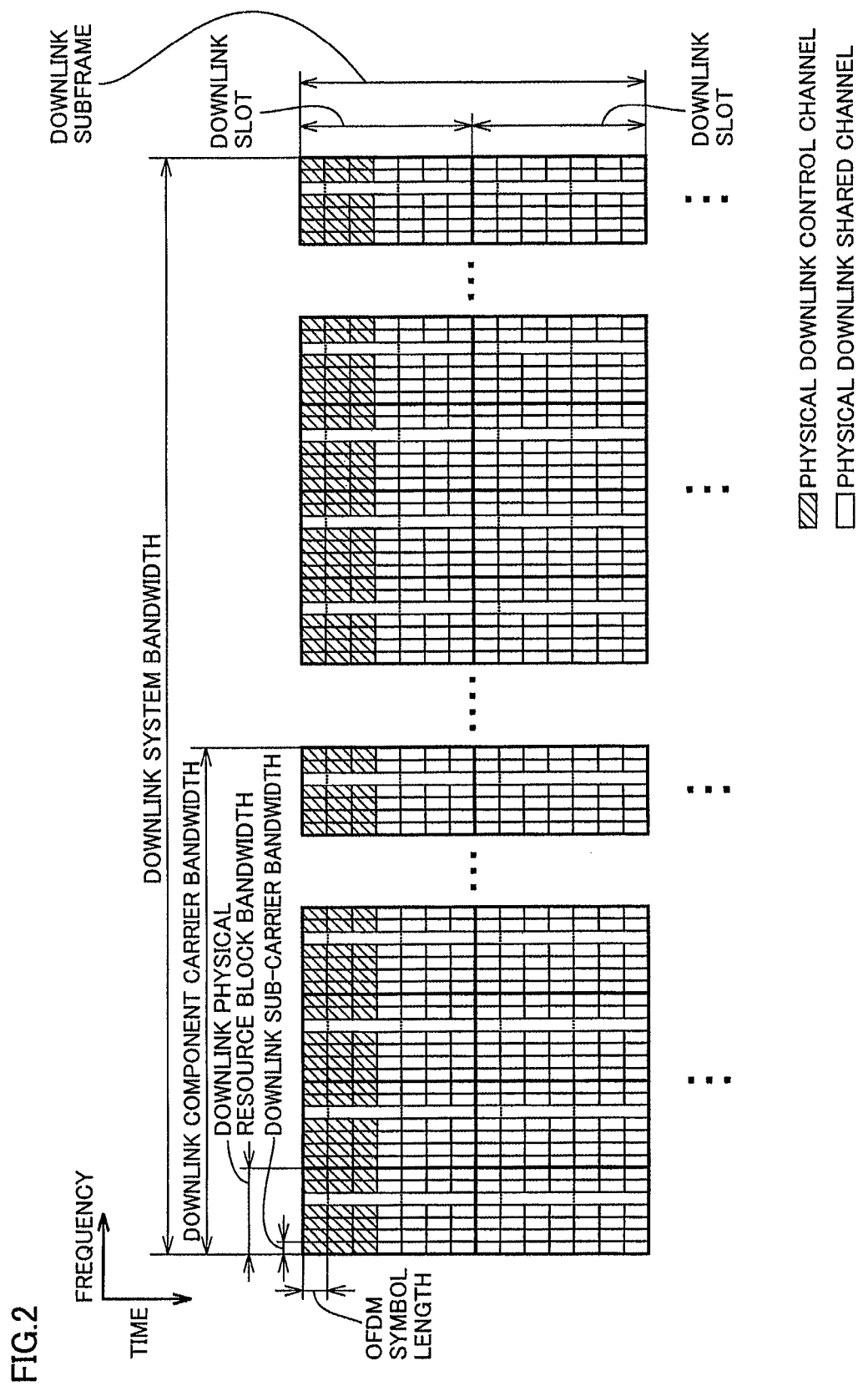
FIG. 2 shows a schematic configuration of downlink time frame from a base station device to a mobile station device, in accordance with an embodiment of the present invention.

FIG. 2 shows a schematic configuration of downlink time frame from base station device 3 to mobile station device 5, in accordance with an embodiment of the present invention. In FIG. 2, the abscissa represents time domain, and the ordinate represents frequency domain. The downlink time frame defines units for resource allocation and the like, and it consists of pairs of resource blocks (RB) (or physical resource blocks; also referred to as "PRB") (the pair is also referred to as PRB pair). One pair of downlink physical resource blocks (hereinafter referred to as "downlink physical resource block pair") consists of two physical resource blocks (hereinafter referred to as "downlink physical resource blocks") continuous in the downlink time domain.

Referring to FIG. 2, one downlink physical resource block consists of twelve sub-carriers (hereinafter referred to as "downlink sub-carriers") in the downlink frequency domain and seven OFDM (Orthogonal Frequency Division Multiplexing) symbols in the time domain. System bandwidth of the downlink (hereinafter referred to as "downlink system bandwidth") is the downlink communication bandwidth of base station device 3. System bandwidth of the downlink (hereinafter referred to as "downlink system bandwidth") consists of bandwidths of a plurality of downlink component carriers (hereinafter referred to as "downlink component carrier bandwidth") of the downlink. In communication system 1, the component carrier of downlink (hereinafter referred to as "downlink component carrier") (DL CC) is a band of predetermined frequency bandwidth. The downlink component carrier bandwidth represents the frequency bandwidth of the downlink component carrier. By way of example, downlink system bandwidth having the frequency bandwidth of 40 MHz consists of two downlink component carriers each having frequency band of 20 MHz.

In the downlink component carrier, a plurality of downlink physical resource blocks are arranged, in accordance with the downlink component carrier bandwidth. By way of example, a downlink component carrier having the frequency bandwidth of 20 MHz consists of 100 downlink physical resource blocks. Further, the downlink component carrier bandwidth represents the frequency bandwidth that can be used by mobile station device 5 supporting LTE, and the downlink system bandwidth represents the frequency bandwidth that can be used by mobile station device 5 supporting LTE-A. Mobile station device 5 supporting LTE is only capable of communication in one cell at a time, while mobile station device 5 supporting LTE-A is capable of communication in a plurality of cells at one time. The downlink component carrier bandwidth represents downlink frequency bandwidth of one cell. The downlink system bandwidth is a collection of the downlink frequency bandwidths of a plurality of cells.

In the time domain shown in FIG. 2, seven OFDM symbols form a slot (hereinafter referred to as a "downlink slot"), and two downlink slots form a subframe 10, (hereinafter referred to as a "downlink subframe"). A unit consisting of one downlink sub-carrier and one OFDM symbol is simply referred to as a "resource element (RE)" or a "downlink resource element."

Each downlink subframe includes at least a PDSCH used for transmitting information data (hereinafter referred to as "transport block") and a PDCCH used for transmitting control information. In FIG. 2, PDCCH corresponds to the first to third OFDM symbols of the downlink subframe, and PDSCH corresponds to the fourth to fourteenth OFDM symbols of the downlink subframe. The number of symbols forming PDCCH and/or the number of symbols forming PDSCH may be changed for each downlink subframe.

Though not shown in FIG. 2, a downlink pilot channel used for transmitting a reference signal (RS) for the downlink (hereinafter referred to as "downlink reference signal," "cell specific RS" or "DL RS") is arranged dispersed among a plurality of downlink resource elements. Here, the downlink reference signal is a signal known in communication system 1, used for estimating propagation path fluctuation of PDSCH and PDCCH. The number of downlink resource elements forming the downlink reference signal depends on the number of transmission antennas of base station device 3 used for communication with mobile station device 5.

One PDSCH consists of at least one downlink physical resource block in one downlink component carrier, and one PDCCH consists of a plurality of downlink resource elements in one downlink component carrier. A plurality of PDSCHs and a plurality of PDCCHs are arranged in the downlink system bandwidth.

For one mobile station device 5 supporting LTE, base station device 3 can place one PDSCH and one PDCCH including control information related to resource allocation of PDSCH in one downlink component carrier, in one downlink subframe. For one mobile station device 5 supporting LTE-A, base station device 3 can place a plurality of PDSCHs and a plurality of PDCCHs including control information related to resource allocation of PDSCH in one downlink subframe. For one mobile station device 5 supporting LTE-A, base station device 3 can place a plurality of PDCCHs including control information related to resource allocation of the plurality of PDSCHs in one downlink component carrier, while it cannot place a plurality of PDSCHs in one downlink component carrier. Base station device 3 can place different PDSCHs in different downlink component carriers.

PDCCH has signals placed thereon, which signals are generated from control information such as a piece of information representing allocation of downlink physical resource blocks for PDSCH, a piece of information representing allocation of uplink physical resource blocks for PUSCH, radio network temporary identifier (hereinafter referred to as RNTI), modulation method, code rate, re-transmission parameter, multi-antenna related information, transmit power control command (TPC command) and a piece of information representing PUCCH resources.

The control information included in PDCCH is referred to as "downlink control information" or "DCI." DCI including a piece of information representing allocation of downlink physical resource blocks for PDSCH is referred to as "downlink assignment," "DL assignment" or "downlink grant." DCI including a piece of information representing allocation of uplink physical resource blocks for PUSCH is referred to as "uplink grant" or "UL grant."

The downlink assignment includes a transmit power control command for PUCCH. The uplink assignment includes a transmit power control command for PUSCH. One PDCCH only includes a piece of information representing resource allocation of one PDSCH in one downlink component carrier or a piece of information representing resource allocation of one PUSCH in one uplink component carrier, and it does not include any information representing resource allocation of a plurality of PDSCHs or resource allocation of a plurality of PUSCHs.

<Uplink Time Frame Configuration>

Figure 3:
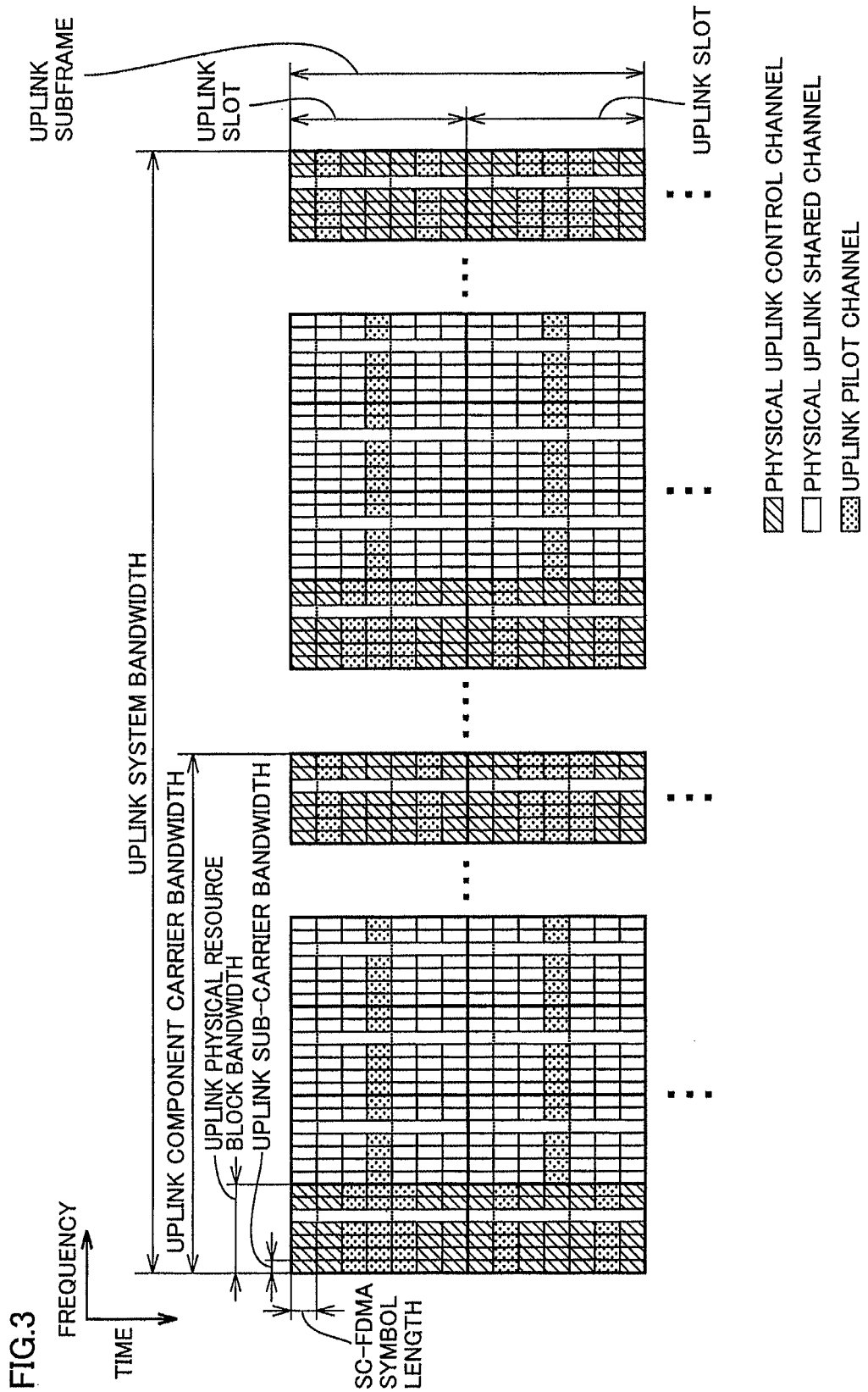
FIG. 3 shows a schematic configuration of uplink time frame from a mobile station device to a base station device, in accordance with an embodiment of the present invention.

FIG. 3 shows a schematic configuration of uplink time frame from mobile station device 5 to base station device 3 in accordance with an embodiment of the present invention. In FIG. 3, the abscissa represents time domain, and the ordinate represents frequency domain. The uplink time frame defines units for resource allocation and the like, and it consists of pairs of physical resource blocks (hereinafter referred to as "uplink physical resource block pair"), each of a predetermined width of frequency band and time slot. One pair of uplink physical resource blocks consists of two physical resource blocks (hereinafter referred to as "uplink physical resource blocks") continuous in the uplink time domain.

In FIG. 3, one uplink physical resource block consists of twelve sub-carriers (hereinafter referred to as "uplink sub-carriers") in the uplink frequency domain and seven SC-FDMA (Single-Carrier Frequency Division Multiple Access) symbols in the time domain. System bandwidth of the uplink (hereinafter referred to as "uplink system bandwidth") is the uplink communication bandwidth of base station device 3. System bandwidth of the uplink (hereinafter referred to as "uplink system bandwidth") consists of bandwidths of a plurality of uplink component carriers (hereinafter referred to as "uplink component carrier bandwidth") of the uplink. In communication system 1, the component carrier of uplink (hereinafter referred to as "uplink component carrier") (UL CC) is a band of predetermined frequency bandwidth. The uplink component carrier bandwidth represents the frequency bandwidth of the uplink component carrier. By way of example, uplink system bandwidth having the frequency bandwidth of 40 MHz consists of two uplink component carriers each having frequency band of 20 MHz.

In the uplink component carrier, a plurality of uplink physical resource blocks are arranged, in accordance with the uplink component carrier bandwidth. By way of example, an uplink component carrier having the frequency bandwidth of 20 MHz consists of 100 uplink physical resource blocks. Further, the uplink component carrier bandwidth represents the frequency bandwidth that can be used by mobile station device 5 supporting LTE, and the uplink system bandwidth represents the frequency bandwidth that can be used by mobile station device 5 supporting LTE-A. Mobile station device 5 supporting LTE is only capable of communication in one cell at a time, while mobile station device 5 supporting LTE-A is capable of communication in a plurality of cells at one time. The uplink component carrier bandwidth represents uplink frequency bandwidth of one cell. The uplink system bandwidth is a collection of the uplink frequency bandwidths of a plurality of cells.

In the time domain shown in FIG. 3, seven SC-FDMA symbols form a slot (hereinafter referred to as an "uplink slot"), and two uplink slots form a subframe (hereinafter referred to as an "uplink subframe"). A unit consisting of one uplink sub-carrier and one SC-FDMA symbol is simply referred to as a "resource element" or an "uplink resource element."

Each uplink subframe includes at least a PUSCH used for transmitting information data, and a PUCCH used for transmitting uplink control information (UCI). PUCCH is used for transmitting UCI (ACK/NACK) indicating acknowledgement (ACK) or negative acknowledgement (NACK) for the data received through PDSCH, UCI indicating at least whether uplink resource allocation is to be requested (SR: scheduling request), and UCI indicating downlink reception quality (hereinafter also referred to as channel quality) (CQI: channel quality indicator). Further, PUCCH is used for transmitting ACK/NACK when cell aggregation is not used, or ACK/NACK when cell aggregation is used. If cell aggregation is used, ACK/NACK channel selection is used as a method of transmission. Further, in that case, time domain bundling, spatial bundling is used with ACK/NACK channel selection.

When mobile station device 5 is to notify base station device 3 that uplink resource allocation is requested, mobile station device 5 transmits a signal using PUCCH for SR transmission. From the fact that a signal is detected on the PUCCH resource for SR transmission, base station device 3 recognizes that mobile station device 5 is requesting uplink resource allocation. When mobile station device 5 is to notify base station device 3 that uplink resource allocation is not requested, mobile station device 5 does not transmit any signal using PUCCH resource for SR transmission. From the fact that no signal is detected on the PUCCH resource for SR transmission, base station device 3 recognizes that mobile station device 5 is not requesting uplink resource allocation.

In PUCCH, signal configurations of different types are used when UCI of ACK/NACK is transmitted, when UCI of SR is transmitted and when UCI of CQI is transmitted.

PUCCH used for transmitting ACK/NACK has "PUCCH format 1a" or "PUCCH format 1b."

In PUCCH format 1a, BPSK (Binary Phase Shift Keying) is used as a modulation method for modulating information related to ACK/NACK. In PUCCH format 1a, information of 1 bit is explicitly indicated from a modulated signal.

In PUCCH format 1b, QPSK (Quadrature Phase Shift Keying) is used as a modulation method for modulating information related to ACK/NACK. In PUCCH format 1b, information of 2 bits is explicitly indicated from the modulated signal. In ACK/NACK channel selection, PUCCH format 1b is used.

PUCCH used for transmitting SR has "PUCCH format 1." PUCCH used for transmitting CQI has "PUCCH format 2." PUCCH used for simultaneously transmitting CQI and ACK/NACK has "PUCCH format 2a" or "PUCCH format 2b." In PUCCH format 2b, a reference signal of uplink pilot channel is multiplied by a modulated signal generated from the ACK/NACK information. In PUCCH format 2a, 1-bit information related to ACK/NACK and CQI information are transmitted. In PUCCH format 2b, 2-bit information related to ACK/NACK and CQI information are transmitted.

One PUSCH consists of at least one uplink physical resource block in one uplink component carrier, and one PUCCH consists of two uplink physical resource blocks positioned on different uplink slots and in a symmetrical relation with respect to frequency domain in one uplink component carrier. For example, in FIG. 3, in an uplink subframe of an uplink component carrier having the lowest frequency, an uplink physical resource block of lowest frequency in the first uplink slot and an uplink physical resource block of highest frequency in the second uplink slot form a pair of uplink physical resource blocks used for PUCCH.

In uplink system band, at least one PUSCH and at least one PUCCH are placed. Mobile station device 5 supporting LTE can place and transmit PUCCH and PUSCH resources on one uplink component carrier. Base station device 3 can allocate different PUCCH resources for different ACKS/NACK, SR or CQI, to mobile station device 5 supporting LTE. Mobile station device 5 supporting LIE uses only one PUCCH resource on one uplink subframe. Further, if PUCCH resource and PUSCH resource are allocated to one uplink subframe, mobile station device 5 supporting LTE transmits signals using only the PUSCH resource.

Base station device 3 can allocate one PUSCH resource for each uplink component carrier for one mobile station device 5 supporting LTE-A. If PUSCH resources are allocated to a plurality of uplink component carriers of one uplink subframe, mobile station device 5 supporting LTE-A can transmit signals using the plurality of PUSCH resources. Base station device 3 cannot allocate a plurality of PUSCH resources in one uplink component carrier of one uplink subframe. Base station device 3 can allocate different PUCCH resources to different uplink component carriers.

Base station device 3 can allocate one or more PUCCH resources to one uplink component carrier for one mobile station device 5 supporting LTE-A. If a plurality of PUCCH resources are allocated to one uplink subframe, mobile station device 5 supporting LTE-A transmits a signal using any one of the PUCCH resources. In such a case, which of the PUCCH resources is selected by mobile station device 5 is determined in accordance with a predetermined rule.

The uplink component carrier to which PUCCH resource is allocated is the uplink primary component carrier, which corresponds to the primary cell. Further, if mobile station device 5 supporting LTE-A is set not to execute simultaneous transmission of PUSCH and PUCCH and PUCCH resource and PUSCH resource are allocated to one uplink subframe, signal transmission is done using only the PUSCH resource. If mobile station device 5 supporting LTE-A is set to execute simultaneous transmission of PUSCH and PUCCH and PUCCH resource and PUSCH resource are allocated to one uplink subframe, basically, signal transmission can be done using both the PUCCH and PUSCH resources.

The uplink pilot channel is placed on different SC-FDMA symbol, depending on whether the uplink pilot channel is placed in the same uplink physical resource block as PUSCH or placed in the same uplink physical resource block as PUCCH. The uplink pilot channel is used for transmitting an uplink reference signal (UL RS). Here, the uplink reference signal is a signal known in communication system 1, used for estimating fluctuation of PUSCH and PUCCH propagation paths.

If the uplink pilot channel is placed in the same uplink physical resource block as PUSCH, it is placed on the fourth SC-FDMA symbol in the uplink slot. If the uplink pilot channel is placed in the same uplink physical resource block as PUCCH including ACK/NACK, it is placed on the third, fourth and fifth SC-FDMA symbols in the uplink slot. If the uplink pilot channel is placed in the same uplink physical resource block as PUCCH including SR, it is placed on the third, fourth and fifth SC-FDMA symbols in the uplink slot. If the uplink pilot channel is placed in the same uplink physical resource block as PUCCH including CQI, it is placed on the second and sixth SC-FDMA symbols in the uplink slot.

Though FIG. 3 shows an example in which PUCCH is placed on the uplink physical resource block on the edge of each uplink component carrier, PUCCH may be placed on the second or third uplink physical resource block from the edge of the uplink component carrier.

In PUCCH, code multiplexing in frequency domain and/or time domain is utilized. In code multiplexing in the frequency domain, each code of a code sequence is multiplied by a modulated signal modulated from uplink control information on a sub-carrier by sub-carrier basis. In code multiplexing in the time domain, each code of a code sequence is multiplied by a modulated signal modulated from uplink control information on a SC-FDMA symbol-by-symbol basis. A plurality of PUCCHs are placed on one uplink physical resource block. Different code is allocated to different PUCCH, and by the allocated codes, code multiplexing is realized in the frequency domain and/or time domain.

In PUCCH used for transmitting ACK/NACK (PUCCH format 1a, PUCCH format 1b), code multiplexing in the frequency and time domains is used. In PUCCH used for transmitting SR (PUCCH format 1), code multiplexing in the frequency and time domains is used. In PUCCH used for transmitting CQI (PUCCH format 2), code multiplexing in the frequency domain is used. For simplicity of description, details of code multiplexing of PUCCH will not be given here.

In communication system 1 in accordance with the present embodiment, by way of example, OFDM is applied to the downlink, and NxDFT-Spread OFDM is applied to the uplink. Here, NxDFT-Spread OFDM refers to a method of signal transmission/reception in which DFT-Spread OFDM is applied on each uplink component carrier as a unit. In the uplink subframe of communication system 1 using a plurality of uplink component carriers, communication is done using a plurality of processing units related to DFT-Spread OFDM transmission/reception.

In the time domain, a PDSCH resource is placed on the same downlink subframe as the downlink subframe on which a PDCCH resource including a downlink assignment used for allocating the PDSCH resource is arranged. Further, in the frequency domain, the PDSCH resource is placed on the same downlink component carrier as the PDCCH including the downlink assignment used for allocating the PDSCH resource, or on a different downlink component carrier.

DCI includes a piece of information (hereinafter referred to as "carrier indicator") indicating which downlink component carrier is carrying the PDSCH that corresponds to the downlink assignment, and/or which uplink component carrier is carrying the PUSCH that corresponds to the uplink grant.

If the downlink assignment does not include the carrier indicator, the downlink assignment corresponds to the PDSCH of the same downlink component carrier as the downlink component carrier on which the downlink assignment has been transmitted. If the uplink grant does not include the carrier indicator, the uplink grant corresponds to the PUSCH of that uplink component carrier which has a corresponding relation established in advance to the downlink component carrier on which the uplink grant has been transmitted. Information representing the corresponding relation between the downlink component carrier and the uplink component carrier used for interpreting resource allocation for uplink grant if the DCI does not include the carrier indicator is notified by system information from base station device 3 to mobile station device 5 before communication of information data.

<Radio Frame Configuration>

In the present embodiment, one radio frame consists of ten subframes including at least one downlink subframe, at least one uplink subframe and at least one special subframe.

The special subframe includes three areas, that is, DwPTS (Downlink Pilot Time Slot), GP (Guard Period) and UpPTS (Uplink Pilot Time Slot). DwPTS, GP and UpPTS are subjected to time-multiplexing. DwPTS represents an area used for transmission of signals and downlink physical channels such as PDCCH and PDSCH. UpPTS is an area used for transmission of sounding reference signal (SRS) and/or PRACH. UpPTS is not used for transmission of PUCCH and PUSCH. SRS is an uplink reference signal used by base station device 3 to estimate uplink channel quality of mobile station device 5, and it is transmitted by the last SC-FDMA symbol of the special subframe or the uplink subframe. GP is a period for mobile station device 5 and base station device 3 to switch between uplink transmission/reception and downlink transmission/reception. The number of downlink subframes, uplink subframes and special subframes forming one radio frame as well as the arrangement of these in the radio frame are set by base station device 3. Information indicating the set configuration of radio frame is notified to mobile station device 5.

Figure 4:
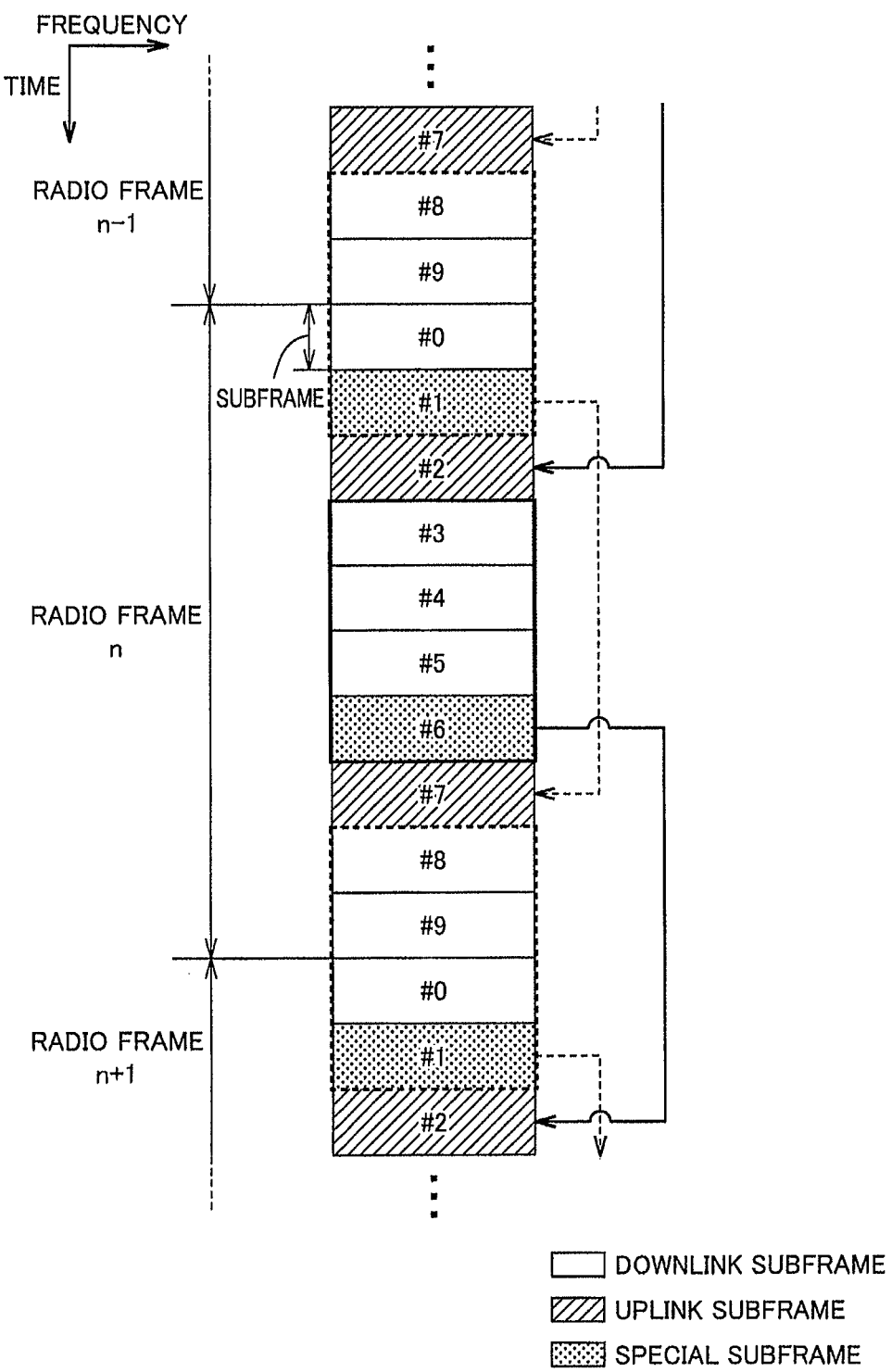
FIG. 4 shows an example of a radio frame configuration in the communication system in accordance with an embodiment of the preset invention.

FIG. 4 shows an example of the radio frame configuration in the communication system in accordance with an embodiment of the preset invention. For simplicity of description, radio frame configuration in one cell will be described. When cell aggregation is applied, the radio frame configuration is the same among a plurality of cells used for cell aggregation. In FIG. 4, the abscissa represents frequency domain and the ordinate represents time domain. In FIG. 4, a white block represents a downlink subframe, a diagonally hatched block represents an uplink subframe, and a dotted block represents a special subframe. The number allotted to each subframe (#i) indicates the subframe number in the radio frame.

Referring to FIG. 4, mobile station device 5 executes time domain bundling on a plurality of ACKs/NACKs (first receipt acknowledgements) for the downlink data received by PDSCH of subframes #8, #9, #0 and #1 (subframes surrounded by tick dotted lines in FIG. 4), and transmits a corresponding second receipt acknowledgement using PUCCH of subframe #7, which is six subframes behind subframe #1. Details of the first and second receipt acknowledgements will be described later. Mobile communication device 5 executes time domain bundling on a plurality of ACKs/NACKs (first receipt acknowledgements) to the downlink data received by PDSCH of subframes #3 to #6 (subframes surrounded by tick solid lines in FIG. 4), and transmits a corresponding second receipt acknowledgement using PUCCH of subframe #2, which is six subframes behind subframe #6.

As described above, mobile station device 5 set to execute time domain bundling recognizes, based on the radio frame configuration, the downlink subframes on which common time domain bundling is to be executed and an uplink subframe for transmitting the corresponding second receipt acknowledgement.

In this manner, the mobile station device set to utilize cell aggregation communicates with the base station device over a plurality of subframes using a plurality of cells.

<Cross-CC Scheduling>

A PDCCH and a PDSCH including a downlink assignment corresponding to the PDCCH can be placed on different downlink component carriers (in the following, this process will be referred to as "cross CC scheduling"). The downlink component carrier on which the PDSCH is placed is referred to as "physical downlink shared channel component carrier (PDSCH CC)." The downlink component carrier on which the PDCCH is placed is referred to as "physical downlink control channel component carrier (PDCCH CC)." It is possible that every downlink component carrier used for cell aggregation has PDSCH placed thereon. In that case, every downlink component carrier is PDSCH CC.

The downlink component carrier on which PDCCH is placed, the uplink component carrier on which the uplink grant corresponding to the PDCCH is placed, and the downlink component carrier having a corresponding relation established by the system information may be set differently from each other. Base station device 3 sends notification of system information related to each downlink component carrier to mobile station device 5. The system information includes a piece of information indicating an uplink component carrier having the corresponding relation to the downlink component carrier. The system information including the piece of information representing the corresponding relation is referred to as "SIB2 (System Information Block Type 2)," and the corresponding relation between the downlink component carrier and the uplink component carrier indicated by SIB2 is referred to as "SIB2 linkage." The uplink component carrier on which PUSCH is placed is referred to as "physical uplink shared channel component carrier (PUSCH CC)."

Base station device 3 determines which of the plurality of downlink component carriers used for cell aggregation is to be used as the PDCCH CC. Next, base station device 3 determines between which PDCCH CC and which PDSCH CC and/or PUSCH CC a corresponding relation is to be established.

That a corresponding relation is established between PDCCH CC and PDSCH CC means that a PDCCH including control information related to PDSCH resource allocation placed on the PDSCH CC is placed on the PDCCH CC corresponding to the PDSCH CC. More specifically, that a corresponding relation is established between PDCCH CC and PDSCH CC means that a PDCCH including a downlink assignment corresponding to the PDSCH placed on the PDSCH CC and forming the carrier indicator is placed on the PDCCH CC corresponding to the PDSCH CC.

That a corresponding relation is established between PDCCH CC and PUSCH CC means that the PDCCH including control information related to PUSCH resource allocation placed on PUSCH CC is placed on the PDCCH CC corresponding to the PUSCH CC. More specifically, that a corresponding relation is established between PDCCH CC and PUSCH CC means that the PDCCH including an uplink grant corresponding to the PUSCH placed on the PUSCH CC and forming the carrier indicator is placed on the PDCCH CC corresponding to the PUSCH CC.

Here, the process of "establishing a corresponding relation" is different from the process of relating a downlink component carrier and an uplink component carrier of the PDCCH not including the carrier indicator as described above. A corresponding relation may be established between each of a plurality of PDSCH CCs used for cell aggregation and one same PDCCH CC, or between each of a plurality of PDSCH CCs used for cell aggregation and different PDCCH CCs. By way of example, assume that a corresponding relation is established between one PDCCH CC and a plurality of PDSCH CCs. In that case, PDSCH resource allocation of which PDSCH CC is represented by the PDCCH transmitted through the PDCCH CC can be recognized by means of the carrier indicator.

Base station device 3 notifies information indicating the downlink component carrier having the corresponding relation established as the PDCCH CC to each PDSCH CC, to mobile station device 5. The information is notified using radio resource control (Radio Resource Control: RRC) signaling. Based on the information given by RRC signaling from base station device 3, mobile station device 5 recognizes a downlink component carrier on which a PDCCH including a downlink assignment with carrier indicator of PDSCH of each PDSCH CC can possibly be placed.

A PDCCH including a downlink assignment for PDSCH transmitted in a primary cell is transmitted only in the primary cell, while a PDCCH including a downlink assignment for a PDSCH transmitted in a secondary cell is transmitted in a primary cell or a secondary cell. In other words, a primary cell is always configured with a PDCCH CC and a PDSCH CC, and the corresponding relation is established between the PDCCH CC and the PDSCH CC configured in the primary cell. Further, the corresponding relation is established between a PUSCH CC in a primary cell and the PDCCH CC of the primary cell. The PDSCH CC and the PUSCH CC have SIB2 linkage.

A secondary cell is configured with a PDSCH CC, while it may or may not be configured with a PDCCH CC. A PDCCH CC to have a corresponding relation established with a PDSCH CC configured in a secondary cell may be provided in a primary cell or in another secondary cell.

A cell provided with a PDCCH CC is always configured with PDSCH CC and PUSCH CC, and in the same cell, the corresponding relation is established between the PDCCH CC and the PDSCH CC and between the PDCCH CC and PUSCH CC. The RRC signaling is given by the PDSCH. The PDCCH CC having a corresponding relation to the PDSCH CC and the PUSCH CC in a primary cell are always configured in the same primary cell and, therefore, information representing the relation therebetween is not notified to mobile station device 5. Further, if cross-CC scheduling is not applied, information representing the corresponding relation between the PDSCH CC and the PDCCH CC with each other is not notified from base station device 3 to mobile station device 5. If cross-CC scheduling is not applied, the downlink assignment does not include a carrier indicator.

<PDCCH Configuration>

PDCCH consists of a plurality of control channel elements (CCEs). The number of CCEs used by each downlink component carrier depends on the downlink component carrier bandwidth, the number of OFDM symbols forming the PDCCH, and the number of downlink reference signals of the downlink pilot channel that corresponds to the number of transmission antennas used, of base station device 3. As will be described later, a CCE consists of a plurality of downlink resource elements.

Figure 5:
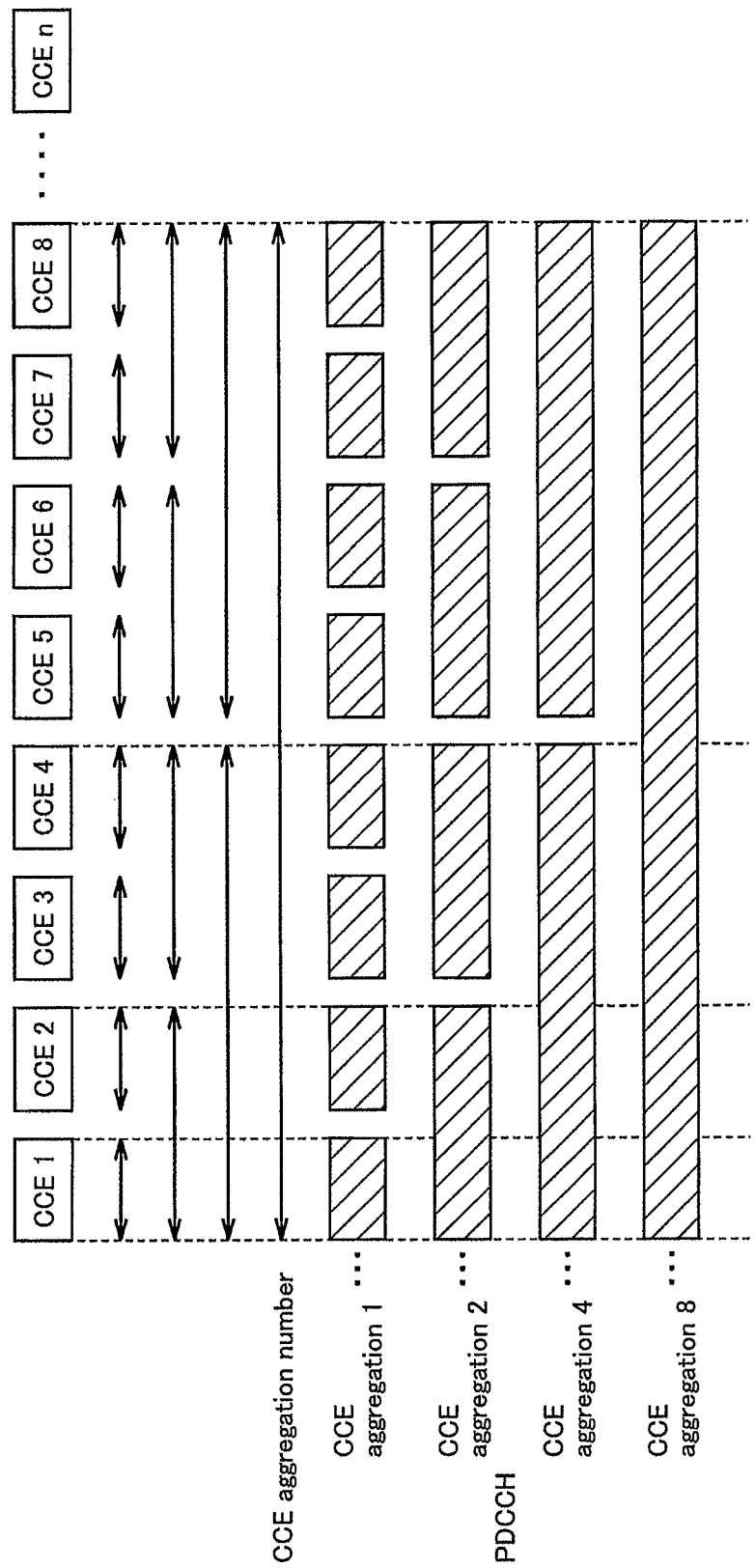
FIG. 5 illustrates logical relation between PDCCH and CCEs of the communication system in accordance with an embodiment of the present invention.

FIG. 5 illustrates logical relation between PDCCH and CCEs of the communication system in accordance with an embodiment of the present invention. CCEs used between base station device 3 and mobile station device 5 have numbers allocated for identifying CCEs. Numbering of CCEs is done based on a predetermined rule. Here, CCE t represents a CCE having the CCE number t. A PDCCH consists of an aggregation of a plurality of CCEs (CCE aggregation). The number of CCEs forming the aggregation will be referred to as "CCE aggregation number." The CCE aggregation number forming the PDCCH is set in base station device 3 in accordance with the code rate set for the PDCCH and/or the number of DCI bits included in the PDCCH.

An aggregation consisting of n CCEs will be hereinafter referred to as "CCE aggregation n." By way of example, base station device 3 may form a PDCCH using one CCE (CCE aggregation 1), a PDCCH using two CCEs (CCE aggregation 2), a PDCCH using four CCEs (CCE aggregation 4) or a PDCCH using eight CCEs (CCE aggregation 8).

By way of example, base station device 3 uses a smaller CCE aggregation number, that is, CCEs of smaller number, for forming a PDCCH for a mobile station device 5 with good channel quality, and uses a larger CCE aggregation number, that is, CCEs of larger number, for forming a PDCCH for a mobile station device 5 with poor channel quality. Further, base station device 3 uses a smaller CCE aggregation number, that is, CCEs of smaller number, for forming a PDCCH for transmitting DCI of smaller bit number, and uses a larger CCE aggregation number, that is, CCEs of larger number, for transmitting DCI of larger bit number.

The plurality of downlink resource elements forming a CCE are formed by a plurality of resource element groups (REG: hereinafter also referred to as "mini-CCE"). A resource element group consists of a plurality of downlink resource elements. By way of example, one resource element group consists of four downlink resource elements.

FIG. 6 shows an example of resource element group arrangement in a downlink subframe of the communication system in accordance with an embodiment of the present invention. Here, an example is shown in which a PDCCH consists of first to third OFDM symbols, and downlink reference signals corresponding to downlink pilot channels of two transmission antennas (transmission antennas 1 and 2) are arranged. In FIG. 6, the ordinate represents frequency domain and the abscissa represents time domain.

In the example of the arrangement shown in FIG. 6, one resource element group consists of four downlink resource elements neighboring in the frequency domain. In FIG. 6, downlink resource elements denoted by the same codes of PDCCH belong to the same resource element groups. Resource elements R1 (signals of downlink pilot channel for transmission antenna 1) and R2 (signals of downlink pilot channel of transmission antenna 2) are positioned apart from each other by a prescribed distance in the frequency domain and/or time domain, to form resource element groups.

FIG. 6 shows that, first, numbering starts from the first OFDM symbol resource element group having the lowest frequency (code "1"), followed by second OFDM symbol resource element group having the lowest frequency (code "2"), and further followed by third OFDM symbol resource element group having the lowest frequency (code "3").

FIG. 6 further shows that, numbering is done (code "4") on a resource element group not having any downlink pilot channel placed thereon and adjacent in frequency domain to the resource element group having the numbering of second OFDM symbols (code "2"), and then numbering is done (code "5") on a resource element group not having any downlink pilot channel placed thereon and adjacent in frequency domain to the resource element group having the numbering of third OFDM symbols (code "3").

FIG. 6 further shows that, numbering is done (code "6") on a resource element group adjacent in frequency domain to the resource element group having the numbering of first OFDM symbols (code "1"), next, numbering is done (code "7") on a resource element group adjacent in frequency domain to the resource element group having the numbering of second OFDM symbols (code "4"), and then numbering is done (code "8") on a resource element group adjacent in frequency domain to the resource element group having the numbering of third OFDM symbols (code "5").

Similar numbering is done on the subsequent resource element groups.

As shown in FIG. 6, a CCE consists of a plurality of resource element groups. By way of example, one CCE consists of nine different resource element groups dispersed in the frequency domain and the time domain. Specifically, on all the resource element groups numbered as shown in FIG. 6, interleaving is done by the unit of resource element group using a block interleaver, so that by nine resource element groups continuous in number after interleaving, one CCE is formed.

<Implicit Allocation of PUCCH Resources for ACK/NACK and CCE>

Resources of PUCCH (PUCCH format 1a, PUCCH format 1b) used for transmitting ACK/NACK are implicitly allocated based on the CCEs used for PDCCH. Where transmission of ACK/NACK is set to be done using ACK/NACK channel selection and a PDCCH is detected in a primary cell, candidate resources used for resource selection for PUCCH (PUCCH format 1b) executed to indicate ACK/NACK information implicitly are implicitly allocated to mobile station device 5 based on the CCE used for the PDCCH. Such resource allocation is referred to as "implicit resource allocation." The "implicit resource allocation" means that information dedicated for resource allocation is not used, and allocation of resources is done using pieces of information intended for other purposes. On the other hand, "explicit resource allocation" means that resources are allocated using information dedicated only for resource allocation.

Next, establishing a corresponding relation between the CCE and the PUCCH resources used for transmitting ACK/NACK will be described. To all CCEs in the downlink component carrier, identification numbers are allocated based on a predetermined rule. To all PUCCH resources used for transmitting ACK/NACK, identification numbers are allocated based on a predetermined rule. By way of example, a correspondence relation is established between a CCE and a PUCCH resource having the same identification number.

FIG. 7 shows numbers and configuration of PUCCH resources for ACK/NACK in the communication system in accordance with an embodiment of the present invention. FIG. 7 shows an example in which 24 PUCCH resources for ACK/NACK are configured for each uplink subframe. Further, FIG. 7 shows an example in which as the PUCCH resources for ACK/NACK, two uplink physical resource block pairs (PRB pairs; for example, PRB pair 1 or PRB pair 2), four code sequences in the frequency domain (codes in the frequency domain; for example, Code 1, Code 2, Code 3 and Code 4 in the frequency domain), and three code sequences in the time domain (codes in the time domain; for example, Code 1, Code 2 and Code 3 in the time domain) are used.

It is noted that the uplink physical resource block pairs, code sequences in the frequency domain and code sequences in the time domain different in number from the example shown in FIG. 7 may be used. PUCCH resources different in number from that shown in FIG. 7 may be configured for the uplink component carrier. The numbers of uplink physical resource block pairs are numbers of uplink physical resource block pairs used for PUCCH resources for ACK/NACK, and they do not uniquely indicate the numbers of uplink physical resource block pairs of the lowest frequency in the system bandwidth of the uplink. Each PUCCH resource shown in FIG. 7 consists of a combination of uplink physical resource block pair, code sequence in the frequency domain and code sequence in the time domain, and coded signals are in orthogonal relation in the frequency domain, code area in the frequency domain or the code area in the time domain.

A corresponding relation is established between the CCEs shown in FIG. 5 and the PUCCH resources for ACK/NACK shown in FIG. 7 in accordance with a predetermined rule. The corresponding relation is established in advance between the identification numbers of CCEs and identification numbers of PUCCH resources for ACK/NACK, for example, and a CCE and a PUCCH resource for ACK/NACK having the same identification number have a corresponding relation to each other. For instance, CCE1 corresponds to PUCCH 1, and CCE2 corresponds to PUCCH 2.

Mobile station device 5 uses the PUCCH resource having the number corresponding to the CCE having the smallest number among the CCEs used for the PDCCH on which DCI addressed to the device is detected, to transmit ACK/NACK for the data of the PDSCH of which resource allocation has been indicated by the PDCCH. By way of example, mobile station device 5 places and transmits a modulated signal on the PUCCH resource having the number corresponding to the CCE of the smallest number among the CCEs used for the PDCCH from which DCI addressed to the device itself is detected. This operation is done by mobile station device 5 if cell aggregation is not applied. Further, by way of example, mobile station device 5 uses the PUCCH resource having the number corresponding to the CCE of the smallest number among the CCEs used for the PDCCH from which DCI addressed to the device itself is detected for the PUCCH resource selection executed to indicate the ACK/NACK information implicitly, and places and transmits a modulated signal on the selected PUCCH resource. The operation is done by mobile station device 5 when cell aggregation is applied and ACK/NACK channel selection is used.

Base station device 3 recognizes the correspondence relation between the CCEs and the PUCCH resources for ACK/NACK as does mobile station device 5, and it allocates a CCE used for PDCCH in consideration of the PUCCH resources for ACK/NACK allocated to mobile station device 5. Specifically, mobile station device 5 recognizes PUCCH resources for ACK/NACK allocated to the device itself, based on the CCEs used for the PDCCH from which DCI addressed to the device itself is detected.

Similar to the example of FIG. 7, PUCCH candidate resources (including potential candidate resources) used for explicit resource allocation are also formed of different combinations of uplink physical resource block pairs, code sequences in the frequency domain and code sequences in the time domain. The PUCCH candidate resources (including potential candidate resources) used for explicit resource allocation and the PUCCH candidate resources used for implicit resource allocation are formed using different uplink physical resource block pairs.

<ACK/NACK Transmission Method>

If cell aggregation is not used, mobile station device 5 transmits a signal obtained by modulating information indicating ACK or NACK, using the PUCCH resource corresponding to the CCE used for the PDCCH from which DCI addressed to the device itself is detected. In other words, if cell aggregation is not used, mobile station device 5 transmits PUCCH format 1a or PUCCH format 1b using the resource allocated by the implicit resource allocation.

If cell aggregation is used and ACK/NACK channel selection is set, basically, mobile station device 5 selects one resource from a plurality of PUCCH candidate resources to transmit a signal obtained by modulating the ACK/NACK information. In other words, if cell aggregation is used and ACK/NACK channel selection is set, mobile station device 5 transmits PUCCH format 1b using the candidate resource allocated by the implicit resource allocation and/or explicit resource allocation.

In ACK/NACK channel selection, by mobile station device 5 selecting one resource from the plurality of PUCCH candidate resources, the ACK/NACK information is implicitly indicated, and by mobile station device 5 sending the signal modulated by the selected resource, the ACK/NACK information is explicitly indicated. In ACK/NACK channel selection, mobile station device 5 utilizes the two different manners of indicating information, to notify the information of ACK/NACK to base station device 3.

The resource selection candidates used for implicitly indicating the ACK/NACK information in ACK/NACK channel selection are implicitly allocated and/or explicitly allocated.

When the PDCCH is detected only in a primary cell, mobile station device 5 uses PUCCH resources implicitly allocated based on the CCEs of each PDCCH as resource selection candidates used for implicitly indicating ACK/NACK information for ACK/NACK channel selection.

When the PDCCHs are detected in a primary cell and a secondary cell, PUCCH resources implicitly allocated based on the CCEs of at least one PDCCH in the primary cell and PUCCH resources explicitly allocated by at least one PDCCH in the secondary cell are used as resource selection candidates used for implicitly indicating ACK/NACK information for ACK/NACK channel selection. The PDCCH of a secondary cell explicitly includes information indicating PUCCH candidate resources. It is noted that by RRC signaling, a plurality of potential PUCCH candidate resources are allocated in advance to mobile station device 5, and using information included in the PDCCH of a secondary cell, one resource is indicated from the plurality of candidates of PUCCH candidate resources set by the RRC signaling. It is also possible to explicitly allocate PUCCH candidate resources by RRC signaling, rather than to explicitly introduce information indicating the PUCCH candidate resource in the PDCCH of a secondary cell, and to use the PUCCH candidate resources allocated explicitly in advance for the resource selection process used for implicitly indicating the ACK/NACK information in ACK/NACK channel selection, when a PDCCH is detected in the secondary cell.

If PDCCHs are detected only in the secondary cell, mobile station device 5 uses PUCCH candidate resources explicitly allocated by at least one PDCCH of the secondary cell, for the resource selection process used for implicitly indicating the ACK/NACK channel selection. If only one PDCCH is detected only in a secondary cell, mobile station device 5 does not implicitly indicate the ACK/NACK information by resource selection, and simply indicates the ACK/NACK information explicitly, by transmitting a modulated signal by the PUCCH resource indicated by the PDCCH.

Generally, as the control information indicating the PUCCH candidate resources included in the PDCCH, a piece of control information intended for other purpose may be used. Here, the control information is utilized such that in a first situation, a control information field is interpreted as a first piece of control information, in a second situation, the control information field is interpreted as a second piece of control information, the first situation is different from the second situation, and the first piece of control information is different from the second piece of control information. By way of example, if a PDCCH is transmitted in a primary cell, a control information field may be interpreted as a piece of control information indicating transmit power control value of the PUCCH (TPC command). If the PDCCH is transmitted in a secondary cell, the afore-mentioned control information field may be interpreted as a piece of control information indicating PUCCH candidate resources used for implicitly indicating the ACK/NACK information.

<Example of ACK/NACK Channel Selection>

Next, an example of ACK/NACK channel selection will be described. For simplicity of description, an example in which DTX (Discontinuous Transmission) information is indicated by ACK/NACK channel selection is not given. The present invention, however, is applicable even when DTX information is indicated. DTX indicates that data is not received on a PDSCH of a cell. In other words, DTX indicates that a downlink assignment corresponding to a PDSCH of a certain cell is not detected. In the following, "ACK/NACK" represents ACK or NACK. For simplicity of description, first, ACK/NACK process for the data received by a plurality of cells in a single downlink subframe, without time domain bundling will be described. The ACK/NACK process for the data received by a plurality of cells in a plurality of downlink subframes with time domain bundling will be described later.

First, an example will be described in which two cells are used for cell aggregation, and single data transmission takes place in each cell. The single data transmission means that signals of single data are transmitted without spatial multiplexing of a plurality of data by MIMO (Multi-input Multi-output) using a plurality of antenna ports when transmitting PDSCH. The signals of single data may be transmitted using a single antenna port, may be diversity-transmitted without spatial multiplexing using a plurality of antenna ports, or transmitted with weight. Here, 2-bit information of ACK/NACK is indicated by PUCCH. Four different pieces of information represented by 2 bits are divided into two groups, each group consisting of two pieces of information. As implicitly indicated information, selection of two PUCCH resources indicates to which group the piece of information belongs, and a signal point of QPSK indicates which piece of information in the group it is. Here, the signal point of QPSK is represented by a complex number. Here, the antenna port means a logical antenna used for signal processing, and one antenna port may be consisted of a plurality of physical antennas. Regarding a transmission antenna, a plurality of transmission antennas forming one antenna port transmit the same signal. Though it is possible to realize delay diversity or CDD (Cyclic Delay Diversity) using a plurality of physical antennas in one antenna port, other signal processing cannot be used.

Figure 8:
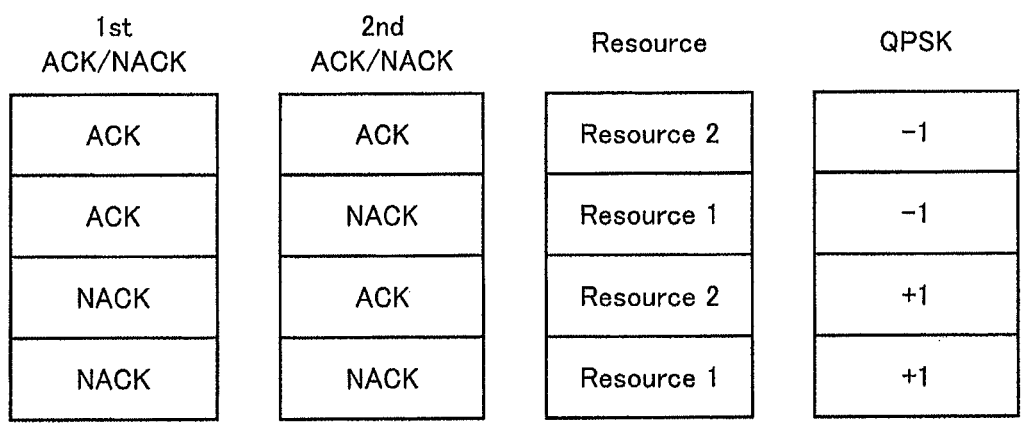
FIG. 8 shows a relation between each of the ACK/NACK information, resources selected by ACK/NACK channel selection and QPSK signal points in the system in accordance with an embodiment of the present invention.

FIG. 8 shows a relation between each of the ACK/NACK information, resources selected by ACK/NACK channel selection and QPSK signal points in the system in accordance with an embodiment of the present invention. In FIG. 8, 1st ACK/NACK represents the ACK/NACK information for the PDSCH of a primary cell and 2nd ACK/NACK represents the ACK/NACK information for the PDSCH of a secondary cell.

In FIG. 8, Resource 1 is allocated based on the PDCCH including a downlink assignment corresponding to the primary cell PDSCH, and Resource 2 is allocated based on the PDCCH including a downlink assignment corresponding to the secondary cell PDSCH. Resource 1 and Resource 2 are candidate resources used for resource selection. The PDCCH including the downlink assignment corresponding to the primary cell PDSCH is transmitted only from the primary cell and, therefore, a resource allocated by implicit resource allocation based on the CCE of PDCCH is used as Resource 1. If the PDCCH including the downlink assignment corresponding to the secondary cell PDSCH is transmitted in the primary cell, a resource allocated by implicit resource allocation based on the CCE of PDCCH is used as Resource 2. If the PDCCH including the downlink assignment corresponding to the secondary cell PDSCH is transmitted in the secondary cell, a resource allocated by explicit resource allocation based on the control information explicitly included in the PDCCH is used as Resource 2.

As described above, we can say that the candidate resources used for resource selection in ACK/NACK channel selection have a corresponding relation to cells. Further, we can say that the candidate resources used for resource selection in ACK/NACK channel selection have a corresponding relation to PDSCH of the cell. Further, we can say that the candidate resources used for resource selection in ACK/NACK channel selection have a corresponding relation to the data included in the PDSCH of the cell. Further, we can say that the candidate resources used for resource selection in ACK/NACK channel selection have a corresponding relation to the PDCCH that corresponds to the PDSCH of the cell.

(1) When ACK is indicated for the primary cell PDSCH and ACK is indicated for the secondary cell PDSCH, mobile station device 5 selects Resource 2, and transmits a signal generated from the QPSK at signal point "−1".

(2) When ACK is indicated for the primary cell PDSCH and NACK is indicated for the secondary cell PDSCH, mobile station device 5 selects Resource 1, and transmits a signal generated from the QPSK at signal point "−1".

(3) When NACK is indicated for the primary cell PDSCH and ACK is indicated for the secondary cell PDSCH, mobile station device 5 selects Resource 2, and transmits a signal generated from the QPSK at signal point "+1".

(4) When NACK is indicated for the primary cell PDSCH and NACK is indicated for the secondary cell PDSCH, mobile station device 5 selects Resource 1, and transmits a signal generated from the QPSK at signal point "+1".

Next, an example will be described in which two cells are used for cell aggregation, two data are transmitted by the primary cell, and single data is transmitted by the secondary cell. That the two data are transmitted means that spatial multiplexing with MIMO is used for transmitting PDSCH, and signals of two data sequences (transport blocks) are simultaneously transmitted using a plurality of antenna ports. Her e, 3-bit information of ACK/NACK is indicated by PUCCH. Eight different pieces of information represented by 3 bits are divided into two groups, each group consisting of four pieces of information. As implicitly indicated information, selection of PUCCH resources indicates to which group the piece of information belongs, and a signal point of QPSK indicates which piece of information in the group it is. Here, the signal point of QPSK is represented by a complex number.

Figure 9:
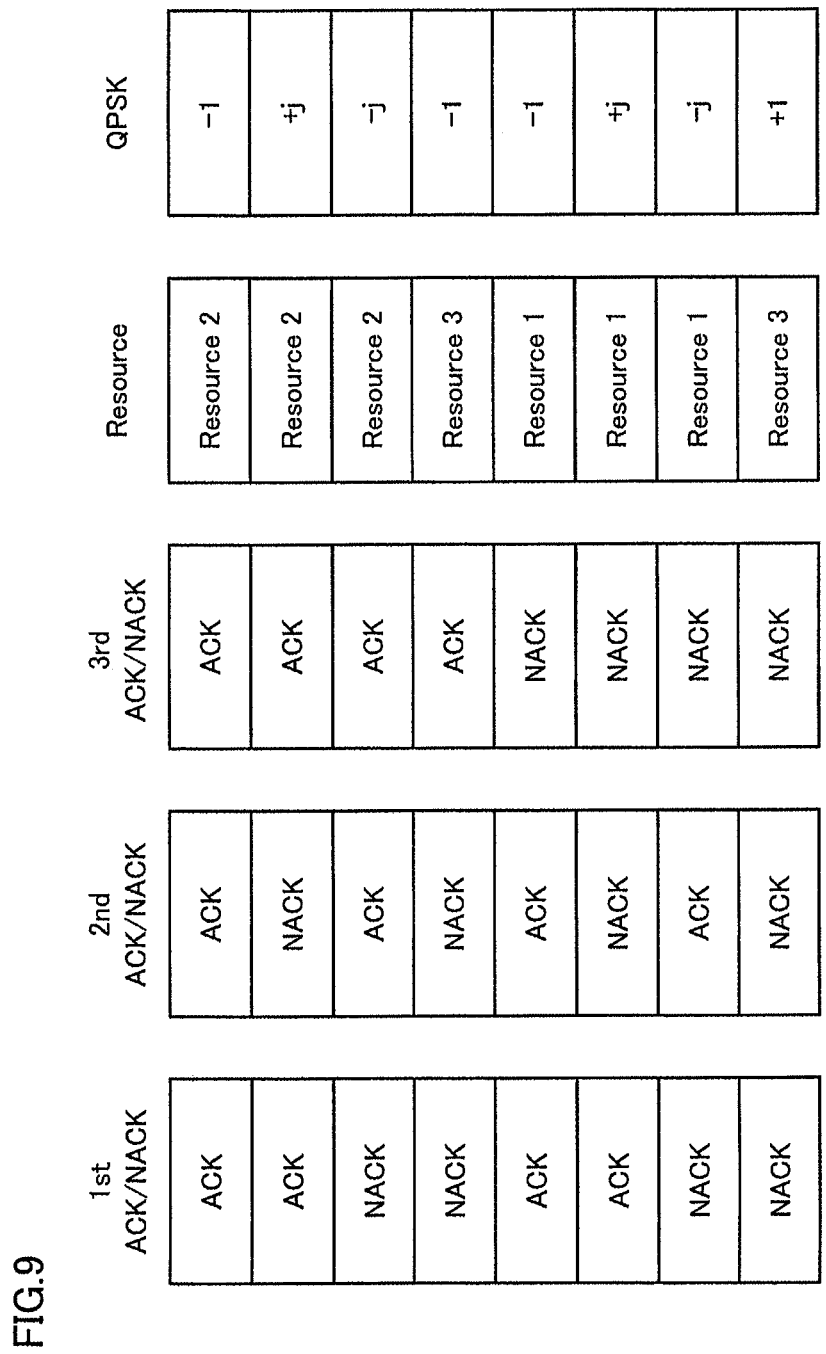
FIG. 9 shows a relation between each of the ACK/NACK information, resources selected by ACK/NACK channel selection and QPSK signal points in the system in accordance with an embodiment of the present invention.

FIG. 9 shows a relation between each of the ACK/NACK information, resources selected by ACK/NACK channel selection and QPSK signal points in the system in accordance with an embodiment of the present invention. In FIG. 9, 1st ACK/NACK represents the ACK/NACK information for the first data sequence of the primary cell PDSCH, 2nd ACK/NACK represents the ACK/NACK information for the second data sequence of the primary cell PDSCH, and 3rd ACK/NACK represents the ACK/NACK information for the secondary cell PDSCH.

In FIG. 9, Resource 1 and Resource 2 are allocated based on the PDCCH including a downlink assignment corresponding to the primary cell PDSCH, and Resource 3 is allocated based on the PDCCH including a downlink assignment corresponding to the secondary cell PDSCH. The PDCCH including the downlink assignment corresponding to the primary cell PDSCH is transmitted only from the primary cell and, therefore, resources allocated by implicit resource allocation based on the CCE of PDCCH are used as Resource 1 and Resource 2. If the PDCCH including the downlink assignment corresponding to the secondary cell PDSCH is transmitted in the primary cell, a resource allocated by implicit resource allocation based on the CCE of PDCCH is used as Resource 3. If the PDCCH including the downlink assignment corresponding to the secondary cell PDSCH is transmitted in the secondary cell, a resource allocated by explicit resource allocation based on the control information explicitly included in the PDCCH is used as Resource 3.

Here, for Resource 2, PUCCH resource having an identification number shifted by a prescribed value from the identification number of the PUCCH resource used for Resource 1 is used. By way of example, for Resource 1, the PUCCH resource having the same identification number as the CCE of smallest number is used, and for Resource 2, the PUCCH resource having the identification number shifted by +1 from the PUCCH resource used for Resource 1 is used.

(1) When ACK is indicated for the first data sequence of primary cell PDSCH, ACK is indicated for the second data sequence of primary cell PDSCH, and ACK is indicated for the secondary cell PDSCH, mobile station device 5 selects Resource 2, and transmits a signal generated from the QPSK at signal point "−1".

(2) When ACK is indicated for the first data sequence of primary cell PDSCH, NACK is indicated for the second data sequence of primary cell PDSCH, and ACK is indicated for the secondary cell PDSCH, mobile station device 5 selects Resource 2, and transmits a signal generated from the QPSK at signal point "+j".

(3) When NACK is indicated for the first data sequence of primary cell PDSCH, ACK is indicated for the second data sequence of primary cell PDSCH, and ACK is indicated for the secondary cell PDSCH, mobile station device 5 selects Resource 2, and transmits a signal generated from the QPSK at signal point "−j"

(4) When NACK is indicated for the first data sequence of primary cell PDSCH, NACK is indicated for the second data sequence of primary cell PDSCH, and ACK is indicated for the secondary cell PDSCH, mobile station device 5 selects Resource 3, and transmits a signal generated from the QPSK at signal point "−1".

(5) When ACK is indicated for the first data sequence of primary cell PDSCH, ACK is indicated for the second data sequence of primary cell PDSCH, and NACK is indicated for the secondary cell PDSCH, mobile station device 5 selects Resource 1, and transmits a signal generated from the QPSK at signal point "−1".

(6) When ACK is indicated for the first data sequence of primary cell PDSCH, NACK is indicated for the second data sequence of primary cell PDSCH, and NACK is indicated for the secondary cell PDSCH, mobile station device 5 selects Resource 1, and transmits a signal generated from the QPSK at signal point "+j".

(7) When NACK is indicated for the first data sequence of primary cell PDSCH, ACK is indicated for the second data sequence of primary cell PDSCH, and NACK is indicated for the secondary cell PDSCH, mobile station device 5 selects Resource 1, and transmits a signal generated from the QPSK at signal point "−j".

(8) When NACK is indicated for the first data sequence of primary cell PDSCH, NACK is indicated for the second data sequence of primary cell PDSCH, and NACK is indicated for the secondary cell PDSCH, mobile station device 5 selects Resource 3, and transmits a signal generated from the QPSK at signal point "+1".

If two cells are used for cell aggregation, single data is transmitted in the primary cell and two data are transmitted in the secondary cell, in FIG. 9, 1st ACK/NACK represents the information of ACK/NACK for the first data sequence of secondary cell PDSCH, 2nd ACK/NACK represents the information of ACK/NACK for the second data sequence of secondary cell PDSCH, 3rd ACK/NACK represents the information of ACK/NACK for the primary cell PDSCH, Resource 1 and Resource 2 are allocated based on the PDCCH including the downlink assignment corresponding to the secondary cell PDSCH, and Resource 3 is allocated based on the PDCCH including the downlink assignment corresponding to the primary cell PDSCH.

Next, an example will be described in which two cells are used for cell aggregation, two data are transmitted in the primary cell and two data are transmitted in the secondary cell. Here, 4-bit information of ACK/NACK is indicated by PUCCH. Sixteen different pieces of information represented by 4 bits are divided into four groups, each group consisting of four pieces of information. As implicitly indicated information, selection of PUCCH resources indicates to which group the piece of information belongs, and a signal point of QPSK indicates which piece of information in the group it is. Here, the signal point of QPSK is represented by a complex number.

FIG. 10 shows a relation between each of the ACK/NACK information, resources selected by ACK/NACK channel selection and QPSK signal points in the system in accordance with an embodiment of the present invention. In FIG. 10, 1st ACK/NACK represents the ACK/NACK information for the first data sequence of the primary cell PDSCH, 2nd ACK/NACK represents the ACK/NACK information for the second data sequence of the primary cell PDSCH, 3rd ACK/NACK represents the ACK/NACK information for the first data sequence of the secondary cell PDSCH, and 4th ACK/NACK represents the ACK/NACK information for the second data sequence of the secondary cell PDSCH.

Referring to FIG. 10, Resource 1 and Resource 2 are allocated based on the PDCCH including a downlink assignment corresponding to the primary cell PDSCH, and Resource 3 and Resource 4 are allocated based on the PDCCH including a downlink assignment corresponding to the secondary cell PDSCH. The PDCCH including the downlink assignment corresponding to the primary cell PDSCH is transmitted only in the primary cell and, therefore, resources allocated by implicit resource allocation based on the CCE of PDCCH are used as Resource 1 and Resource 2.

Here, for Resource 2, PUCCH resource having an identification number shifted by a prescribed value from the identification number of the PUCCH resource used for Resource 1 is used. By way of example, for Resource 1, the PUCCH resource having the same identification number as the CCE of smallest number is used, and for Resource 2, the PUCCH resource having the identification number shifted by +1 from the PUCCH resource used for Resource 1 is used.

If the PDCCH including the downlink assignment corresponding to the secondary cell PDSCH is transmitted from the primary cell, resources allocated by implicit resource allocation based on the CCE of PDCCH are used as Resource 3 and Resource 4. Here, for Resource 4, PUCCH resource having an identification number shifted by a prescribed value from the identification number of the PUCCH resource used for Resource 3 is used. By way of example, for Resource 3, the PUCCH resource having the same identification number as the CCE of smallest number is used, and for Resource 4, the PUCCH resource having the identification number shifted by +1 from the PUCCH resource used for Resource 3 is used.

If the PDCCH including the downlink assignment corresponding to the secondary cell PDSCH is transmitted from the secondary cell, resources allocated by explicit resource allocation based on the control information explicitly included in the PDCCH are used as Resource 3 and Resource 4. Here, based on the control information explicitly included in the PDCCH, the resource for Resource 3 is explicitly indicated. For Resource 4, PUCCH resource having an identification number shifted by a prescribed value from the identification number of the PUCCH resource used for Resource 3 is used. By way of example, for Resource 4, the PUCCH resource having the identification number shifted by +1 from the PUCCH resource used for Resource 3 is used. Alternatively, resource candidates for Resource 3 and Resource 4 are respectively set in advance by RRC signaling, and by the PDCCH, control information indicating the resources among respective resource candidates is given. As the control information indicating the resource from the resource candidates for Resource 3 and the control information indicating the resource from the resource candidates for Resource 4, one common piece of control information may be included in the PDCCH. If the PDCCH including the downlink assignment corresponding to the secondary cell PDSCH is transmitted in the secondary cell, resource may be allocated to Resource 2 also, by explicit resource allocation based on the control information explicitly included in the PDCCH.

(1) When ACK is indicated for the first data sequence of primary cell PDSCH, ACK is indicated for the second data sequence of primary cell PDSCH, ACK is indicated for the first data sequence of secondary cell PDSCH and ACK is indicated for the second data sequence of secondary cell PDSCH, mobile station device 5 selects Resource 2, and transmits a signal generated from the QPSK at signal point "−1".

(2) When ACK is indicated for the first data sequence of primary cell PDSCH, NACK is indicated for the second data sequence of primary cell PDSCH, ACK is indicated for the first data sequence of secondary cell PDSCH and ACK is indicated for the second data sequence of secondary cell PDSCH, mobile station device 5 selects Resource 3, and transmits a signal generated from the QPSK at signal point "+j".

(3) When NACK is indicated for the first data sequence of primary cell PDSCH, ACK is indicated for the second data sequence of primary cell PDSCH, ACK is indicated for the first data sequence of secondary cell PDSCH and ACK is indicated for the second data sequence of secondary cell PDSCH, mobile station device 5 selects Resource 2, and transmits a signal generated from the QPSK at signal point "−j".

(4) When NACK is indicated for the first data sequence of primary cell PDSCH, NACK is indicated for the second data sequence of primary cell PDSCH, ACK is indicated for the first data sequence of secondary cell PDSCH and ACK is indicated for the second data sequence of secondary cell PDSCH, mobile station device 5 selects Resource 4, and transmits a signal generated from the QPSK at signal point "4".

(5) When ACK is indicated for the first data sequence of primary cell PDSCH, ACK is indicated for the second data sequence of primary cell PDSCH, ACK is indicated for the first data sequence of secondary cell PDSCH and NACK is indicated for the second data sequence of secondary cell PDSCH, mobile station device 5 selects Resource 2, and transmits a signal generated from the QPSK at signal point "+j".

(6) When ACK is indicated for the first data sequence of primary cell PDSCH, NACK is indicated for the second data sequence of primary cell PDSCH, ACK is indicated for the first data sequence of secondary cell PDSCH and NACK is indicated for the second data sequence of secondary cell PDSCH, mobile station device 5 selects Resource 3, and transmits a signal generated from the QPSK at signal point "+1".

(7) When NACK is indicated for the first data sequence of primary cell PDSCH, ACK is indicated for the second data sequence of primary cell PDSCH, ACK is indicated for the first data sequence of secondary cell PDSCH and NACK is indicated for the second data sequence of secondary cell PDSCH, mobile station device 5 selects Resource 2, and transmits a signal generated from the QPSK at signal point "+1".

(8) When NACK is indicated for the first data sequence of primary cell PDSCH, NACK is indicated for the second data sequence of primary cell PDSCH, ACK is indicated for the first data sequence of secondary cell PDSCH and NACK is indicated for the second data sequence of secondary cell PDSCH, mobile station device 5 selects Resource 4, and transmits a signal generated from the QPSK at signal point "+j".

(9) When ACK is indicated for the first data sequence of primary cell PDSCH, ACK is indicated for the second data sequence of primary cell PDSCH, NACK is indicated for the first data sequence of secondary cell PDSCH and ACK is indicated for the second data sequence of secondary cell PDSCH, mobile station device 5 selects Resource 3, and transmits a signal generated from the QPSK at signal point "−1".

(10) When ACK is indicated for the first data sequence of primary cell PDSCH, NACK is indicated for the second data sequence of primary cell PDSCH, NACK is indicated for the first data sequence of secondary cell PDSCH and ACK is indicated for the second data sequence of secondary cell PDSCH, mobile station device 5 selects Resource 3, and transmits a signal generated from the QPSK at signal point "+j".

(11) When NACK is indicated for the first data sequence of primary cell PDSCH, ACK is indicated for the second data sequence of primary cell PDSCH, NACK is indicated for the first data sequence of secondary cell PDSCH and ACK is indicated for the second data sequence of secondary cell PDSCH, mobile station device 5 selects Resource 4, and transmits a signal generated from the QPSK at signal point "−j".

(12) When NACK is indicated for the first data sequence of primary cell PDSCH, NACK is indicated for the second data sequence of primary cell PDSCH, NACK is indicated for the first data sequence of secondary cell PDSCH and ACK is indicated for the second data sequence of secondary cell PDSCH, mobile station device 5 selects Resource 4, and transmits a signal generated from the QPSK at signal point "+1".

(13) When ACK is indicated for the first data sequence of primary cell PDSCH, ACK is indicated for the second data sequence of primary cell PDSCH, NACK is indicated for the first data sequence of secondary cell PDSCH and NACK is indicated for the second data sequence of secondary cell PDSCH, mobile station device 5 selects Resource 1, and transmits a signal generated from the QPSK at signal point "−1".

(14) When ACK is indicated for the first data sequence of primary cell PDSCH, NACK is indicated for the second data sequence of primary cell PDSCH, NACK is indicated for the first data sequence of secondary cell PDSCH and NACK is indicated for the second data sequence of secondary cell PDSCH, mobile station device 5 selects Resource 1, and transmits a signal generated from the QPSK at signal point "+j".

(15) When NACK is indicated for the first data sequence of primary cell PDSCH, ACK is indicated for the second data sequence of primary cell PDSCH, NACK is indicated for the first data sequence of secondary cell PDSCH and NACK is indicated for the second data sequence of secondary cell PDSCH, mobile station device 5 selects Resource 1, and transmits a signal generated from the QPSK at signal point "j".

(16) When NACK is indicated for the first data sequence of primary cell PDSCH, NACK is indicated for the second data sequence of primary cell PDSCH, NACK is indicated for the first data sequence of secondary cell PDSCH and NACK is indicated for the second data sequence of secondary cell PDSCH, mobile station device 5 selects Resource 1, and transmits a signal generated from the QPSK at signal point "+1".

Regarding the relations among ACK/NACK information, resources selected for ACK/NACK channel selection and the QPSK signal points, mobile station device 5 selects which relation is to be applied, in accordance with the set cell aggregation configuration and transmission mode. The cell aggregation configuration includes setting of the number of cells used for the cell aggregation as well as setting of primary and secondary cells. The transmission mode refers to the setting as to whether transmission of single data is to be executed or basically transmission of two data is to be executed in each cell. In other words, the transmission mode means the maximum number of data that can be transmitted in a certain downlink subframe. Even if a transmission mode in which transmission of two data is basically executed is set, sometimes a single data is transmitted or two data are transmitted subframe by subframe of the downlink. If the transmission mode in which transmission of single data is executed is set, only a single data is transmitted in any of the downlink subframes, and transmission of two data does not occur.

If no corresponding ACK/NACK information is detected, that is, if the corresponding data is DTX, mobile station device 5 sets the corresponding piece of ACK/NACK information to NACK, and executes ACK/NACK channel selection. If the data to be transmitted to mobile station device 5 is relatively small and/or if allocation of resources to other mobile station device 5 is given priority, base station device 3 may execute data transmission using not all cells set for the mobile station device 5 but using only some of the cells. In such a case, mobile station device 5 does not detect PDCCHs corresponding to the PDSCHs of some cells, and hence, it cannot detect pieces of ACK/NACK information corresponding to the PDSCHs of these cells. Even when base station device 3 transmits PDCCHs, mobile station device 5 may not be able to detect PDCCHs corresponding to PDSCHs of some cells, if propagation path environment is poor because of interference or fading. In that case also, the mobile station device cannot detect pieces of ACK/NACK information corresponding to the PDSCHs of these cells.

An example in which the relations among the ACK/NACK information, resources selected for ACK/NACK channel selection and QPSK signal points shown in FIG. 9 exist and transmission of two data takes place in the primary cell and transmission of single data takes place in the secondary cell will be described. Assume that mobile station device 5 detected a PDCCH related to the PDSCH of the secondary cell but not detected a PDCCH related to the PDSCH of the primary cell. Then, mobile station device 5 executes ACK/NACK channel selection, setting both 1st ACK/NACK and 2nd ACK/NACK to NACK. Actually, here, the resource selection process is not executed and only Resource 3 is selected.

An exceptional process when transmission of two data takes place in the primary cell and transmission of single data takes place in the secondary cell will be described. Here, to the relations among the ACK/NACK information, resources selected for ACK/NACK channel selection and QPSK signal points shown in FIG. 9, a relation of the exceptional process is added. By way of example, if a PDCCH corresponding to a PDSCH of the primary cell is detected but no PDCCH corresponding to the PDSCH of the secondary cell is detected by mobile station device 5, and the ACK/NACK (1st ACK/NACK) for the first data sequence of the primary cell PDSCH and the ACK/NACK (2nd ACK/NACK) for the second data sequence of the primary cell PDSCH are both NACK, Resource 1 is selected and a signal generated from the QPSK at signal point "+1" is transmitted. Therefore, in this situation, if no PDCCH corresponding to the secondary cell PDSCH is detected and only the PDCCH corresponding to the primary cell PDSCH is detected, actually, resource selection process is not executed and only Resource 1 is selected.

An example in which the relations among the ACK/NACK information, resources selected for ACK/NACK channel selection and QPSK signal points shown in FIG. 9 exist and transmission of two data takes place in the secondary cell and transmission of single data takes place in the primary cell will be described. Assume that mobile station device 5 detected a PDCCH corresponding to the PDSCH of the primary cell but not detected a PDCCH corresponding to the PDSCH of the secondary cell. Then, mobile station device 5 executes ACK/NACK channel selection, setting both 1st ACK/NACK and 2nd ACK/NACK to NACK. Actually, here, the resource selection process is not executed and only Resource 3 is selected.

An exceptional process when transmission of single data takes place in the primary cell and transmission of two data takes place in the secondary cell will be described. Here, to the relations among the ACK/NACK information, resources selected for ACK/NACK channel selection and QPSK signal points shown in FIG. 9, a relation of the exceptional process is added. By way of example, if a PDCCH corresponding to a PDSCH of the secondary cell is detected but no PDCCH corresponding to the PDSCH of the primary cell is detected by mobile station device 5, and both the ACK/NACK (1st ACK/NACK) for the first data sequence of the secondary cell PDSCH and the ACK/NACK (2nd ACK/NACK) for the second data sequence of the secondary cell PDSCH are NACK, Resource 1 is selected and a signal generated from the QPSK at signal point "+1" is transmitted. Therefore, in this situation, if no PDCCH corresponding to the primary cell PDSCH is detected and only the PDCCH corresponding to the secondary cell PDSCH is detected, actually, the resource selection process is not executed and only Resource 1 is selected.

An example in which the relations among the ACK/NACK information, resources selected for ACK/NACK channel selection and QPSK signal points shown in FIG. 8 exist and transmission of single data takes place in the primary cell and transmission of single data takes place in the secondary cell will be described. Assume that mobile station device 5 detected a PDCCH corresponding to the PDSCH of the primary cell but not detected a PDCCH corresponding to the PDSCH of the secondary cell. Then, mobile station device 5 sets the 2nd ACK/NACK to NACK and performs ACK/NACK channel selection. Here, actually, the resource selection process is not executed and only Resource 1 is selected.

An exceptional process when the relations among the ACK/NACK information, resources selected for ACK/NACK channel selection and QPSK signal points shown in FIG. 8 exist will be described. Assume, for example that mobile station device 5 detected a PDCCH corresponding to the PDSCH of the secondary cell but not detected a PDCCH corresponding to the PDSCH of the primary cell, and ACK/NACK (2nd ACK/NACK) for the secondary cell PDSCH is NACK. In this case, mobile station device 5 transmits no signal. Therefore, in this situation, if no PDCCH corresponding to the primary cell PDSCH is detected and only the PDCCH corresponding to the secondary cell PDSCH is detected, the resource that can possibly be selected is only Resource 2.

An example in which the relations among the ACK/NACK information, resources selected for ACK/NACK channel selection and QPSK signal points shown in FIG. 10 exist and transmission of two data takes place in the primary cell and transmission of two data takes place in the secondary cell will be described. Assume that mobile station device 5 detected a PDCCH corresponding to the PDSCH of the primary cell but not detected a PDCCH corresponding to the PDSCH of the secondary cell. Then, mobile station device 5 executes ACK/NACK channel selection, setting both 3rd ACK/NACK and 4th ACK/NACK to NACK. Actually, here, the resource selection process is not executed and only Resource 1 is selected.

An exceptional process when the relations among the ACK/NACK information, resources selected for ACK/NACK channel selection and QPSK signal points shown in FIG. 10 exist will be described. Assume that mobile station device 5 detected a PDCCH corresponding to the PDSCH of the secondary cell but not detected a PDCCH corresponding to the PDSCH of the primary cell, and the ACK/NACK (3rd ACK/NACK) for the first data sequence of the secondary cell PDSCH and the ACK/NACK (4th ACK/NACK) for the second data sequence of the secondary cell PDSCH are both NACK. Here, mobile station device 5 transmits no signal. Therefore, in this situation, if no PDCCH corresponding to the primary cell PDSCH is detected and only the PDCCH corresponding to the secondary cell PDSCH is detected, the resource that can possibly be selected is only Resource 4.

Time Domain Bundling>

Next, time domain bundling of ACK/NACK will be described. When time domain bundling is set, mobile station device 5 executes a logical operation on the ACKs/NACKs (first receipt acknowledgements) for the plurality of data in the subframe (of time domain) of a plurality of downlink subframes of one cell, to generate a piece of information (second receipt acknowledgement) collecting the plurality of first receipt acknowledgements.

By way of example, as the logical operation, mobile station device 5 executes a logical multiplication. If the plurality of ACKs/NACKs (first receipt acknowledgements) on which time domain bundling is to be executed are all ACK, mobile station device 5 generates ACK as the second receipt acknowledgement, and transmits the same to base station device 3. If at least one of the plurality of ACKs/NACKs (first receipt acknowledgements) on which time domain bundling is to be executed is NACK, mobile station device 5 generates NACK as the second receipt acknowledgement, and transmits the same to base station device 3. In the present embodiment using TDD, base station device 3 determines how many downlink subframes is to be formed and/or how many uplink subframes are to be formed in one radio frame, and notifies mobile station device 5 of information indicating the determined subframe configuration. Based on the notified subframe configuration, mobile station device 5 recognizes for which data of which downlink subframes the first receipt acknowledgements are to be collected to provide the second receipt acknowledgement, and recognizes PUCCH of which uplink subframe is to be used for transmitting the second receipt acknowledgement.

An example of ACK/NACK time domain bundling will be described. Assume that mobile station device 5 executes a logical operation on the first receipt acknowledgements for the data of four downlink subframes (downlink subframe 1, downlink subframe 2, downlink subframe 3 and downlink subframe 4) of one cell, to generate a second receipt acknowledgement.

(1) If the ACK/NACK for the data of downlink subframe 1 is ACK, the ACK/NACK for the data of downlink subframe 2 is ACK, the ACK/NACK for the data of downlink subframe 3 is ACK and the ACK/NACK for the data of downlink subframe 4 is ACK in one cell, mobile station device 5 generates ACK as the second receipt acknowledgement.

(2) If the ACK/NACK for the data of downlink subframe 1 is ACK, the ACK/NACK for the data of downlink subframe 2 is ACK, the ACK/NACK for the data of downlink subframe 3 is ACK and the ACK/NACK for the data of downlink subframe 4 is NACK in one cell, mobile station device 5 generates NACK as the second receipt acknowledgement.

(3) If the ACK/NACK for the data of downlink subframe 1 is ACK, the ACK/NACK for the data of downlink subframe 2 is ACK, the ACK/NACK for the data of downlink subframe 3 is NACK and the ACK/NACK for the data of downlink subframe 4 is ACK in one cell, mobile station device 5 generates NACK as the second receipt acknowledgement.

(4) If the ACK/NACK for the data of downlink subframe 1 is ACK, the ACK/NACK for the data of downlink subframe 2 is NACK, the ACK/NACK for the data of downlink subframe 3 is ACK and the ACK/NACK for the data of downlink subframe 4 is ACK in one cell, mobile station device 5 generates NACK as the second receipt acknowledgement.

(5) If the ACK/NACK for the data of downlink subframe 1 is NACK, the ACK/NACK for the data of downlink subframe 2 is ACK, the ACK/NACK for the data of downlink subframe 3 is ACK and the ACK/NACK for the data of downlink subframe 4 is ACK in one cell, mobile station device 5 generates NACK as the second receipt acknowledgement.

(6) If the ACK/NACK for the data of downlink subframe 1 is ACK, the ACK/NACK for the data of downlink subframe 2 is ACK, the ACK/NACK for the data of downlink subframe 3 is NACK and the ACK/NACK for the data of downlink subframe 4 is NACK in one cell, mobile station device 5 generates NACK as the second receipt acknowledgement.

(7) If the ACK/NACK for the data of downlink subframe 1 is ACK, the ACK/NACK for the data of downlink subframe 2 is NACK, the ACK/NACK for the data of downlink subframe 3 is ACK and the ACK/NACK for the data of downlink subframe 4 is NACK in one cell, mobile station device 5 generates NACK as the second receipt acknowledgement.

(8) If the ACK/NACK for the data of downlink subframe 1 is NACK, the ACK/NACK for the data of downlink subframe 2 is ACK, the ACK/NACK for the data of downlink subframe 3 is ACK and the ACK/NACK for the data of downlink subframe 4 is NACK in one cell, mobile station device 5 generates NACK as the second receipt acknowledgement.

(9) If the ACK/NACK for the data of downlink subframe 1 is ACK, the ACK/NACK for the data of downlink subframe 2 is NACK, the ACK/NACK for the data of downlink subframe 3 is NACK and the ACK/NACK for the data of downlink subframe 4 is ACK in one cell, mobile station device 5 generates NACK as the second receipt acknowledgement.

(10) If the ACK/NACK for the data of downlink subframe 1 is NACK, the ACK/NACK for the data of downlink subframe 2 is ACK, the ACK/NACK for the data of downlink subframe 3 is NACK and the ACK/NACK for the data of downlink subframe 4 is ACK in one cell, mobile station device 5 generates NACK as the second receipt acknowledgement.

(11) If the ACK/NACK for the data of downlink subframe 1 is NACK, the ACK/NACK for the data of downlink subframe 2 is NACK, the ACK/NACK for the data of downlink subframe 3 is ACK and the ACK/NACK for the data of downlink subframe 4 is ACK in one cell, mobile station device 5 generates NACK as the second receipt acknowledgement.

(12) If the ACK/NACK for the data of downlink subframe 1 is ACK, the ACK/NACK for the data of downlink subframe 2 is NACK, the ACK/NACK for the data of downlink subframe 3 is NACK and the ACK/NACK for the data of downlink subframe 4 is NACK in one cell, mobile station device 5 generates NACK as the second receipt acknowledgement.

(13) If the ACK/NACK for the data of downlink subframe 1 is NACK, the ACK/NACK for the data of downlink subframe 2 is ACK, the ACK/NACK for the data of downlink subframe 3 is NACK and the ACK/NACK for the data of downlink subframe 4 is NACK in one cell, mobile station device 5 generates NACK as the second receipt acknowledgement.

(14) If the ACK/NACK for the data of downlink subframe 1 is NACK, the ACK/NACK for the data of downlink subframe 2 is NACK, the ACK/NACK for the data of downlink subframe 3 is NACK and the ACK/NACK for the data of downlink subframe 4 is ACK in one cell, mobile station device 5 generates NACK as the second receipt acknowledgement.

(15) If the ACK/NACK for the data of downlink subframe 1 is NACK, the ACK/NACK for the data of downlink subframe 2 is NACK, the ACK/NACK for the data of downlink subframe 3 is ACK and the ACK/NACK for the data of downlink subframe 4 is NACK in one cell, mobile station device 5 generates NACK as the second receipt acknowledgement.

(16) If the ACK/NACK for the data of downlink subframe 1 is NACK, the ACK/NACK for the data of downlink subframe 2 is NACK, the ACK/NACK for the data of downlink subframe 3 is NACK and the ACK/NACK for the data of downlink subframe 4 is NACK in one cell, mobile station device 5 generates NACK as the second receipt acknowledgement.

A downlink subframe of which data is not received is not the object of logical operation by mobile station device 5. By way of example, assume that data of downlink subframes 1, 2, and 3 are received while data of downlink subframe 4 is not received. Mobile station device 5 executes logical operation on the ACKs/NACKs for the data of downlink subframes 1, 2, and 3, and thereby generates the second receipt acknowledgement. If no data is received in any downlink subframe of a cell, mobile station device 5 does not generate the second receipt acknowledgement.

<Spatial Bundling>

Spatial bundling will be described. When special bundling is set, mobile station device 5 executes a logical operation on the ACKs/NACKs (first receipt acknowledgements) for the plurality of data (transport blocks; hereinafter also referred to as "code words") transmitted through a PDSCH to which spatial multiplexing is applied, to generate a piece of information (second receipt acknowledgement) collecting the plurality of first receipt acknowledgements.

By way of example, as the logical operation, mobile station device 5 executes a logical multiplication. If the plurality of ACKs/NACKs (first receipt acknowledgements) on which spatial bundling is to be executed are all ACK, mobile station device 5 generates ACK as the second receipt acknowledgement, and transmits the same to base station device 3. If at least one of the plurality of ACKs/NACKs (first receipt acknowledgements) on which spatial bundling is to be executed is NACK, mobile station device 5 generates NACK as the second receipt acknowledgement, and transmits the same to base station device 3. In the present embodiment, mobile station device 5 recognizes whether the spatial multiplexing has been applied to the PDSCH and recognizes the number of data included in one PDSCH, based on the transmission mode set by base station device 3 and on the detected PDCCH.

An example of ACK/NACK spatial bundling will be described. Assume that transmission of two data (first and second data) is set as the transmission mode for mobile station device 5.

(1) If the ACK/NACK for the first data is ACK and the ACK/NACK for the second data is ACK, mobile station device 5 generates ACK as the second receipt acknowledgement.

(2) If the ACK/NACK for the first data is ACK and the ACK/NACK for the second data is NACK, mobile station device 5 generates NACK as the second receipt acknowledgement.

(3) If the ACK/NACK for the first data is NACK and the ACK/NACK for the second data is ACK, mobile station device 5 generates NACK as the second receipt acknowledgement.

(4) If the ACK/NACK for the first data is NACK and the ACK/NACK for the second data is NACK, mobile station device 5 generates NACK as the second receipt acknowledgement.

<ACK/NACK Channel Selection with Time Domain Bundling>

Next, ACK/NACK channel selection with time domain bundling will be described. When time domain bundling is set, mobile station device 5 executes the time domain bundling process cell by cell. Next, using the second receipt acknowledgements of the plurality of cells on which time domain bundling has been executed, mobile station device 5 executes the process of ACK/NACK channel selection.

Using FIG. 8, an example of the process will be described. Specifically, mobile station device 5 executes time domain bundling on the data received from a plurality of downlink subframes of a primary cell, thereby sets the second receipt acknowledgement for the primary cell to the 1st ACK/NACK, and executes time domain bundling on the data received from a plurality of downlink subframes of a secondary cell, and thereby sets the second receipt acknowledgement for the secondary cell to the 2nd ACK/NACK. In this manner, mobile station device 5 executes the ACK/NACK channel selection.

It is noted that downlink data may be received from a special subframe, and in the process related to the time domain bundling, a special subframe is processed as a part of downlink subframes.

Mobile station device 5 determines candidate resources used for PUCCH resource selection related to the ACK/NACK channel selection, based on the PDCCH detected in the downlink subframe to which data is allocated most recently, in each cell. It is noted that downlink data may be received from a special subframe, and in the process related to the time domain bundling, a special subframe is processed as a part of downlink subframes. For a cell to which candidate resources are implicitly allocated, mobile station device 5 determines resources related to the CCEs used for the corresponding PDCCH detected in the subframe to which data is allocated most recently in the cell to be the candidate resources, and uses the resources for PUCCH resource selection process. For a cell to which candidate resources are explicitly allocated, mobile station device 5 determines the resources indicated by the control information of the corresponding PDCCH detected in the subframe to which data is allocated most recently in the cell to be the candidate resources, and uses the resources for PUCCH resource selection process. Alternatively, for a cell to which candidate resources are explicitly allocated, mobile station device 5 determines the resources allocated in advance by RRC signaling to the corresponding PDCCH detected in the subframe to which data is allocated most recently in the cell to be the candidate resources, and uses the resources for PUCCH resource selection process.

Using FIG. 8, an example of the process will be described.

For a primary cell, mobile station device 5 determines the resources related to the CCEs used for the PDCCH detected in the downlink subframe to which the data is allocated most recently, to be the PUCCH candidate resources for the ACK/NACK channel selection.

In a configuration in which a PDCCH corresponding to a secondary cell PDSCH is detected in a primary cell, for the secondary cell, mobile station device 5 determines the resources related to the CCEs used for the PDCCH detected in the downlink subframe to which the data is allocated most recently, to be the PUCCH candidate resources for the ACK/NACK channel selection.

In a configuration in which a PDCCH corresponding to a secondary cell PDSCH is detected in a secondary cell, for the secondary cell, mobile station device 5 determines the resources indicated by the control information of PDCCH detected in the downlink subframe to which data is allocated most recently, to be the PUCCH candidate resources for the ACK/NACK channel selection. Alternatively, in a configuration in which a PDCCH corresponding to a secondary cell PDSCH is detected in a secondary cell, for the secondary cell, mobile station device 5 determines the resources allocated in advance by RRC signaling to the corresponding PDCCH detected in the subframe to which data is allocated most recently in the cell to be the candidate resources for the ACK/NACK channel selection.

If no data is received in any downlink subframe of a cell, mobile station device 5 does not generate the second receipt acknowledgement for the cell. If data is received in at least one downlink subframe of a cell, mobile station device 5 generates the second receipt acknowledgement for the cell. An example in which two cells (primary cell 1 and secondary cell 1) are configured and single data transmission takes place in each cell will be described.

(1) If data is received in at least one downlink subframe of primary cell 1, and data is received in at least one downlink subframe of secondary cell 1, mobile station device 5 generates two second receipt acknowledgements (one second receipt acknowledgement for primary cell 1 and one second receipt acknowledgement for secondary cell 1).

(2) If data is received in at least one downlink subframe of primary cell 1, and no data is received in any of the downlink subframes of secondary cell 1, mobile station device 5 generates one second receipt acknowledgement (one second receipt acknowledgement for primary cell 1).

(3) If no data is received in any of the downlink subframe of primary cell 1, and data is received in at least one downlink subframe of secondary cell 1, mobile station device 5 generates one second receipt acknowledgement (one second receipt acknowledgement for secondary cell 1).

Next, an example in which two cells (primary cell 1 and secondary cell 1) are configured, spatial multiplexing is applied to each cell and transmission of two data takes place in each cell will be described.

(1) If two data are received in at least one downlink subframe of primary cell 1, and two data are received in at least one downlink subframe of secondary cell 1, mobile station device 5 generates four second receipt acknowledgements (two second receipt acknowledgements for primary cell 1 and two second receipt acknowledgements for secondary cell 1).

(2) If two data are received in at least one downlink subframe of primary cell 1, and no data is received in any of the downlink subframe of secondary cell 1, mobile station device 5 generates two second receipt acknowledgements (two second receipt acknowledgements for primary cell 1).

(3) If no data is received in any of the downlink subframe of primary cell 1, and two data are received in at least one downlink subframe of secondary cell 1, mobile station device 5 generates two second receipt acknowledgements (two second receipt acknowledgements for secondary cell 1).

Next, an example in which two cells (a primary cell and a secondary cell) are configured, spatial multiplexing is applied to primary cell 1 and transmission of two data takes place, and transmission of single data takes place in secondary cell 1 will be described.

(1) If two data are received in at least one downlink subframe of primary cell 1, and one data is received in at least one downlink subframe of secondary cell 1, mobile station device 5 generates three second receipt acknowledgements (two second receipt acknowledgements for primary cell 1 and one second receipt acknowledgement for secondary cell 1).

(2) If two data are received in at least one downlink subframe of primary cell 1, and no data is received in any of the downlink subframe of secondary cell 1, mobile station device 5 generates two second receipt acknowledgements (two second receipt acknowledgements for primary cell 1).

(3) If no data is received in any of the downlink subframe of primary cell 1, and one data is received in at least one downlink subframe of secondary cell 1, mobile station device 5 generates one second receipt acknowledgement (one second receipt acknowledgement for secondary cell 1).

Since mobile station device 5 determines the candidate resources used for PUCCH resource selection related to the ACK/NACK channel selection based on the PDCCH detected in each cell, if no PDCCH including DCI addressed to the device itself is detected and no data is received for the cell, allocation of candidate resource related to the cell is unavailable. In that case, mobile station device 5 executes the resource selection process using only the available candidate resources that have been allocated.

In the transmission mode in which transmission of two data is done basically, it is possible that only one data sequence is transmitted. By way of example, such a manner of transmission is realized if base station device 3 indicates that only one of two data sequences subjected to spatial multiplexing is valid and the other data sequence is invalid. If the first data sequence or the second data sequence is received in at least one downlink subframe in a cell, mobile station device 5 generates two second receipt acknowledgements for the cell. By way of example, if only the first data sequence is received in at least one downlink subframe and the second data sequence is not received in any of the downlink subframes of a cell, mobile station device 5 generates two second receipt acknowledgements for the cell.

<ACK/NACK Channel Selection with Spatial Bundling>

Next, the ACK/NACK channel selection using spatial bundling will be described. When spatial bundling is set, mobile station device 5 executes the spatial bundling process cell by cell. Next, using the second receipt acknowledgements of the plurality of cells on which spatial bundling has been executed, mobile station device 5 executes the process of ACK/NACK channel selection.

An example of the 2nd ACK/NACK channel selection with spatial bundling will be described. Assume, for example, that transmission mode in which two cells are configured for cell aggregation, and PDSCH including two types of data (first data sequence and second data sequence) is transmitted using spatial multiplexing from base station device 3, is set for mobile station terminal 5. By way of example, mobile station device 5 executes spatial bundling on the ACK/NACK for the data received by a primary cell and executes spatial bundling on the ACK/NACK for the data received by a secondary cell. Here, mobile station device 5 executes the ACK/NACK channel selection shown in FIG. 8. In the primary cell, mobile station device 5 executes spatial bundling on the two data received through PDSCH with spatial multiplexing, and sets the second receipt acknowledgement for the primary cell to the 1st ACK/NACK. Further, in the secondary cell, mobile station device 5 executes spatial bundling on the two data received through PDSCH with spatial multiplexing, and sets the second receipt acknowledgement for the secondary cell to the 2nd ACK/NACK, and executes the ACK/NACK channel selection.

Mobile station device 5 determines candidate resources used for PUCCH resource selection related to the ACK/NACK channel selection, based on the PDCCH detected in each cell. For a cell to which candidate resources are implicitly allocated, mobile station device 5 determines resources having the corresponding relation to the CCEs used for the corresponding PDCCH to be the candidate resources, and uses the resources for PUCCH resource selection process. For a cell to which candidate resources are explicitly allocated, mobile station device 5 determines the resources indicated by the control information of the corresponding PDCCH to be the candidate resources, and uses the resources for PUCCH resource selection process. Alternatively, for a cell to which candidate resources are explicitly allocated, mobile station device 5 determines the resources allocated in advance by RRC signaling to the corresponding PDCCH to be the candidate resources, and uses the resources for PUCCH resource selection process.

If no data is received in any downlink subframe of a cell, mobile station device 5 does not generate the second receipt acknowledgement for the cell. An example in which two cells (primary cell 1 and secondary cell 1) are configured, transmission of two data takes place in each cell, and spatial bundling is applied to each cell will be described.

(1) If two data are received in primary cell 1 and two data are received in secondary cell 1, mobile station device 5 generates two receipt acknowledgements (one second receipt acknowledgement for primary cell 1 and one second receipt acknowledgement for secondary cell 1).

(2) If two data are received in primary cell 1 and no data is received in secondary cell 1, mobile station device 5 generates one second receipt acknowledgement (one second receipt acknowledgement for primary cell 1).

(3) If no data is received in primary cell 1 and two data are received in secondary cell 1, mobile station device 5 generates one second receipt acknowledgement (one second receipt acknowledgement for secondary cell 1).

Next, an example in which two cells (primary cell 1 and secondary cell 1) are configured, transmission of two data takes place in each cell, and spatial bundling is applied only to secondary cell 1 will be described.

(1) If two data are received in primary cell 1 and two data are received in secondary cell 1, mobile station device 5 generates three receipt acknowledgements (two second receipt acknowledgements for primary cell 1 and one second receipt acknowledgement for secondary cell 1).

(2) If two data are received in primary cell 1 and no data is received in secondary cell 1, mobile station device 5 generates two receipt acknowledgements (two second receipt acknowledgements for primary cell 1).

(3) If no data is received in primary cell 1 and two data are received in secondary cell 1, mobile station device 5 generates one receipt acknowledgement (one second receipt acknowledgement for secondary cell 1).

In a cell where spatial bundling is not applied, mobile station device 5 sets the first receipt acknowledgement directly as the second receipt acknowledgement to be used for subsequent processes.

Since mobile station device 5 determines the candidate resources used for PUCCH resource selection related to the ACK/NACK channel selection based on the PDCCH detected in each cell, if no PDCCH including DCI addressed to the device itself is detected and no data is received for the cell, allocation of candidate resource related to the cell is unavailable. In that case, mobile station device 5 executes the resource selection process using only the available candidate resources that have been allocated.

In the transmission mode in which transmission of two data is done basically, it is possible that only one data sequence is transmitted. By way of example, such a manner of transmission is realized if base station device 3 indicates that only one of two data sequences subjected to spatial multiplexing is valid and the other data sequence is invalid. If only the first data sequence is received in a cell to which spatial bundling is not applied (if the second data sequence is invalid), mobile station device 5 sets the resources for the first data sequence of the cell and the resources for the second data sequence of the cell to be the candidate resources to be used for PUCCH resource selection for the ACK/NACK channel selection. If only the second data sequence is received in a cell to which spatial bundling is not applied (if the first data sequence is invalid), mobile station device 5 sets the resources for the second data sequence of the cell and the resources for the first data sequence of the cell to be the candidate resources to be used for PUCCH resource selection for the ACK/NACK channel selection.

<ACK/NACK Channel Selection with Spatial Bundling and Time Domain Bundling>

Next, the ACK/NACK channel selection using spatial bundling and time domain bundling will be described. First, mobile station device 5 executes the spatial bundling process on each downlink subframe of each cell. Next, mobile station device 5 executes the time domain bundling process cell by cell. Mobile station device 5 executes a logical operation on the ACKs/NACKs subjected to the spatial bundling in each of the plurality of downlink subframes and thereby generates the second receipt acknowledgement cell by cell. Thereafter, mobile station device 5 executes a process similar to the processes described with respect to the ACK/NACK channel selection with time domain bundling, and using the second receipt acknowledgements for the plurality of cells, executes the ACK/NACK channel selection process.

If no data is received in any downlink subframe of a cell, mobile station device 5 does not generate the second receipt acknowledgement for the cell. An example in which two cells (primary cell 1 and secondary cell 1) are configured, spatial multiplexing is applied to each cell and transmission of two data takes place in each cell, and spatial bundling is applied to each cell will be described.

(1) If two data are received in at least one downlink subframe of primary cell 1 and two data are received in at least one downlink subframe of secondary cell 1, mobile station device 5 generates two second receipt acknowledgements (one second receipt acknowledgement for primary cell 1 and one second receipt acknowledgement for secondary cell 1).

(2) If two data are received in at least one downlink subframe of primary cell 1 and no data is received in any downlink subframe of secondary cell 1, mobile station device 5 generates one second receipt acknowledgement (one receipt acknowledgement for primary cell 1).

(3) If no data is received in any downlink subframe of primary cell 1 and two data are received in at least one downlink subframe of secondary cell 1, mobile station device 5 generates one second receipt acknowledgement (one second receipt acknowledgement for secondary cell 1).

Next, an example in which two cells (primary cell 1 and secondary cell 1) are configured, spatial multiplexing is applied to each cell and transmission of two data takes place in each cell, and spatial bundling is applied only to secondary cell 1 will be described.

(1) If two data are received in at least one downlink subframe of primary cell 1 and two data are received in at least one downlink subframe of secondary cell 1, mobile station device 5 generates three second receipt acknowledgements (two second receipt acknowledgements for primary cell 1 and one second receipt acknowledgement for secondary cell 1).

(2) If two data are received in at least one downlink subframe of primary cell 1 and no data is received in any downlink subframe of secondary cell 1, mobile station device 5 generates two second receipt acknowledgements (two second receipt acknowledgements for primary cell 1).

(3) If no data is received in any downlink subframe of primary cell 1 and two data are received in at least one downlink subframe of secondary cell 1, mobile station device 5 generates one second receipt acknowledgement (one second receipt acknowledgement for secondary cell 1).

Since mobile station device 5 determines the candidate resources used for PUCCH resource selection related to the ACK/NACK channel selection based on the PDCCH detected in each cell, if no PDCCH including DCI addressed to the device itself is detected and no data is received for the cell, allocation of candidate resource related to the cell is unavailable. In that case, mobile station device 5 executes the resource selection process using only the available candidate resources that have been allocated.

In the transmission mode in which transmission of two data is done basically, it is possible that only one data sequence is transmitted. By way of example, such a manner of transmission is realized if base station device 3 indicates that only one of two data sequences subjected to spatial multiplexing is valid and the other data sequence is invalid. If only the first data sequence is received in at least one downlink subframe of a cell to which spatial bundling is not applied and the second data sequence is not received in any downlink subframe (if the second data is invalid), mobile station device 5 sets the resources for the first data sequence of the cell and the resources for the second data sequence of the cell to be the candidate resources to be used for PUCCH resource selection for the ACK/NACK channel selection. If only the second data sequence is received in at least one downlink subframe of a cell to which spatial bundling is not applied and the first data sequence is not received in any downlink subframe (if the first data is invalid), mobile station device 5 sets the resources for the second data sequence of the cell and the resources for the first data sequence of the cell to be the candidate resources to be used for PUCCH resource selection for the ACK/NACK channel selection. If the first data sequence or the second data sequence is received in any one downlink subframe in a cell to which spatial bundling is not applied, mobile station device 5 generates two second receipt acknowledgements for the cell. By way of example, if only the first data sequence is received in at least one downlink subframe of a cell to which spatial bundling is not applied and the second data sequence is not received in any downlink subframe, mobile station device 5 generates two second receipt acknowledgements for the cell.

<Overall Configuration of Base Station Device 3>

Figure 11:
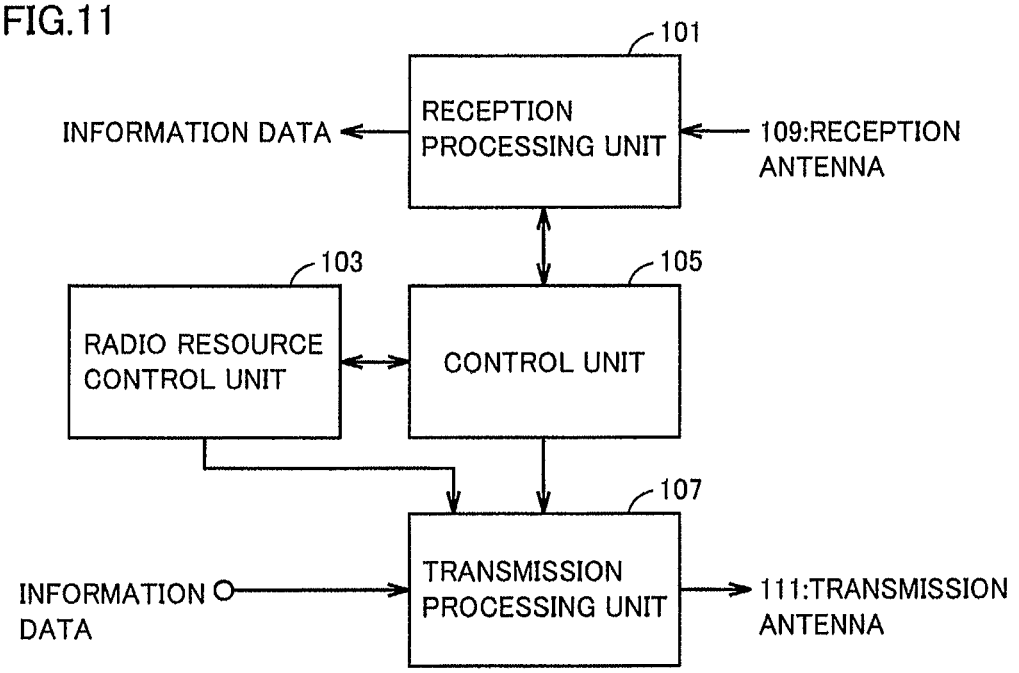
FIG. 11 is a schematic block diagram showing a configuration of a base station device in accordance with an embodiment of the present invention.

Next, referring to FIGS. 11 to 13, configuration of base station device 3 in accordance with the present embodiment will be described. FIG. 11 is a schematic block diagram showing the configuration of base station device 3 in accordance with an embodiment of the present invention. As shown in FIG. 11, base station device 3 includes a reception processing unit (receiving unit) 101, a radio resource control unit 103, a control unit 105 and a transmission processing unit 107.

Reception processing unit 101 demodulates and decodes PUCCH and/or PUSCH reception signals received by a reception antenna 109 from mobile station device 5, using an uplink reference signal and thereby extracts control information and/or information data, in accordance with an instruction from control unit 105. Reception processing unit 101 executes a process for extracting UCI from the uplink subframe and/or uplink physical resource block to which the device itself has allocated PUCCH resource for mobile station device 5. Reception processing unit 101 receives instructions from control unit 105 as to what process is to be done on which uplink subframe and/or which uplink physical resource block. By way of example, reception processing unit 101 is instructed by control unit 105 to execute a detection process, in which multiplication and combining of code sequence in time domain and/or multiplication and combining of code sequence in frequency domain is executed on PUCCH signals (PUCCH format 1a, PUCCH format 1b) for the ACK/NACK. Further, reception processing unit 101 receives an instruction of a code sequence in frequency domain and/or code sequence in time domain to be used for the process of detecting UCI from PUCCH, from control unit 105.

Reception processing unit 101 outputs the extracted UCI to control unit 105, and outputs information data to an upper layer. By way of example, reception processing unit 101 performs a process of detecting information of a plurality of ACKs/NACKs from the PUCCH signal transmitted using ACK/NACK channel selection. Reception processing unit 101 recognizes candidate resources of ACK/NACK channel selection based on the PDCCH transmitted to mobile station device 5, detects whether or not a signal has been transmitted by each candidate resource and demodulates a signal of the candidate resource from which a signal is determined to be transmitted, and thereby detects information of a plurality of ACKs/NACKs. Similarly, reception processing unit 101 performs a process of detecting information of a plurality of ACKs/NACKs from the PUCCH signals transmitted by using time domain bundling and ACK/NACK channel selection, the PUCCH signals transmitted by using spatial bundling and ACK/NACK channel selection, or the PUCCH signals transmitted by using time domain bundling, spatial bundling and ACK/NACK channel selection. Reception processing unit 101 outputs the extracted UCI to control unit 105, and outputs information data to an upper layer. Details of reception processing unit 101 will be described later.

Radio resource control unit 103 performs resource allocation to PDCCH of each mobile station device 5, resource allocation to PUCCH, allocation of downlink physical resource blocks to PDSCH, allocation of uplink physical resource blocks to PUSCH, and setting of modulation method, code rate, and transmit power control values of various channels. Radio resource control unit 103 also sets code sequences of the frequency domain and code sequences of time domain for the PUCCH. Further, radio resource control unit 103 outputs pieces of information indicating set PUCCH resource allocation and the like to control unit 105.

Radio resource control unit 103 sets a method of ACK/NACK transmission when cell aggregation is used. The ACK/NACK transmission method when cell aggregation is used includes: a method of transmitting ACK/NACK using ACK/NACK channel selection; a method of transmitting ACK/NACK using time domain bundling; and a method of transmitting ACK/NACK using spatial bundling. Radio resource control unit 103 may simultaneously set two or more of the methods mentioned above. Part of the information set by radio resource control unit 103 is notified to mobile station device 5 using transmission processing unit 107. By way of example, information representing method of transmitting ACK/NACK using cell aggregation, information indicating values of some parameters related to transmit power of PUSCH, and information indicating values of some parameters related to transmit power of PUCCH are notified to mobile station device 5.

Based on the UCI obtained using PUCCH at reception processing unit 101 and input through control unit 105, radio resource control unit 103 sets radio resource allocation of PDSCH and the like. By way of example, if ACK/NACK obtained by using PUCCH is input, radio resource control unit 103 performs resource allocation of PDSCH having NACK indicated as its ACK/NACK, to mobile station device 5.

Radio resource control unit 103 configures, if its own device communicates using cell aggregation, a plurality of downlink component carriers and/or a plurality of uplink component carriers for mobile station device 5. Further, radio resource control unit 103 sets a PDCCH CC, a PDSCH CC to have a correspondence relation with the PDCCH CC, primary cell, secondary cell and the like. Radio resource control unit 103 outputs information indicating which cell is to be set as the primary cell, information indicating a downlink component carrier related as a PDCCH CC corresponding to a PDSCH CC of each secondary cell, and so on through transmission processing unit 107 to control unit 105, to give notice to mobile station device 5.

Radio resource control unit 103 outputs various control signals to control unit 105. By way of example, the control signals include a control signal indicating resource allocation of PUCCH, and a control signal indicating a detection process carried out on the PUCCH signal received by reception processing unit 101. By way of example, radio resource control unit 103 outputs control signals indicating PUCCH resource for ACK/NACK, uplink subframes as candidate resources of PUCCH for ACK/NACK using ACK/NACK channel selection, uplink physical resource blocks, code sequence of time domain and code sequence of frequency domain and the like.

Based on control signals input from radio resource control unit 103, control unit 105 performs, on transmission processing unit 107, control of allocation of downlink physical resource blocks to PDSCH, resource allocation for PDCCH, setting of modulation method for PDSCH, and setting of code rate for PDSCH and PDCCH. Further, based on control signals input from radio resource control unit 103, control unit 105 generates DCI to be transmitted using PDCCH, and outputs it to transmission processing unit 107. The DCI transmitted using PDCCH includes a downlink assignment and an uplink grant.

Control unit 105 controls transmission processing unit 107 such that information indicating the downlink component carrier and the uplink component carrier used for communication, information indicating the primary cell, information indicating the corresponding relation between PDSCH CC and PDCCH CC, ACK/NACK transmission method used in cell aggregation and information indicating PUCCH resource allocation are transmitted through transmission processing unit 107 to mobile station device 5 using PDSCH. Further, control unit 105 performs control such that candidate resources of PUCCH resource selection process of ACK/NACK channel selection are transmitted through transmission processing unit 107 to mobile station device 5 using PDCCH. Information indicating potential candidate resources for the PUCCH resource selection process for ACK/NACK channel selection is notified to mobile station device 5 through transmission processing unit 107.

Based on control signals input from radio resource control unit 103, control unit 105 controls reception processing unit 101 in connection with the allocation of uplink physical resource blocks for PUSCH, PUCCH resource allocation, setting of modulation method for PUSCH and PUCCH, setting of PUSCH code rate, detection process for PUCCH and setting of code sequence for PUCCH. Further, if UCI transmitted using PUCCH from mobile station device 5 is input through reception processing unit 101, control unit 105 outputs the input UCI to radio resource control unit 103. By way of example, if a piece of information indicating ACK/NACK channel selection is input to radio source control unit 103, control unit 105 recognizes candidate resources for ACK/NACK channel selection, based on the PDCCH transmitted to mobile station device 5. Control unit 105 controls reception processing unit 101 such that it detects whether or not a signal is transmitted in each candidate resource and demodulates the signal of the candidate resource which is determined to have a signal transmitted therein, so as to detect information of a plurality of ACKs/NACKs. Control unit 105 does not include a resource corresponding to a cell that transmitted no PDSCH in any downlink subframe, in the candidate resources of ACK/NACK channel selection.

Based on a control signal input from control unit 105, transmission processing unit 107 generates a signal to be transmitted using PDCCH and/or PDSCH, and transmits it through transmission antenna 111. Transmission processing unit 107 transmits information indicating downlink component carrier and uplink component carrier used for communication using cell aggregation input from radio resource control unit 103, information indicating the primary cell, information indicating the corresponding relation between PDSCH CC and PDCCH CC, ACK/NACK transmission method used in cell aggregation, information indicating PUCCH resource candidates, information indicating values of some parameters related to PUSCH transmit power, information indicating values of some parameters related to PUCCH transmit power, and information data input from an upper layer, to mobile station device 5 using PDSCH. Further, transmission processing unit 107 transmits DCI input from control unit 105 to mobile station device 5 using PDCCH. For the simplicity of description, in the following, it is assumed that the information data includes pieces of information related to various different types of control. Details of transmission processing unit 107 will be described later.

<Configuration of Transmission Processing Unit 107 of Base Station Device 3>

In the following, details of transmission processing unit 107 of base station device 3 will be described. FIG. 12 is a schematic block diagram showing a configuration of transmission processing unit 107 of base station device 3 in accordance with an embodiment of the present invention. As shown in FIG. 12, transmission processing unit 107 includes: a plurality of physical downlink shared channel processing units 201-1 to 201-M (hereinafter physical downlink shared channel processing units 201-1 to 201-M will be generally referred to as "physical downlink shared channel processing unit 201"); a plurality of physical downlink control channel processing units 203-1 to 203-M (hereinafter physical downlink control channel processing units 203-1 to 203-M will be generally referred to as "physical downlink control channel processing unit 203"); a downlink pilot channel processing unit 205; a multiplexing unit 207; an IFFT (Inverse Fast Fourier Transform) unit 209; a GI (Guard Interval) inserting unit 211; a D/A (Digital/Analog converter) unit 213; a transmission RF (Radio Frequency) unit 215; and transmission antenna 111. Physical downlink shared channel processing units 201 each have the same configuration and same function, and physical downlink control channel processing units 203 each have the same configuration and same function. Therefore, only one of respective units will be described as a representative. In the description of transmission processing unit 107, first, an example with one transmission antenna (when transmission of single data takes place) will be described, and an example in which a plurality of transmission antennas and a processing unit enabling spatial multiplexing on PDSCH are provided (when transmission of two data takes place) will be described later.

Figure 12:
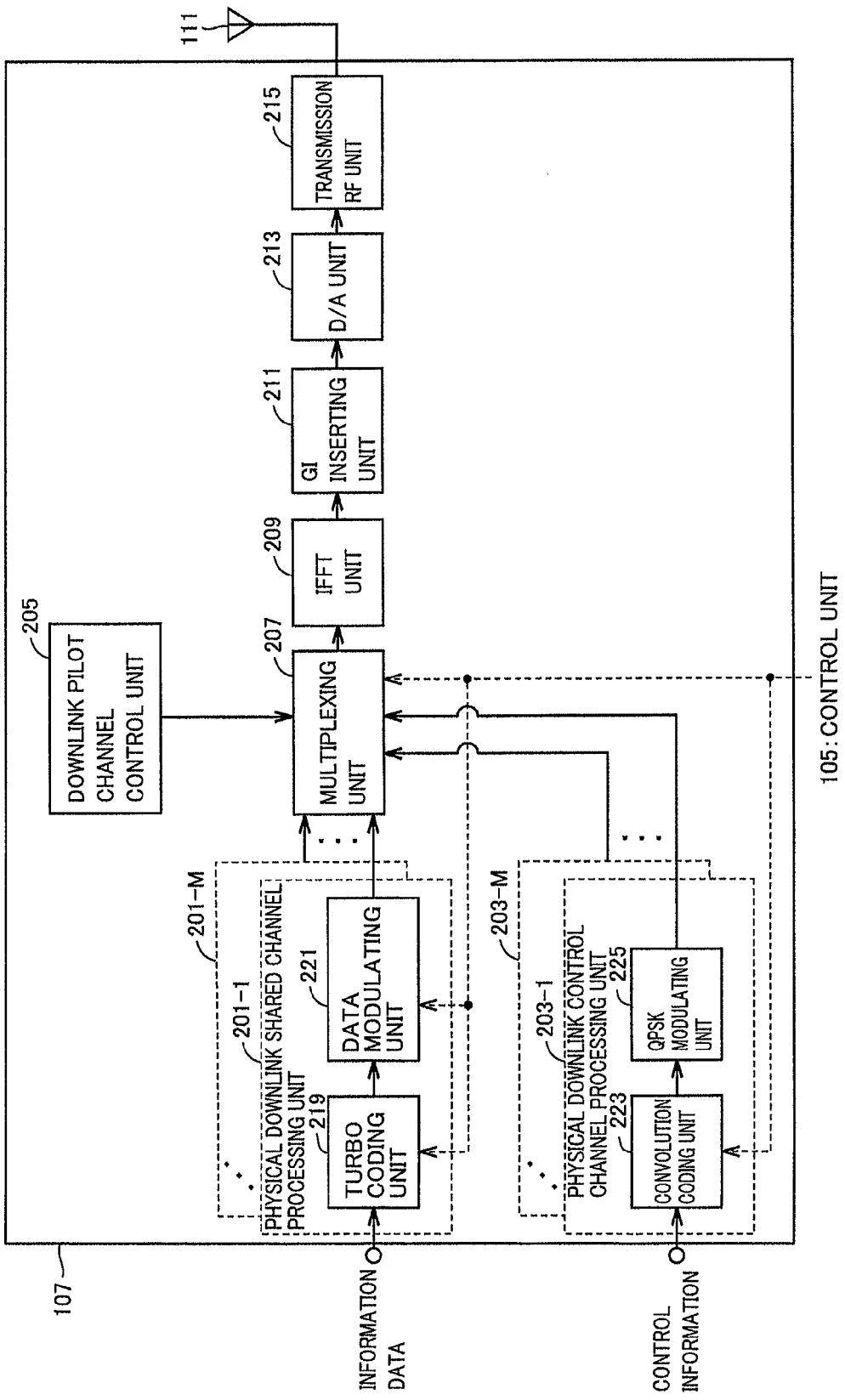
FIG. 12 is a schematic block diagram showing a configuration of a transmission processing unit of the base station device in accordance with an embodiment of the present invention.
Figure 13:
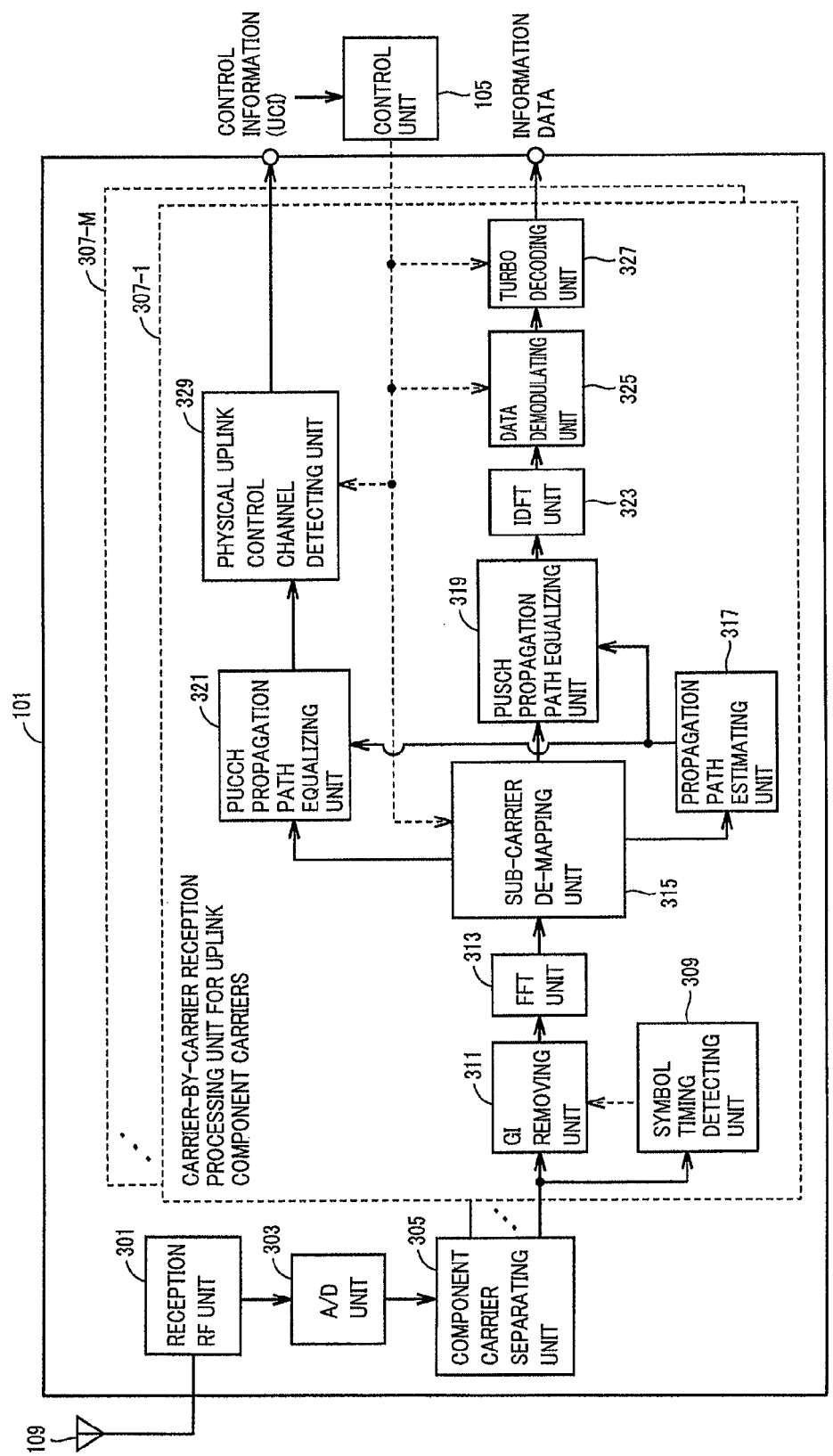
FIG. 13 is a schematic block diagram showing a configuration of a reception processing unit of the base station device in accordance with an embodiment of the present invention.

As shown in FIG. 12, physical downlink shared channel processing unit 201 includes a turbo coding unit 219 and a data modulating unit 221. Further, as shown in FIG. 12, physical downlink control channel processing unit 203 includes a convolution coding unit 223 and a QPSK modulating unit 225. Physical downlink shared channel processing unit 201 performs a baseband signal processing for sending information data to mobile station device 5 by OFDM method. Turbo coding unit 219 performs turbo coding with code rate input from control unit 105, to enhance error resilience of data, and outputs the result to data modulating unit 221. Data modulating unit 221 modulates the data encoded by turbo coding unit 219 by a modulation method input from control unit 105 such as QPSK (Quadrature Phase Shift Keying), 16QAM (16 Quadrature Amplitude Modulation) or 64 QAM (64 Quadrature Amplitude Modulation), and thereby generates a signal sequence of modulated symbols. Data modulating unit 221 outputs the generated signal sequence to multiplexing unit 207.

Physical downlink control channel processing unit 203 performs baseband signal processing for transferring DCI input from control unit 105 in OFDM method. Convolution coding unit 223 performs convolution coding to enhance DCI error resilience, based on the code rate input from control unit 105. Here, DCI is controlled bit by bit. Further, convolution coding unit also performs rate matching to adjust the number of output bits with respect to the bits that have been subjected to the convolution coding, based on the code rate input from control unit 105. Convolution coding unit 223 outputs the coded DCI to QPSK modulating unit 225. QPSK modulating unit 225 modulates the DCI encoded by convolution coding unit 223 by QPSK modulation method, and outputs the modulated signal sequence of modulation symbols to multiplexing unit 207. Downlink pilot channel processing unit 205 generates a downlink reference signal (also referred to as "Cell Specific RS") as a known signal in mobile station device 5, and outputs it to multiplexing unit 207.

Multiplexing unit 207 multiplexes the signals input from downlink pilot channel processing unit 205, the signals input from physical downlink shared channel processing unit 201, and the signals input from physical downlink control channel processing unit 203, respectively, on down link subframes in accordance with an instruction from control unit 105. Control signals related to allocation of downlink physical resource blocks for PDSCH and PDCCH resource allocation set by radio resource control unit 103 are input to control unit 105. Control unit 105 controls the processing by multiplexing unit 207 based on the input control signals.

Multiplexing unit 207 multiplexes PDSCH and PDCCH basically in time-multiplexing manner as shown in FIG. 3. Further, multiplexing unit 207 multiplexes downlink pilot channel and other channels in time/frequency multiplexing. Further, multiplexing unit 207 multiplexes PDSCHs addressed to mobile station devices 5 on a pair by pair basis on downlink physical resource blocks. Multiplexing unit 207 may multiplex PDSCHs using a plurality of pairs of downlink physical resource blocks, for one mobile station device 5. Further, multiplexing unit 207 multiplexes PDCCHs addressed to each mobile station device 5 using CCE in the same downlink component carrier. Multiplexing unit 207 outputs multiplexed signals to IFFT unit 209.

IFFT unit 209 performs Inverse Fast Fourier Transform on the signals multiplexed by multiplexing unit 207 and performs OFDM modulation, and outputs the result to GI inserting unit 211. GI inserting unit 211 adds guard interval to the signals subjected to OFDM modulation by IFFT unit 209, and thereby generates baseband digital signals consisting of OFDM symbols. As is well known, the guard interval is generated by replicating the head or tail of the transferred OFDM symbols. GI inserting unit 211 outputs the generated baseband digital signals to D/A unit 213. D/A unit 213 converts the baseband digital signals input from GI inserting unit 211 to analog signals, and outputs the signals to transmission RF unit 215. Transmission RF unit 215 generates in-phase and quadrature-phase components of intermediate frequency from the analog signals input from D/A unit 213, and removes unnecessary frequency component with respect to the intermediate frequency band. Next, transmission RF unit 215 converts the signals of intermediate frequency to signals of high frequency (up-converts), power-amplifies and transmits the results to mobile station device 5 through transmission antenna 111.

Next, an example in which a plurality of transmission antennas are provided and spatial multiplexing is done on PDSCH will be described. As compared with the example described with reference to FIG. 12 in which the number of transmission antennas is 1, a plurality of transmission antennas 111 are provided on base station device 3, and the processing units each consisting of multiplexing unit 207, IFFT unit 209, GI inserting unit 211, D/A unit 213 and transmission RF unit 215 are provided in the same number as the transmission antennas, on base station device 3. Further, a spatial multiplexing unit for performing the spatial multiplexing process is provided on base station device 3. The spatial multiplexing unit replicates the data sequence input from physical downlink shared channel processing unit 201, multiplies each replicated data sequence with a weight (hereinafter referred to as "pre-coding"), and outputs each data sequence multiplied by the weight to multiplexing unit 207 corresponding to each transmission antenna 111. By way of example, a plurality of signals of different phases and having amplitude of 1 are used as transmission weights. Thereafter, following the processes by IFFT unit 209, GI inserting unit 211, D/A unit 213 and transmission RF unit 215 corresponding to each transmission antenna 111, data sequences processed by the spatial multiplexing unit are transmitted from each transmission antenna 111.

<Configuration of Reception Processing Unit 101 of Base Station Device 3>

In the following, details of reception processing unit 101 of base station device 3 will be described. FIG. 13 is a schematic block diagram showing a configuration of reception processing unit 101 of base station device 3 in accordance with an embodiment of the present invention. As shown in FIG. 13, reception processing unit 101 includes a reception RF unit 301, an A/D (Analog/Digital converter) unit 303, a component carrier separating unit 305 and a plurality of carrier-by-carrier reception processing units 307-1 to 307-M for the uplink component carriers (hereinafter the carrier-by-carrier reception processing units 307-1 to 307-M for the uplink component carriers will be generally referred to as "carrier-by-carrier reception processing unit 307 for uplink component carriers"). Further, as shown in FIG. 13, carrier-by-carrier reception processing unit 307 for uplink component carriers includes a symbol timing detecting unit 309, a GI removing unit 311, an FFT unit 313, a subcarrier de-mapping unit 315, a propagation path estimating unit 317, a PUSCH propagation path equalizing unit 319, a PUCCH propagation path equalizing unit 321, an IDFT unit 323, a data demodulating unit 325, a turbo decoding unit 327 and a physical uplink control channel detecting unit 329. Since carrier-by-carrier reception processing units 307 for uplink component carriers each have the same configuration and same functions, only one will be described as a representative.

Reception RF unit 301 appropriately amplifies signals received by a reception antenna 109, converts to intermediate frequency (down-converts), removes unnecessary frequency components, regulates amplification level to maintain appropriate signal levels, and performs quadrature demodulation based on the in-phase and quadrature-phase components of the received signals. Reception RF unit 301 outputs the quadrature demodulated analog signals to A/D unit 303.

A/D unit 303 converts the analog signals that have been subjected to quadrature demodulation by reception RF unit 301 to digital signals, and outputs the converted digital signals to component carrier separating unit 305. Component carrier separating unit 305 separates the reception signals for each of uplink component carriers of the uplink system bandwidth, and outputs the result to each carrier-by-carrier reception processing unit 307 for uplink component carriers.

Carrier-by-carrier reception processing unit 307 for uplink component carriers performs demodulation and decoding of PUSCH and/or PUCCH in the uplink component carrier, and detects information data and/or UCI.

Symbol timing detecting unit 309 detects symbol timing based on the signal input from component carrier separating unit 305, and outputs a control signal indicating the detected symbol border timing to GI removing unit 311. Based on the control signal from symbol timing detecting unit 309, GI removing unit 311 removes a portion corresponding to the guard interval from the signals input from component carrier separating unit 305, and outputs the signals of remaining parts to FFT unit 313. FFT unit 313 performs Fast Fourier Transform on the signals input from GI removing unit 311, performs DFT-Spread-OFDM demodulation, and outputs the results to subcarrier de-mapping unit 315. The number of points of FFT unit 313 is the same as the number of points of an IFFT unit of mobile station device 5, which will be described later.

Based on the control signal input from control unit 105, subcarrier de-mapping unit 315 separates the signals demodulated by FFT unit 313 to an uplink reference signal for the uplink pilot channel, PUSCH signals and PUCCH signals. Subcarrier de-mapping unit 315 outputs the separated uplink reference signal to propagation path estimating unit 317, the separated PUSCH signal to PUSCH propagation path equalizing unit 319, and outputs the separated PUCCH signals to PUCCH propagation path equalizing unit 321.

Propagation path estimating unit 317 estimates fluctuation on the propagation path using the uplink reference signal separated by subcarrier de-mapping unit 315 and a known signal. Propagation path estimating unit 317 outputs the estimated propagation path estimated value to PUSCH propagation path equalizing unit 319 and PUCCH propagation path equalizing unit 321. PUSCH propagation path equalizing unit 319 equalizes amplitude and phase of PUSCH signals separated by subcarrier de-mapping unit 315 based on the propagation path estimated value input from propagation path estimating unit 317. Here, "equalization" refers to a process of returning the signals that have experienced propagation path fluctuation during radio communication to original states. PUSCH propagation path equalizing unit 319 outputs the adjusted signals to IDFT unit 323.

IDFT unit 323 performs Inverse Discrete Fourier Transform on the signals input from PUSCH propagation path equalizing unit 319 and outputs the results to data demodulating unit 325. Data demodulating unit 325 demodulates the PUSCH signals that have been subjected to transform by IDFT unit 323, and outputs the demodulated PUSCH signals to turbo decoding unit 327. The demodulation here corresponds to the method of modulation used by the data modulating unit of mobile station device 5. The modulation method is input from control unit 105. Turbo decoding unit 327 decodes information data from the demodulated PUSCH signals input from data demodulating unit 325. Code rate is input from control unit 105.

PUCCH propagation path equalizing unit 321 equalizes amplitude and phase of PUCCH signals separated by subcarrier de-mapping unit 315, based on the propagation path estimated value input from propagation path estimating unit 317. PUCCH propagation path equalizing unit 321 outputs the equalized signals to physical uplink control channel detecting unit 329.

Physical uplink control channel detecting unit 329 demodulates and decodes the signals input from PUCCH propagation path equalizing unit 321, and detects UCI. Physical uplink control channel detecting unit 329 performs a process for separating signals code-multiplexed in frequency domain and/or time domain. Physical uplink control channel detecting unit 329 performs a process for detecting ACKS/NACK, SR, CQI and the like from PUCCH signals code-multiplexed in frequency domain and/or time domain, using the code sequence used on the transmitting side. Specifically, physical uplink control channel detecting unit 329 multiplies subcarrier-by-subcarrier signals of PUCCH by each code of the code sequence, to combine signals multiplied by respective codes, as the detecting process using code sequence in the frequency domain, that is, the process for separating code-multiplexed signals in the frequency domain. Physical uplink control channel detecting unit 329 multiplies signals of each SC-FDMA symbol of PUCCH by each code of the code sequence and combine signals multiplied by respective codes, as the detecting process using code sequence in time domain, that is, the process for separating signals code-multiplexed in the time domain. Based on a control signal from control unit 105, physical uplink control channel detecting unit 329 sets the detecting process for the PUCCH signals.

Based on a control signal from control unit 105, physical uplink control channel detecting unit 329 performs a process for detecting information of a plurality of ACKs/NACKs from the PUCCH signals transmitted using ACK/NACK channel selection. Physical uplink control channel detecting unit 329 detects whether or not a signal has been transmitted by each candidate resource designated by control unit 105. By way of example, the process for detecting whether or not a signal has been transmitted is done based on whether or not electric power of a reception signal detected by the resource has exceeded a prescribed threshold value. Physical uplink control channel detecting unit 329 demodulates the signal of the candidate resource determined to have a signal transmitted thereon, and determines which signal point of QPSK it corresponds. Based on the resource on which the signal is detected and the signal point of demodulated QPSK, physical uplink control channel detecting unit 329 determines information of a plurality of ACKs/NACKs. It is noted that in physical uplink control channel detecting unit 329, relations among the information of a plurality ACKs/NACKs, resources selected for ACK/NACK channel selection, and QPSK signal points such as shown in FIGS. 8 to 10 are set. By the above-described process, physical uplink control channel detecting unit 329 determines information of a plurality of second receipt acknowledgements from the PUCCH signals transmitted using time domain bundling and ACK/NACK channel selection. Then, from the second receipt acknowledgement determined by physical uplink control channel detecting unit 329, control unit 105 determines what is the ACK/NACK (first receipt acknowledgement) for the data of each downlink subframe data. By the above-described process, physical uplink control channel detecting unit 329 determines information of a plurality of second receipt acknowledgements from the PUCCH signals transmitted using spatial bundling and ACK/NACK channel selection. Then, from the second receipt acknowledgement determined by physical uplink control channel detecting unit 329, control unit 105 determines what is the ACK/NACK (first receipt acknowledgement) for each data sequence that has been subjected to spatial multiplexing. By the above-described process, physical uplink control channel detecting unit 329 determines information of a plurality of second receipt acknowledgements from the PUCCH signals transmitted using time domain bundling, spatial bundling and ACK/NACK channel selection. Then, from the second receipt acknowledgement determined by physical uplink control channel detecting unit 329, control unit 105 determines what is the ACK/NACK (first receipt acknowledgement) for each data sequence that has been subjected to spatial multiplexing of each downlink subframe.

Based on the control information (DCI) transmitted using PDCCH and control information transmitted using PDSCH from base station device 3 to mobile station device 5, control unit 105 controls subcarrier de-mapping unit 315, data demodulating unit 325, turbo decoding unit 327, propagation path estimating unit 317 and physical uplink control channel detecting unit 329. Further, based on the control information transmitted from base station device 3 to mobile station device 5, control unit 105 recognizes of which resources (uplink subframe, uplink physical resource block, code sequence of frequency domain and/or code sequence of time domain) the PUSCH and/or PUCCH transmitted from each mobile station device is configured. Based on the control information (RRC signaling) transmitted from base station device 3 to mobile station device 5 and on PDCCH (CCE), control unit 105 recognizes of which resources the PUCCH candidate resources that may possibly be transmitted by each mobile station device 5 using ACK/NACK channel selection are configured.

<Overall Configuration of Mobile Station Device 5>

Figure 14:
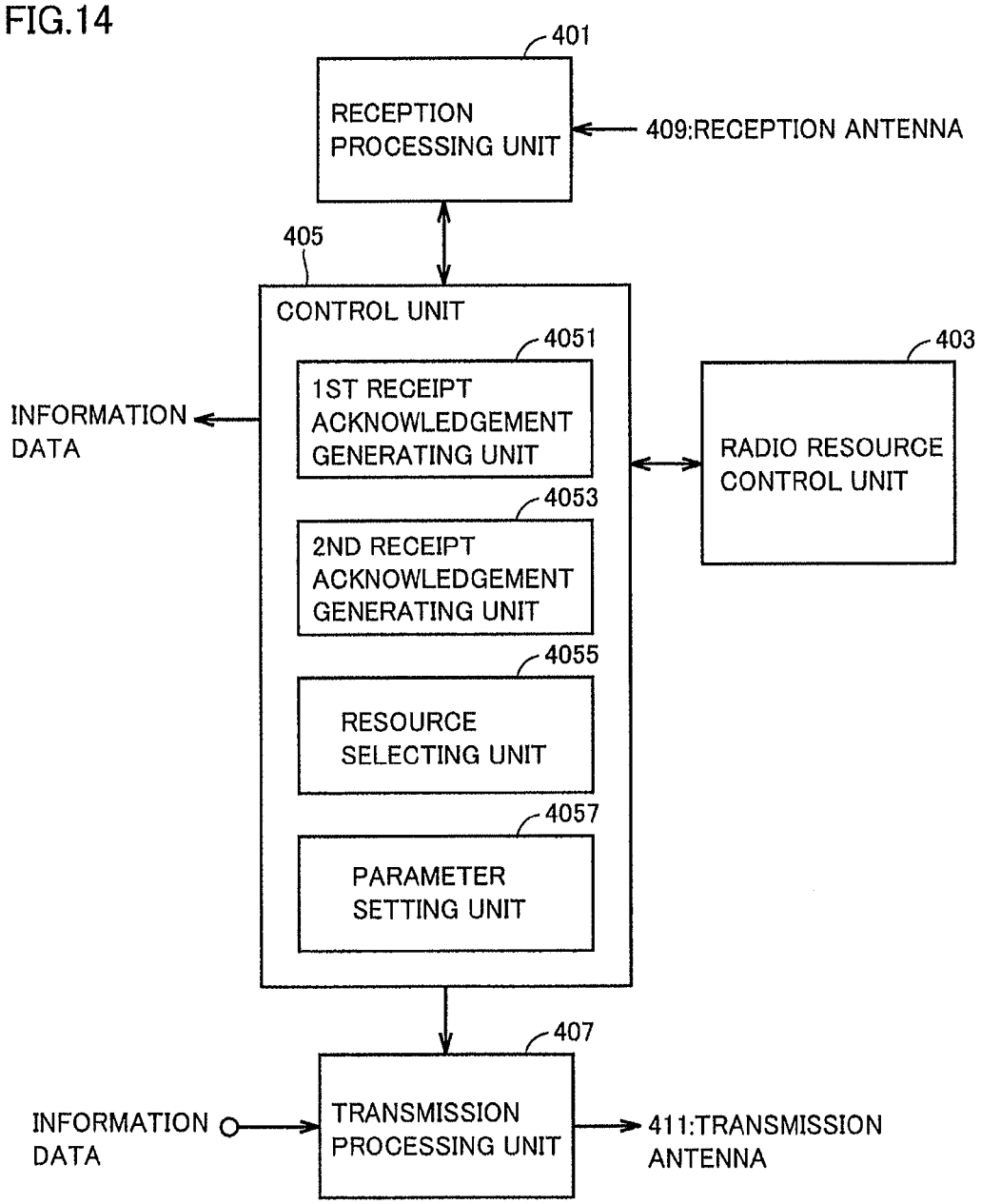
FIG. 14 is a schematic block diagram showing a configuration of a mobile station device in accordance with an embodiment of the present invention.
Figure 15:
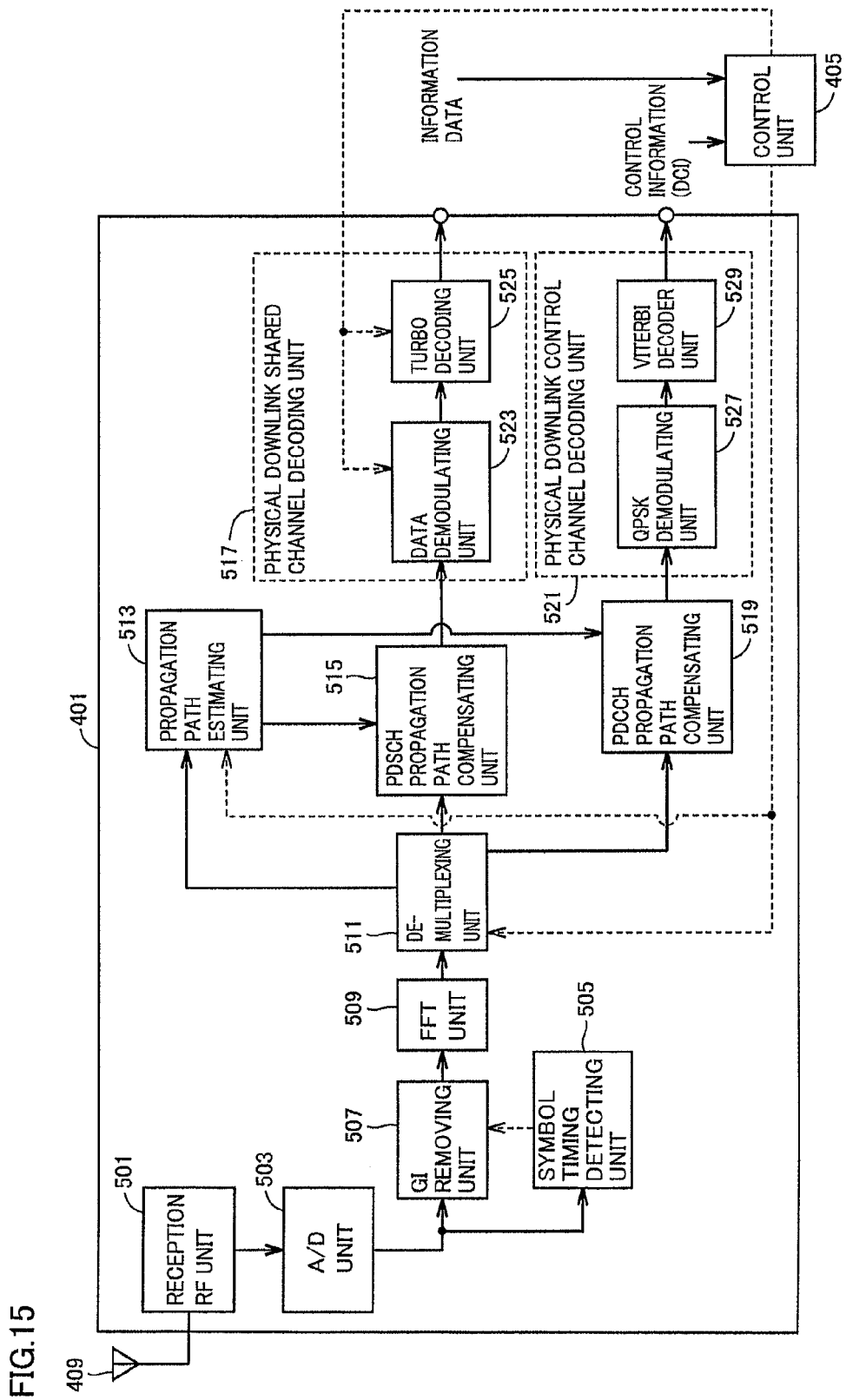
FIG. 15 is a schematic block diagram showing a configuration of a reception processing unit of the mobile station device in accordance with an embodiment of the present invention.
Figure 16:
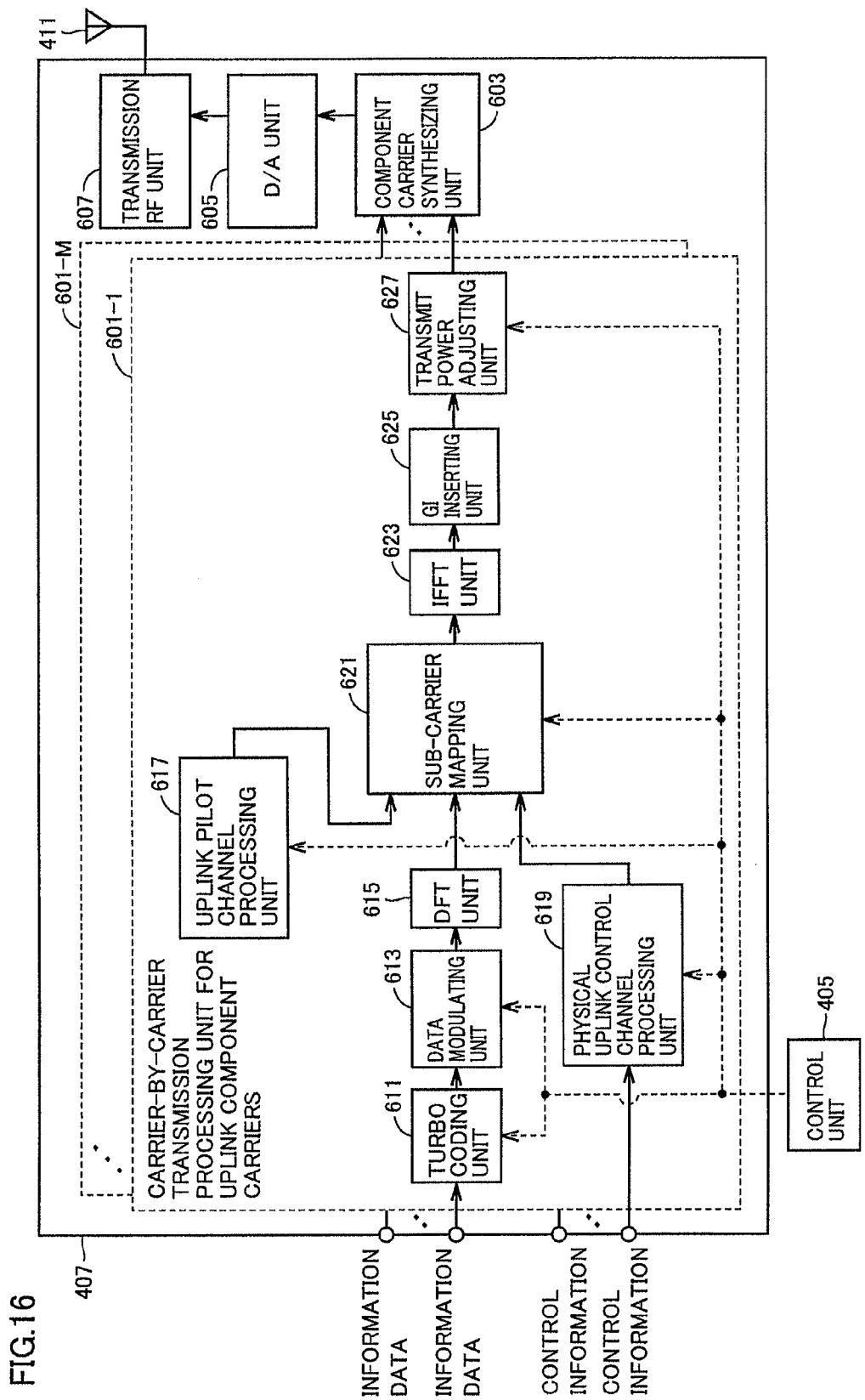
FIG. 16 is a schematic block diagram showing a configuration of a transmission processing unit of the mobile station device in accordance with an embodiment of the present invention.

In the following, configuration of mobile station device 5 in accordance with the present embodiment will be described with reference to FIGS. 14 to 16. FIG. 14 is a schematic block diagram showing a configuration of mobile station device 5 in accordance with an embodiment of the present invention. As shown in FIG. 14, mobile station device 5 includes a reception processing unit 401, a radio resource control unit 403, a control unit 405, and a transmission processing unit (transmitting unit) 407. Further, control unit 405 includes a first receipt acknowledgment generating unit 4051, a second receipt acknowledgement generating unit 4053, a resource selecting unit 4055 and a parameter setting unit 4057.

Reception processing unit 401 receives signals from base station device 3 and in accordance with an instruction from control unit 405, demodulates and decodes the received signals. If PDCCH signals addressed to itself are detected, reception processing unit 401 outputs DCI obtained by decoding PDCCH signals to control unit 405. By way of example, reception processing unit 401 outputs control information related to PUCCH resources included in the PDCCH, to control unit 405. Further, based on an instruction from control unit 405 after the DCI included in the PDCCH is provided to control unit 405, reception processing unit 401 outputs information data obtained by decoding the PDSCH addressed to itself to an upper layer, through control unit 405. Of the DCI included in PDCCH, downlink assignment includes information indicating PDSCH resource allocation. Further, reception processing unit 401 outputs control information generated by radio resource control unit 103 of base station device 3 obtained by decoding PDSCH to control unit 405, as well as to radio resource control unit 403 of itself through control unit 405. By way of example, control information generated by radio resource control unit 103 of base station device 3 includes information indicating a primary cell, information indicating transmission method of ACK/NACK, information indicating PUCCH resource candidates, and information indicating values of some parameters related to PUCCH transmit power. The ACK/NACK transmission method includes ACK/NACK channel selection, time domain bundling and spatial bundling.

Reception processing unit 401 outputs a CRC (Cyclic Redundancy Check) code included in PDSCH to control unit 405. Though not described with reference to base station device 3, transmission processing unit 107 of base station device 3 generates a CRC code from information data and transmits the information data and the CRC code on PDSCH. The CRC code is used for determining whether there is any error in the data included in the PDSCH. If a piece of information generated from the data using a predetermined generator polynominal is the same as the CRC code, the data is determined to be free of any error, and if a piece of information generated from the data using a predetermined generator polynominal is not the same as the CRC code, the data is determined to have some error. Details of reception processing unit 401 will be described later.

Control unit 405 includes a first receipt acknowledgement generating unit 4051, a second receipt acknowledgement generating unit 4053, a resource selecting unit 4055, and a parameter setting unit 4057. Control unit 405 confirms data transmitted from base station device 3 using PDSCH and input from reception processing unit 401, and among the data, outputs the information data to an upper layer. Based on the control information generated by radio resource control unit 103 of base station device 3 among the data, control unit 405 controls reception processing unit 401 and transmission processing unit 407. Further, based on an instruction from radio resource control unit 403, control unit 405 controls reception processing unit 401 and transmission processing unit 407. By way of example, control unit 405 controls transmission processing unit 407 such that ACK/NACK is transmitted using the PUCCH candidate resource indicated by radio resource control unit 403. Further, based on the DCI transmitted from base station device 3 using PDCCH and input from reception processing unit 401, control unit 405 controls reception processing unit 401 and transmission processing unit 407. Specifically, control unit 405 controls reception processing unit 401 based on the detected downlink assignment, and controls transmission processing unit 407 based on the detected uplink grant. Further, control unit 405 compares data input from reception processing unit 401 using predetermined generator polynominal with the CRC code input from reception processing unit 401, determines whether or not the data contains any error, and generates ACK/NACK. Actually, by the first receipt acknowledgement generating unit 4051 and the second receipt acknowledgement generating unit 4053 of control unit 405, generation of ACK/NACK is controlled. Further, control unit 405 generates SR and CQI based on an instruction from radio resource control unit 403.

First receipt acknowledgement generating unit 4051 generates ACK/NACK (first receipt acknowledgement) for each data of downlink received by mobile station device 5. First receipt acknowledgement generating unit 4051 compares data included in the PDSCH input from reception processing unit 401 using predetermined generator polynominal with the CRC code input from reception processing unit 401, determines whether or not the data contains any error, and generates ACK/NACK for each data. If the information generated from the data using predetermined generator polynominal is the same as the CRC code, ACK is given as ACK/NACK, and if the generated information is different from the CRC code, NACK is given as ACK/NACK.

The second receipt acknowledgement generating unit 4053 executes time domain bundling and spatial bundling on the plurality of first receipt acknowledgements generated by the first receipt acknowledgement generating unit 4051, and generates information (second receipt acknowledgement) collecting the plurality of first receipt acknowledgements. Whether time domain bundling is to be applied and/or spatial bundling is to be applied in the second reception acknowledgment generating unit 4053 is set based on information notified by base station device 3. When set to apply time domain bundling, the second reception acknowledgment generating unit 4053 executes a logical operation on the plurality of first receipt acknowledgements for the plurality of downlink data of a plurality of downlink subframes (time domain) in one downlink component carrier (frequency domain).

When set to apply spatial bundling, the second receipt acknowledgement generating unit 4053 executes a logical operation on a plurality of first reception acknowledgments for the plurality of downlink data of the one downlink component carrier (frequency domain) and one downlink subframe (time domain), that is, data transmitted using spatial multiplexing.

Based on the plurality of second receipt acknowledgements generated by the second receipt acknowledgement generating unit 4053, resource selecting unit 4055 selects a resource for arranging signals to explicitly show the contents of the plurality of second receipt acknowledgements. In resource selecting unit 4055, a process for selecting a resource for implicitly indicating information of ACK/NACK channel selection is performed. Based on the second receipt acknowledgements for the plurality of cells, resource selecting unit 4055 selects the resource to be used for signal transmission from among a plurality of candidate resources based on the received PDCCH, using the relations of ACK/NACK information, the resource selected for ACK/NACK channel selection and the QPSK signal point such as shown in FIGS. 8 to 10. Control unit 405 recognizes CCE used for the PDCCH including DCI addressed to the device itself, and determines the PUCCH resource corresponding to the CCE. The determined resource is used as a candidate resource in resource selecting unit 4055. It is noted that PUCCH candidate resources or potential candidate resources for ACK/NACK channel selection notified by base station device 3 using RRC signaling are input to control unit 405 as control information, from radio resource control unit 403. Control unit 405 sets a candidate resource to resource selecting unit 4055 based on the control information input from radio resource control unit 403 and the detected PDCCH.

For a cell in which PDSCH is not received by reception processing unit 401 in any downlink subframe, resource selecting unit 4055 does not perform the process for selecting a candidate resource, in connection with the resource selecting process for arranging signals to explicitly indicate the contents of the plurality of second receipt acknowledgements.

Parameter setting unit 4057 sets a parameter value related to transmit power of PUCCH, PUSCH and uplink pilot channel. The value of transmit power set by parameter setting unit 4057 is output by control unit 405 to transmission processing unit 407. For the uplink pilot channel configured by the resources in the same uplink physical resource blocks as the PUCCH, the transmit power control is the same as that for the PUCCH. Similarly, for the uplink pilot channel configured by the resources in the same uplink physical resource blocks as the PUSCH, the transmit power control is the same as that for the PUSCH.

Parameter setting unit 4057 sets, for the PUSCH, values of a parameter based on the number of uplink physical resource blocks allocated to the PUSCH, a parameter unique to the cell and a parameter unique to the mobile station device notified in advance by base station device 3, a parameter based on the modulation method used for the PUSCH, a parameter based on an estimated value of path loss and a parameter based on the transmit power control command notified by base station device 3.

Parameter setting unit 4057 sets, for the PUCCH, values of a parameter based on signal configuration of the PUCCH, a parameter unique to the cell and a parameter unique to the mobile station device notified in advance by base station device 3, a parameter based on an estimated value of path loss, and a parameter based on a notified transmit power control command.

Specifically, parameter setting unit 4057 sets a parameter value based on the PUCCH signal configuration, for the PUCCH to which time domain bundling and/or spatial bundling and ACK/NACK channel selection are applied, in accordance with the number of candidate resources used for resource selection by resource selecting unit 4055. Alternatively, parameter setting unit 4057 sets a parameter value based on the PUCCH signal configuration, for the PUCCH to which time domain bundling and/or spatial bundling and ACK/NACK channel selection are applied, in accordance with the number of second receipt acknowledgements generated by second receipt acknowledgement generating unit 4053.

As parameters related to the transmit power, the parameter unique to the cell and the parameter unique to the mobile station device are notified by base station device 3 using PDSCH, and a transmit power control command is notified by base station device 3 using PDCCH. The transmit power control command for PUSCH is included in the uplink grant, and the transmit power control command for PUCCH is included in the downlink assignment. Control unit 405 controls PUCCH signal configuration in accordance with the type of transmitted UCI, and controls PUCCH signal configuration used by parameter setting unit 4057. Various parameters related to the transmit power notified by base station device 3 are appropriately stored in radio resource control unit 403, and the stored values are input to parameter setting unit 4057.

Radio resource control unit 403 stores and holds control information generated by radio resource control unit 103 of base station device 3 and notified by base station device 3, and controls reception processing unit 401 and transmission processing unit 407 through control unit 405. Specifically, radio resource control unit 403 has a function of a memory holding various parameters. By way of example, radio resource control unit 403 holds control information related to allocation of PUCCH candidate resources, and outputs a control signal indicating which of the candidate resources holding PUCCH signals is to be used for transmission by transmission processing unit 407, to control unit 405. It is noted that information related to candidate resources for ACK/NACK channel selection allocated based on the CCE of PDCCH is not held in radio resource control unit 403, and related information (information indicating the candidate resource itself, or information indicating potential candidate resource) notified from base station device 3 by RRC signaling is held. Further, radio resource control unit 403 holds a parameter related to the transmit power of PUSCH and/or PUCCH, and outputs a control signal instructing that the parameter notified from base station device 3 be used in parameter setting unit 4057, to control unit 405.

Transmission processing unit 407 transmits a signal obtained by coding and modulating the information data and/or UCI to base station device 3 through transmission antenna 411 using PUSCH and/or PUCCH resource, in accordance with an instruction from control unit 405. Further, transmission processing unit 407 sets the transmit power of PUSCH and/or PUCCH in accordance with an instruction from control unit 405. By way of example, transmission processing unit 407 generates a signal by coding and modulating a signal indicating part of the contents of the plurality of second receipt acknowledgements, sets the transmit power of the value input from parameter setting unit 4057, and transmits the signal through transmission antenna 411 using the PUCCH resource selected by resource selecting unit 4055. Details of transmission processing unit 407 will be described later.

<Reception Processing Unit 401 of Mobile Station Device 5>

In the following, details of reception processing unit 401 of mobile station device 5 will be described. FIG. 15 is a schematic block diagram showing a configuration of reception processing unit 401 of mobile station device 5 in accordance with an embodiment of the present invention. As shown in FIG. 15, reception processing unit 401 includes a reception RF unit 501, an A/D unit 503, a symbol timing detecting unit 505, a GI removing unit 507, an FFT unit 509, a de-multiplexing unit 511, a propagation path estimating unit 513, a PDSCH propagation path compensating unit 515, a physical downlink shared channel decoding unit 517, a PDCCH propagation path compensating unit 519, and a physical downlink control channel decoding unit 521. Further, as shown in FIG. 15, physical downlink shared channel decoding unit 517 includes a data demodulating unit 523 and a turbo decoding unit 525. Further, as shown in FIG. 15, physical downlink control channel decoding unit 521 includes a QPSK demodulating unit 527 and a Viterbi decoder unit 529. In the description of reception processing unit 401, an example in which information is obtained from PDSCH transmitted using a single antenna port will be described, and an example in which a processing unit obtaining information from PDSCH transmitted from a plurality of antenna ports using spatial multiplexing is provided will be described later.

Reception RF unit 501 appropriately amplifies a signal received by reception antenna 409, converts to intermediate frequency (down-convert), removes unnecessary frequency component, controls amplification level so that appropriate signal level is maintained, and performs quadrature demodulation based on the in-phase and quadrature-phase components of the received signal. Reception RF unit 501 outputs the quadrature demodulated analog signal to A/D unit 503.

A/D unit 503 converts the analog signal that has been orthogonally demodulated by reception RF unit 501 to a digital signal, and outputs the converted digital signal to symbol timing detecting unit 505 and GI removing unit 507.

Symbol timing detecting unit 505 detects symbol timing based on the digital signal converted by A/D unit 503, and outputs a control signal indicating the detected timing of symbol border to GI removing unit 507. Based on the control signal from symbol timing detecting unit 505, GI removing unit 507 removes the part corresponding to the guard interval from the digital signal input from A/D unit 503, and outputs the remaining part of the signal to FFT unit 509. FFT unit 509 performs Fast Fourier Transform on the signal input from GI removing unit 507, performs OFDM demodulation and outputs the result to de-multiplexing unit 511.

De-multiplexing unit 511 separates the signal demodulated by FFT unit 509 to PDCCH signal and PDSCH signal, based on the control signal input from control unit 405. De-multiplexing unit 511 outputs the separated PDSCH signal to PDSCH propagation path compensating unit 515, and outputs the separated PDCCH signal to PDCCH propagation path compensating unit 519. Further, de-multiplexing unit 511 separates a downlink resource element on which downlink pilot channel is arranged, and outputs a downlink reference signal of the downlink pilot channel to propagation path estimating unit 513. Further, de-multiplexing unit 511 outputs the signal of PDCCH CC to PDCCH propagation path compensating unit 519, and outputs the signal of PDSCH CC to PDSCH propagation path compensating unit 515.

Propagation path estimating unit 513 estimates fluctuation on the propagation path using the downlink reference signal of the downlink pilot channel separated by de-multiplexing unit 511 and a known signal. Propagation path estimating unit 513 outputs a propagation path compensating value for adjusting amplitude and phase to PDSCH propagation path compensating unit 515 and PDCCH propagation path compensating unit 519, to compensate for the fluctuation on the propagation path. PDSCH propagation path compensating unit 515 adjusts the amplitude and phase of PDSCH signal de-multiplexed by de-multiplexing unit 511 in accordance with the propagation path compensating value input from propagation path estimating unit 513. PDSCH propagation path compensating unit 515 outputs the signal of which propagation path is adjusted, to data demodulating unit 523 of physical downlink shared channel decoding unit 517.

Physical downlink shared channel decoding unit 517 demodulates and decodes PDSCH in accordance with an instruction from control unit 405, and detects information data. Data demodulating unit 523 demodulates the PDSCH signal input from propagation path compensating unit 515, and outputs the demodulated PDSCH signal to turbo decoding unit 525. The demodulation corresponds to the modulation method used in data modulating unit 221 of base station device 3. Turbo decoding unit 525 decodes information data from the demodulated PDSCH signal input from data demodulating unit 523, and outputs the result to an upper layer through control unit 405. Control information and the like generated by radio resource control unit 103 of base station device 3 transmitted through PDSCH are also output to control unit 405. The control information and the like are also output to radio resource control unit 403 through control unit 405. The CRC code included in the PDSCH is also output to control unit 405.

Propagation path compensating unit 519 for PDCCH adjusts the amplitude and phase of PDCCH signal separated by de-multiplexing unit 511 in accordance with the propagation path compensating value input from propagation path estimating unit 513. PDCCH propagation path compensating unit 519 outputs the adjusted signal to QPSK demodulating unit 527 of physical downlink control channel decoding unit 521.

Physical downlink control channel decoding unit 521 demodulates and decodes the signal input from PDCCH propagation path compensating unit 519 in the following manner, to detect control data. QPSK demodulating unit 527 performs QPSK demodulation on the PDCCH signal, and outputs the result to Viterbi decoder unit 529. Viterbi decoder unit 529 decodes the signal demodulated by QPSK demodulating unit 527, and outputs the decoded DCI to control unit 405. Here, the signal is represented bit by bit. Viterbi decoding unit 529 also performs rate matching on the input bits, for adjusting the number of bits to be subjected to the Viterbi decoding process.

Mobile station device 5 performs a process for detecting DCI addressed to itself, assuming a plurality of CCE aggregation numbers. Mobile station device 5 performs different decoding process on PDCCH signals for each assumed CCE aggregation number, and obtains the DCI included in that PDCCH of which CRC code added to the PDCCH together with the DCI is found to be error-free. Such a process is referred to as "blind decoding." Mobile station device 5 may perform blind decoding not on every CCE of downlink component carrier but only on some of the CCEs. These CCEs on which blind decoding is performed are referred to as "search space." Further, blind decoding may be performed on different CCEs for different CCE aggregation numbers.

Control unit 405 determines whether or not the DCI input from Viterbi decoder unit 529 is error-free and determines whether or not the DCI is addressed to itself and, as a result, if the DCI is correctly determined to be the one addressed to itself, control unit 405 controls de-multiplexing unit 511, data demodulating unit 523, turbo decoding unit 525 and transmission processing unit 407, based on the DCI. By way of example, if the DCI is a downlink assignment, control unit 405 controls reception processing unit 401 such that the PDSCH signals are decoded by the downlink component carrier with the resources allocated. It is noted that PDCCH also includes a CRC code as does PDSCH and, using the CRC code, control unit 405 determines whether or not the DCI of PDCCH has any error.

If the DCI is determined to be addressed to the device itself, control unit 405 determines the resource to be used for PUCCH signal transmission and/or PUCCH signal candidate resources to be used for the resource selection process of ACK/NACK channel selection, based on the CCE information (identification number) used in the signal. By way of example, in mobile station device 5 in which ACK/NACK channel selection is set, control unit 405 determines the candidate resource to be used by resource selecting unit 4055, based on the identification number of CCE used in the PDCCH including the DCI addressed to itself, detected in the primary cell.

Next, a process for obtaining information from PDSCH transmitted from a plurality of antenna ports of base station device 3 using spatial multiplexing will be described. As compared with the configuration of reception processing unit 401 described with reference to FIG. 15, at least a spatial de-multiplexing detecting unit is additionally provided. The spatial de-multiplexing detecting unit performs a process of combining and separating signals transmitted by transmission antennas 111 of base station device 3 and detecting a plurality of data sequences, using pre-coding used on the transmitting side. The information indicating the pre-coding is transmitted, included in a downlink assignment. Propagation path estimating unit 513 estimates the propagation path fluctuation experienced by the signal transmitted from each transmission antenna 111, based on the downlink reference signal transmitted from each of the transmission antennas 111 of base station device 3. By way of example, the spatial de-multiplexing detecting unit may be incorporated in PDSCH propagation path compensating unit 515. The spatial de-multiplexing detecting unit compensates for the propagation path fluctuation of the signal transmitted from each transmission antenna 111 and performs the combining and de-multiplexing process, using the estimated value of propagation path fluctuation experienced by the signal transmitted from each transmission antenna 111 estimated by propagation path estimating unit 513. The spatial de-multiplexing detecting unit outputs the plurality of detected data sequences to the physical downlink shared channel decoding unit.

<Transmission Processing Unit 407 of Mobile Station Device 5>

In the following, details of transmission processing unit 407 of mobile station device 5 will be described. FIG. 16 is a schematic block diagram showing a configuration of transmission processing unit 407 of mobile station device 5 in accordance with an embodiment of the present invention. As shown in FIG. 16, transmission processing unit 407 includes a plurality of carrier-by-carrier transmission processing units 601-1 to 601-M for the uplink component carriers (hereinafter the carrier-by-carrier transmission processing units 601-1 to 601-M for the uplink component carriers will be generally referred to as "carrier-by-carrier transmission processing unit 601 for uplink component carriers"), a component carrier synthesizing unit 603, a D/A unit 605, a transmission RF unit 607, and a transmission antenna 411. Further, as shown in FIG. 16, carrier-by-carrier transmission processing unit 601 for uplink component carriers includes a turbo coding unit 611, a data modulating unit 613, a DFT unit 615, an uplink pilot channel processing unit 617, a physical uplink control channel processing unit 619, a sub-carrier mapping unit 621, an IFFT unit 623, a GI inserting unit 625 and a transmit power adjusting unit 627. Mobile station device 5 has carrier-by-carrier transmission processing units 601 for uplink component carriers same in number as the corresponding uplink component carriers. Since carrier-by-carrier transmission processing units 601 for uplink component carriers each have the same configuration and same functions, only one will be described as a representative.

Carrier-by-carrier transmission processing unit 601 for uplink component carriers performs coding and modulation on information data and/or UCI, generates a signal to be transmitted using PUSCH and/or PUCCH in the uplink component carrier, and adjusts transmit power of PUSCH and/or PUCCH. Turbo coding unit 611 performs turbo coding on the input information data with code rate input from control unit 405, to enhance error resilience of data, and outputs the result to data modulating unit 613. Data modulating unit 613 modulates the coded data coded by turbo coding unit 611 by a modulation method instructed by control unit 405, such as QPSK, 16QAM or 64QAM, and generates a signal sequence of modulated symbols. Data modulating unit 613 outputs the generated signal sequence of modulated symbols to DFT unit 615. DFT unit 615 performs Discrete Fourier Transform on the signals input from data modulating unit 613, and outputs the result to sub-carrier mapping unit 621.

Physical uplink control channel processing unit 619 performs a baseband signal processing for transferring the UCI input from control unit 405. The UCI input to physical uplink control channel processing unit 619 includes ACK/NACK (first receipt acknowledgement, second receipt acknowledgement), SR and CQI. Physical uplink control channel processing unit 619 performs the baseband process and outputs the generated signal to sub-carrier mapping unit 621. Physical uplink control channel processing unit 619 encodes information bits of UCI to generate a signal. For example, physical uplink control channel processing unit 619 applies encoding on information bits indicating contents of part of the plurality of second receipt acknowledgements, to generate a signal. Here, the information bits of ACK/NACK include information explicitly indicated by the modulated signal in ACK/NACK channel selection, as well as ACK/NACK information of single PDSCH where ACK/NACK channel selection is not applied.

Physical uplink control channel processing unit 619 performs signal processing related to code multiplexing in the frequency domain and/or code multiplexing in the time domain, on the signals generated from UCI. Physical uplink control channel processing unit 619 realizes code multiplexing in the frequency domain by multiplying a PUCCH signal generated from at least any of the ACK/NACK information bit, the SR information bit and the CQI information bit, by a code sequence instructed by control unit 405. Physical uplink control channel processing unit 619 realizes code multiplexing in the time domain by multiplying a PUCCH signal generated from the ACK/NACK information bit or the SR information bit, by a code sequence instructed by control unit 405.

Uplink pilot channel processing unit 617 generates an uplink reference signal, which is a known signal in base station device 3, and outputs it to sub-carrier mapping unit 621, based on an instruction from control unit 405.

Sub-carrier mapping unit 621 places the signal input from uplink pilot channel processing unit 617, the signal input from DFT unit 615, and the signal input from physical uplink control channel processing unit 619 on the sub-carrier, and outputs the result to IFFT unit 623, in accordance with an instruction from control unit 405.

IFFT unit 623 performs Inverse Fast Fourier Transform on the signals input from sub-carrier mapping unit 621, and outputs the result to GI inserting unit 625. Here, the number of points of IFFT unit 623 is larger than that of DFT unit 615. Mobile station device 5 performs DFT-Spread-OFDM modulation on the signals transmitted using PUSCH, by using DFT unit 615, sub-carrier mapping unit 621 and IFFT unit 623. GI inserting unit 625 adds the guard interval to the signals input from IFFT unit 623, and outputs the result to transmit power adjusting unit 627.

Transmit power adjusting unit 627 adjusts the transmit power of the signals input from GI inserting unit 625 based on a control signal from control unit 405, and outputs the signals to component carrier synthesizing unit 603. Transmit power adjusting unit 627 controls average transmit power of PUSCH, PUCCH and/or uplink pilot channel, for each uplink subframe.

By the process of transmit power adjusting unit 627, based on the parameter of which value is set in accordance with the number of candidate resources used for resource selection by resource selecting unit 4055, the transmit power for the PUCCH signal using ACK/NACK channel selection applying time domain bundling and/or spatial bundling is controlled. Alternatively, by the process of transmit power adjusting unit 627, based on the parameter of which value is set in accordance with the number of second receipt acknowledgements generated by the second receipt acknowledgement generating unit 4053, the transmit power for the PUCCH signal using ACK/NACK channel selection applying time domain bundling and/or spatial bundling is controlled.

Component carrier synthesizing unit 603 synthesizes signals of each uplink component carrier input from carrier-by-carrier transmission processing unit 601 for uplink component carriers, and outputs the result to D/A unit 605. D/A unit 605 converts baseband digital signal input from component carrier synthesizing unit 603 to an analog signal, and outputs the analog signal to transmission RF unit 607. Transmission RF unit 607 generates, from the analog signal input from D/A unit 605, in-phase component and quadrature-phase component of intermediate frequency, and removes unnecessary frequency component of the intermediate frequency band. Then, transmission RF unit 607 converts the signal of intermediate frequency to a signal of high frequency (up-converts), removes unnecessary frequency component, amplifies power, and transmits the result to base station device 3 through transmission antenna 411.

<Setting of Parameter Related to Transmit Power>

In the following, setting of the parameter related to transmit power, for PUCCH using ACK/NACK channel selection applying time domain bundling and/or spatial bundling at parameter setting unit 4057 will be described. Parameter setting unit 4057 sets a parameter value based on the PUCCH signal configuration, in accordance with the number of candidate resources used for resource selection by resource selecting unit 4055. Alternatively, parameter setting unit 4057 sets a parameter value based on the PUCCH signal configuration in accordance with the number of second receipt acknowledgements generated by second receipt acknowledgement generating unit 4053. Alternatively, parameter setting unit 4057 sets the parameter value based on the PUCCH signal configuration in accordance with the number of cells in which reception processing unit 401 has received data by at least one downlink subframe. Specifically, the value of a prescribed parameter related to transmit power is determined in accordance with the number of cells used for data communication in a plurality of subframes.

Figures 17, 18:
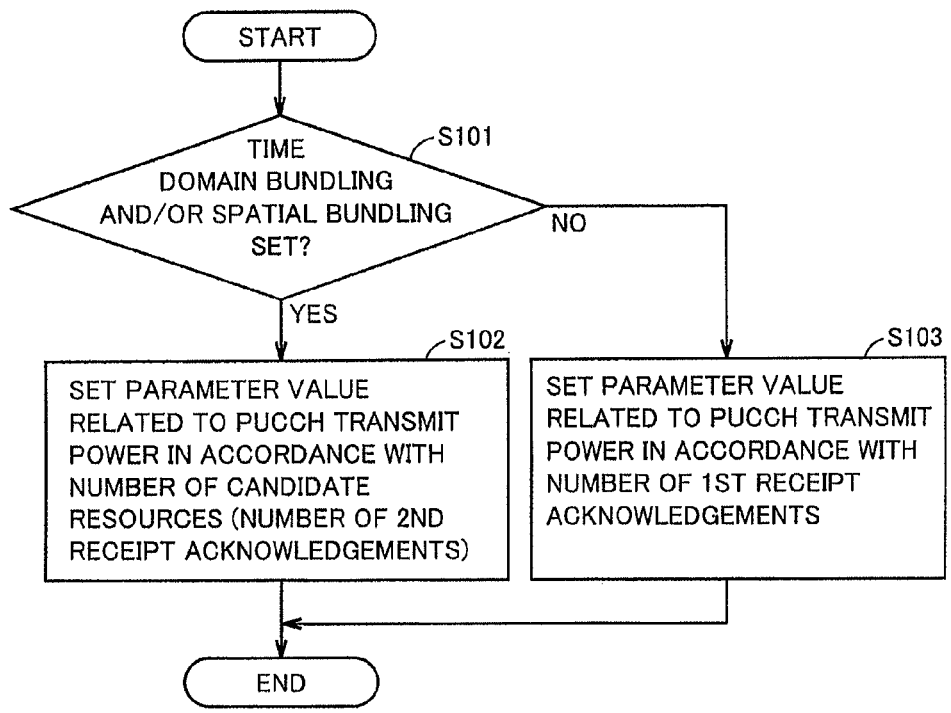
FIG. 17 shows a corresponding relation between the number of candidate resources or the number of second receipt acknowledgements and a parameter value related to transmit power, used in the mobile station device in accordance with an embodiment of the present invention.
FIG. 18 is a flowchart representing an example of a process related to setting of a parameter value related to transmit power of the mobile station device in accordance with an embodiment of the present invention.

FIG. 17 shows a correspondence relation between the number of candidate resources or the number of second receipt acknowledgements and a parameter value related to transmit power, used in the mobile station device in accordance with an embodiment of the present invention.

When transmission of single data takes place in every cell used in cell aggregation, or if at least spatial bundling is applied in every cell used in cell aggregation, the number of candidate resources used for resource selection or the number of second receipt acknowledgements is, put otherwise, "the number of cells that received data in at least any one downlink subframe." If spatial bundling is not applied to any of the cells used in cell aggregation, the number of candidate resources used for resource selection or the number of second receipt acknowledgements is, put otherwise, "the number of data sequences of all cells that received data in at least any one downlink subframe."

Here, the parameter related to the transmit power is a parameter based on the PUCCH signal configuration, and by way of example, the unit of parameter value related to the transmit power is decibel [dB]. Description will be given with reference to the example of FIG. 17, using the number of four different candidate resources or the number of second receipt acknowledgements (N1, N2, N3, N4), and four different parameter values (X1, X2, X3, X4) related to transmit power. The present invention, however, is not limited to the above.

Referring to FIG. 17, the magnitude relation of the number of candidate resources or the number of second receipt acknowledgements is N1<N2<N3<N4. In FIG. 17, the magnitude relation of the number of parameters related to transmit power is X1<X2<X3<X4.

(1) If the number of candidate resources or the number of second receipt acknowledgements is N1, parameter setting unit 4057 sets the parameter value related to transmit power to X1.

(2) If the number of candidate resources or the number of second receipt acknowledgements is N2, parameter setting unit 4057 sets the parameter value related to transmit power to X2.

(3) If the number of candidate resources or the number of second receipt acknowledgements is N3, parameter setting unit 4057 sets the parameter value related to transmit power to X3.

(4) If the number of candidate resources or the number of second receipt acknowledgements is N4, parameter setting unit 4057 sets the parameter value related to transmit power to X4.

In FIG. 17, an example in which the relation between the number of candidate resources or second receipt acknowledgements and the parameter value related to power transmission is managed by a table has been described. The relation, however, may be managed using a mathematical expression. For instance, the number of candidate resources or the number of second receipt acknowledgements may be an input value to an expression and the value as the output of expression may be used as the parameter value related to power transmission by parameter setting unit 4057.

Parameter setting unit 4057 sets the parameter value based on the PUCCH signal configuration, in accordance with the number of received downlink data (transport blocks) (the number of first receipt acknowledgements), in the PUCCH using ACK/NACK channel selection without applying time domain bundling and/or spatial bundling.

FIG. 18 is a flowchart representing an example of a process related to setting of a parameter value related to transmit power of the mobile station device in accordance with an embodiment of the present invention. For simplicity of description, setting of a parameter value based on the PUCCH signal configuration for the PUCCH using ACK/NACK channel selection will be described with priority, and details related to setting of parameter values different from the parameter based on the PUCCH signal configuration will not be given.

Referring to FIG. 18, control unit 405 of mobile station device 5 determines whether or not time domain bundling and/or spatial bundling is set (step S101).

If it is determined that time domain bundling and/or spatial bundling is set (YES at step S101), control unit 405 sets a parameter value related to transmit power of PUCCH in accordance with the number of candidate resources used for resource selection by resource selecting unit 4055 or in accordance with the number of second receipt acknowledgements generated by second receipt acknowledgement generating unit 403 (step S102).

If it is determined that time domain bundling and/or spatial bundling is not set (NO at step S102), control unit 405 sets the parameter value related to transmit power of PUCCH in accordance with the number of first receipt acknowledgements generated by first receipt acknowledgement generating unit 4051 (step S103).

After steps S102 and S103, mobile station device 5 adjusts the transmit power of PUCCH by transmit power adjusting unit 627 using the set parameter value, and transmits signals on PUCCH.

If transmission of single data takes place in every cell used for cell aggregation or at least spatial bundling is applied to every cell used for cell aggregation (if time domain bundling and spatial bundling are set at step S101), at step S102, the parameter value related to transmit power of PUCCH may be set in accordance with the number of cells that received data in at least any one downlink subframe.

If spatial bundling is not applied to any of the cells used for cell aggregation (if only time domain bundling is set at step S101), at step S102, the parameter value related to transmit power of PUCCH may be set in accordance with the number of data sequences of all cells that received data in at least any one downlink subframe.

As described above, in the present embodiment, mobile station device 5 sets the parameter value related to transmit power in accordance with the number of candidate resources used for resource selection for ACK/NACK channel selection, or in accordance with the number of second receipt acknowledgements. Mobile station device 5 controls transmit power of PUCCH used for transmitting a signal generated from the information of a plurality of second receipt acknowledgements using the set parameter value, and transmits PUCCH. Thus, base station device 3 can obtain information with appropriate reception characteristic from the received uplink signals.

Alternatively, mobile station device 5 sets the parameter value related to transmit power in accordance with the number of cells that received data in at least any one downlink subframe, or the number of data sequences of all cells that received data in at least any one downlink subframe. Mobile station device 5 controls transmit power of PUCCH used for transmitting a signal generated from the information of a plurality of second receipt acknowledgements using the set parameter value, and transmits PUCCH. Thus, base station device can receive information with appropriate reception characteristic from the received uplink signals.

If the PUCCH transmit power is linearly controlled in accordance with the number of transport blocks, it is possible that unnecessarily high transmit power is used and interference increases, resulting in lower efficiency of communication system. In contrast, by the embodiment of the present invention, setting of unnecessarily high transmit power can be avoided, and the risk of increased interference can be avoided. Thus, decrease of communication system efficiency can be prevented. Therefore, increased interference to PUCCH of other mobile station device 5 can be avoided. Thus, base station device 3 can obtain information with appropriate reception characteristic, from the uplink signals.

The characteristic ensuring correct detection of candidate resource on which a signal is transmitted by base station device 3 deteriorates as the number of candidate resources as the object of signal detection increases. Therefore, as the candidate resources as the object of signal detection by base station device 3 increases, mobile station device 5 is controlled to use higher transmit power. Thus, it becomes possible for base station device 3 to obtain information of the plurality of second receipt acknowledgements with appropriate reception characteristic, from the received PUCCH signals. On the other hand, as the number of candidate resources as the object of signal detection by base station device 3 decreases, as long as the information of the plurality of second receipt acknowledgements can be obtained appropriately, base station device 3 controls mobile station device 5 to use lower transmit power for sending PUCCH signals including the signal generated from the information of the plurality of second receipt acknowledgements, so that interference to signals from other mobile station device 5 can be reduced.

The "mobile station device" described in the present specification is not limited to a moving terminal. The present invention may be realized by implementing the function of mobile station device 5 on a fixed terminal.

The embodiment of the present invention described above may be realized by implementing and controlling functions on an integrated circuit. Specifically, according to another embodiment of the present invention, the integrated circuit is mounted on mobile station device 5 and causes mobile station device 5 to perform a plurality of functions. The integrated circuit causes mobile station device 5 to perform a series of functions including: a function of generating first receipt acknowledgements indicating positive or negative acknowledgements for downlink data received from base station device 3 in a plurality of frequency domains and a plurality of time domains; a function of executing a logical operation on the plurality of first receipt acknowledgements to generate a second receipt acknowledgement; a function of selecting a resource on which a signal indicating contents of the second reception acknowledgments is arranged, based on a plurality of second receipt acknowledgements; and a function of controlling transmit power in accordance with the number of candidate resources used for resource selection, and transmitting the signal indicating the contents of the second receipt acknowledgements using the selected resource.

In this manner, mobile station device 5 using the integrated circuit in accordance with another embodiment of the present invention sets the parameter value related to transmit power in accordance with the number of candidate resources used for resource selection for ACK/NACK channel selection. Mobile station device 5 transmits PUCCH while controlling PUCCH transmit power used for signal transmission generated from the contents of the plurality of second receipt acknowledgements using the set parameter value. Thus, base station device 3 can obtain information of the plurality of second receipt acknowledgements with appropriate reception characteristics, from the received PUCCH.

According to a still further aspect, the present invention provides an integrated circuit causing, when mounted on mobile station device 5, the mobile station device 5 to perform a plurality of functions. The integrated circuit causes mobile station device to perform a series of functions including: a function of generating first receipt acknowledgements for downlink data received from base station device 3 in a plurality of frequency domains and a plurality of time domains; a function of executing a logical operation on a plurality of first receipt acknowledgements for a plurality of downlink data of the same frequency domain and same time domain, to generate a second receipt acknowledgement; a function of selecting a resource on which a signal indicating contents of the second receipt acknowledgements is arranged, based on a plurality of second receipt acknowledgements; and a function of controlling transmit power in accordance with the number of second receipt acknowledgements and transmitting a signal indicating the contents of the second receipt acknowledgements using the selected resource.

As described above, when ACK/NACK channel selection and time domain bundling are executed, mobile station device 5 using the integrated circuit in accordance with the still further aspect of the present invention sets the parameter value related to transmit power, in accordance with the number of second receipt acknowledgements generated in a plurality of component carriers (cells). Mobile station device 5 transmits PUCCH while controlling PUCCH transmit power used for signal transmission generated from the contents of the plurality of second receipt acknowledgements using the set parameter value. Thus, base station device 3 can obtain information with appropriate reception characteristics, from the received uplink signals.

The operation described in the embodiments of the present invention may be realized by a program. According to a still further aspect, the present invention provides a program (a program causing a computer to function) running on mobile station device 5 and base station device 3, which controls CPU (Central Processing Unit) and the like to realize the functions of the embodiments described above. The information handled in these devices is temporarily stored in an RAM (Random Access Memory) during processing. Thereafter, the stored information is stored in various ROMs (Read Only Memories), HDD (Hard Disk Drive) and the like, and subjected to reading, writing or modification by the CPU as needed. Recording medium storing the program may include: a semiconductor medium (such as an ROM or non-volatile memory card), an optical recording medium (such as a DVD (Digital Versatile Disk), MO (Magnetic-Optical disk), MD (Mini-Disk), CD (Compact Disk), or BD (Blue-ray Disk), or a magnetic recording medium (such as a magnetic tape or a flexible disk). Further, by executing the loaded program, the above-described functions of the embodiments are realized and, in addition, the embodiments of the present invention may be realized by coordinated processing with an operating system or other application program based on an instruction from the program.

For distribution in the market, the program may be stored in a portable recording medium, or the program may be transferred to a server computer connected through a network such as the Internet. Here, the storage device of the server computer is also encompassed by the scope of the present invention. Further, part of, or all of the mobile station device 5 and base station device 3 in accordance with the embodiments described above may be realized by an LSI (Large Scale Integration) as a typical integrated circuit. Each of the functional blocks in mobile station device 5 and base station device 3 may be implemented in a chip, and part of or all of the function blocks may be integrated and implemented in a chip. Further, the method of integration is not limited to LSI, and the integrated circuit may be realized in a dedicated circuit or a general purpose processor. Further, if a technique of circuit integration replacing LSI emerges as a result of advancement in semiconductor technology, integrated circuit realized by such a technique may be used.

Although the present invention has been described and illustrated in detail, it is clearly understood that the same is by way of illustration and example only and is not to be taken by way of limitation, the scope of the present invention being interpreted by the terms of the appended claims.

REFERENCE SIGNS LIST 1 communication system, 3 base station device, 5, 5A, 5B, 5C) mobile station device, 101, 401 reception processing unit, 103, 403 radio resource control unit, 105, 405 control unit, 107, 407 transmission processing unit, 109, 409 reception antenna, 111 transmission antenna, 201 physical downlink shared channel processing unit, 203 physical downlink control channel processing unit, 205 downlink pilot channel processing unit, 207 multiplexing unit, 209, 623 IFFT unit, 211, 625 GI inserting unit 213, 605 D/A unit, 215, 607 transmission RF unit, 219, 611 turbo coding unit, 221, 613 data modulating unit, 223 convolution coding unit, 225 QPSK modulating unit, 301, 501 reception RF unit, 303, 503 A/D unit, 305 component carrier separating unit, 307 carrier-by-carrier reception processing unit for uplink component carriers, 309 symbol timing detecting unit, 311, 507 GI removing unit, 313, 509 FFT unit, 315 sub-carrier de-mapping unit, 317, 513 propagation path estimating unit, 319 propagation path equalizing unit (for PUSCH), 321 propagation path equalizing unit (for PUCCH), 323 IDFT unit, 325, 523 data demodulating unit, 327, 525 turbo decoding unit, 329 physical uplink control channel detecting unit, 411 transmission antenna, 505 symbol timing detecting unit, 511 de-multiplexing unit, 515 propagation path compensating unit (for PDSCH), 517 physical downlink shared channel decoding unit, 519 propagation path compensating unit (for PDCCH), 521 physical downlink control channel decoding unit, 527 QPSK demodulating unit, 529 Viterbi decoder unit, 601 carrier-by-carrier transmission processing unit for uplink component carriers, 603 component carrier synthesizing unit, 615 DFT unit, 617 uplink pilot channel processing unit, 619 physical uplink control channel processing unit, 621 sub-carrier mapping unit, 627 transmit power adjusting unit, 4051 first receipt acknowledgement generating unit, 4053 second receipt acknowledgement generating unit, 4055 resource selecting unit, 4057 parameter setting unit.

The invention claimed is:

1. A mobile station device to communicate with a base station device over a plurality of subframes on a plurality of cells, the mobile station device comprising:
 a receiving unit configured to receive data transmitted over a plurality of downlink subframes from the base station device;
 a ACK/NACK generating unit configured to generate ACK/NACK for reception of the data;
 a resource selecting unit configured to select one PUCCH resource from a plurality of PUCCH resources in an uplink subframe, in accordance with information of the ACK/NACK, by PUCCH format 1b with channel selection;
 a parameter setting unit configured to set at least one parameter value to prescribe transmit power of a PUCCH transmitted using the selected PUCCH resource; and
 a transmitting unit configured to transmit, with the prescribed transmit power, modulation signals related to the ACK/NACK, the modulation signals are mapped to the selected PUCCH resource for the PUCCH, wherein
 the parameter setting unit is configured to determine the parameter value in accordance with the number of cells having received the data over the plurality of downlink subframes, the parameter value which is determined in the case of having received the data on a cell is different from the parameter value which is determined in the case of having received the data on a plurality of cells.

2. The mobile station device according to claim 1, wherein the number of the plurality of PUCCH resources to be used to select the resource in accordance with the number of cells having received the data over at least one downlink subframe is capable to change.

3. A communication method for a mobile station device to communicate with a base station device over a plurality of subframes on a plurality of cells, the communication method comprising,
 receiving data transmitted over a plurality of downlink subframes from the base station device;
 generating ACK/NACK for reception of the data;
 selecting one PUCCH resource from a plurality of PUCCH resources in an uplink subframe, in accordance with information of the ACK/NACK, by PUCCH format 1b with channel selection;
 setting at least one parameter value to prescribe transmit power of a PUCCH transmitted using the selected PUCCH resource;
 transmitting, with the prescribed transmit power, modulation signals related to the ACK/NACK, the modulation signals are mapped to the selected PUCCH resource for the PUCCH; and
 determining the parameter value in accordance with the number of cells having received the data over the plurality of downlink subframes, wherein the parameter value which is determined in the case of having received the data on a cell is different from the parameter value which is determined in the case of having received the data on a plurality of cells.

4. The communication method according to claim 3, wherein the number of the plurality of PUCCH resources to be used to select the resource in accordance with the number of cells having received the data over at least one downlink subframe is capable to change.

5. An integrated circuit mounted on a mobile station device to communicate with a base station device over a plurality of subframes on a plurality of cells, to cause said mobile station device to perform a plurality of functions;
 receiving data transmitted over a plurality of downlink subframes from the base station device;
 generating ACK/NACK for reception of the data;
 selecting one PUCCH resource from a plurality of PUCCH resources in an uplink subframe, in accordance with information of the ACK/NACK, by PUCCH format 1b with channel selection;
 setting at least one parameter value to prescribe transmit power of a PUCCH transmitted using the selected PUCCH resource;
 transmitting, with the prescribed transmit power, modulation signals related to the ACK/NACK, the modulation signals are mapped to the selected PUCCH resource for the PUCCH; and determining the parameter value in accordance with the number of cells having received the data over the plurality of downlink subframes, wherein the parameter value which is determined in the case of having received the data on a cell is different from the parameter value which is determined in the case of having received the data on a plurality of cells.

6. The integrated circuit according to claim 5, wherein the number of the plurality of PUCCH resources to be used to select the resource in accordance with the number of cells having received the data over at least, one downlink subframe is capable to change.

7. A base station device to communicate with a mobile station device over a plurality of subframes on a plurality of cells, the base station device comprising:
   a transmitting unit configured to transmit data over a plurality of downlink subframes to the mobile station device; and
   a receiving unit configured to receive modulation signals related to a ACK/NACK, wherein
   the modulation signals are transmitted with a prescribed transmission power by the mobile station device, and
   the modulation signals are mapped to selected PUCCH resource for a PUCCH by the mobile station device, wherein
   the ACK/NACK is generated for reception of the data by the mobile station device,
   one PUCCH resource is selected from a plurality of PUCCH resources in an uplink subframe by the mobile station device, in accordance with information of the ACK/NACK, by PUCCH format 1b with channel selection,
   at least one parameter value is set, by the mobile station device, to prescribe transmit power of a PUCCH transmitted by the mobile station device using the selected PUCCH resource, and
   the parameter value is determined in accordance with the number of cells on which the data has been received over the plurality of downlink subframes by the mobile station device, the parameter value which is determined in the case that the data has been received on a cell by the mobile station device is different from the parameter value which is determined in the case that the data has been received on a plurality of cells by the mobile station device.

8. The base station device according to claim 7, wherein the number of the plurality of PUCCH resources to be used to select the resource in accordance with the number of cells having transmitted the data over at least one downlink subframe is capable to change.

9. A communication method for a base station device to communicate with a mobile station device over a plurality of subframes on a plurality of cells, the communication method comprising:
   transmitting data over a plurality of downlink subframes to the mobile station device; and
   receiving modulation signals related to a ACK/NACK, wherein
   the modulation signals are transmitted with a prescribed transmission power by the mobile station device, and
   the modulation signals are mapped to selected PUCCH resource for a PUCCH by the mobile station device, wherein
   the ACK/NACK is generated for reception of the data by the mobile station device,
   one PUCCH resource is selected from a plurality of PUCCH resources in an uplink subframe by the mobile station device, in accordance with information of the ACK/NACK, by PUCCH format 1b with channel selection,
   at least one parameter value is set, by the mobile station device, to prescribe transmit power of a PUCCH transmitted by the mobile station device using the selected PUCCH resource, and
   the parameter value is determined in accordance with the number of cells on which the data has been received over the plurality of downlink subframes by the mobile station device, the parameter value which is determined in the case that the data has been received on a cell by the mobile station device is different from the parameter value which is determined in the case that the data has been received on a plurality of cells by the mobile station device.

10. The communication method according to claim 9, wherein the number of the plurality of PUCCH resources to be used to select the resource in accordance with the number of cells having transmitted the data over at least one downlink subframe is capable to change.

11. An integrated circuit mounted on a base station device to communicate with a mobile station device over a plurality of subframes on a plurality of cells, to cause said mobile station device to perform a plurality of functions:
   transmitting data over a plurality of downlink subframes to the mobile station device; and
   receiving modulation signals related to a ACK/NACK, wherein
   the modulation signals are transmitted with a prescribed transmission power by the mobile station device, and
   the modulation signals are mapped to selected PUCCH resource for a PUCCH by the mobile station device, wherein
   the ACK/NACK is generated for reception of the data by the mobile station device,
   one PUCCH resource is selected from a plurality of PUCCH resources in an uplink subframe by the mobile station device, in accordance with information of the ACK/NACK, by PUCCH format 1b with channel selection,
   at least one parameter value is set, by the mobile station device, to prescribe transmit power of a PUCCH transmitted by the mobile station device using the selected PUCCH resource, and
   the parameter value is determined in accordance with the number of cells on which the data has been received over the plurality of downlink subframes by the mobile station device, the parameter value which is determined in the case that the data has been received on a cell by the mobile station device is different from the parameter value which is determined in the case that the data has been received on a plurality of cells by the mobile station device.

12. The integrated circuit according to claim 11, wherein the number of the plurality of PUCCH resources to be used to select the resource in accordance with the number of cells having transmitted the data over at least, one downlink subframe is capable to change.

* * * * *